(12) United States Patent
Guan et al.

(10) Patent No.: US 12,022,500 B2
(45) Date of Patent: Jun. 25, 2024

(54) SIGNAL RECEIVING AND SENDING METHOD AND COMMUNICATIONS APPARATUS

(71) Applicant: HUAWEI TECHNOLOGIES CO., LTD., Guangdong (CN)

(72) Inventors: Peng Guan, Shenzhen (CN); Lei Chen, Chengdu (CN); Xi Zhang, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 611 days.

(21) Appl. No.: 17/159,470

(22) Filed: Jan. 27, 2021

(65) Prior Publication Data

US 2021/0153209 A1    May 20, 2021

Related U.S. Application Data

(63) Continuation of application No. PCT/CN2019/094651, filed on Jul. 4, 2019.

(30) Foreign Application Priority Data

Aug. 6, 2018  (CN) .......................... 201810887249.7

(51) Int. Cl.
*H04W 72/04* (2023.01)
*H04L 5/00* (2006.01)
(Continued)

(52) U.S. Cl.
CPC ........... *H04W 72/53* (2023.01); *H04L 5/0037* (2013.01); *H04W 72/0453* (2013.01);
(Continued)

(58) Field of Classification Search
CPC ......... H04W 72/0493; H04W 72/0453; H04W 80/02; H04W 72/042; H04L 5/0037
See application file for complete search history.

(56) References Cited

U.S. PATENT DOCUMENTS

2018/0084550 A1*  3/2018  Chen ................. H04W 72/0453
2019/0103954 A1*  4/2019  Lee ........................ H04L 5/0098
(Continued)

FOREIGN PATENT DOCUMENTS

| CN | 108023708 A | 5/2018 |
| CN | 108199819 A | 6/2018 |
| CN | 108260214 A | 7/2018 |

OTHER PUBLICATIONS

3GPP TS 38.211 V15.1.0 (Mar. 2018); "3rd Generation Partnership Project;Technical Specification Group Radio Access Network; NR; Physical channels and modulation (Release 15)," Mar. 2018, 90 pages.
(Continued)

*Primary Examiner* — Derrick V Rose
(74) *Attorney, Agent, or Firm* — Fish & Richardson P.C.

(57) ABSTRACT

This application provides signal receiving and sending methods and apparatuses. One method includes: receiving first indication information on a first component carrier (CC), wherein the first indication information indicates a bandwidth part (BWP) for transmitting a downlink signal and a second CC to which the BWP belongs; determining a first mapping relationship based on the second CC and the BWP, wherein the first mapping relationship indicates a correspondence between at least one transmission configuration indicator (TCI) state and at least one TCI value; determining a TCI state based on the first mapping relationship and a received TCI; determining, based on the TCI state, a receive beam for receiving the downlink signal; and receiving the downlink signal in the BWP on the second CC by using the receive beam.

20 Claims, 13 Drawing Sheets

(51) Int. Cl.
  *H04W 72/0453* (2023.01)
  *H04W 72/23* (2023.01)
  *H04W 72/53* (2023.01)
  *H04W 80/02* (2009.01)
(52) U.S. Cl.
  CPC ........... *H04W 72/23* (2023.01); *H04W 80/02* (2013.01); *H04L 5/001* (2013.01)

(56) References Cited

U.S. PATENT DOCUMENTS

2019/0373450 A1* 12/2019 Zhou .................. H04L 5/001
2021/0337548 A1* 10/2021 Gao .................. H04W 72/0453

OTHER PUBLICATIONS

3GPP TS 38.212 V15.1.0 (Mar. 2018), 3rd Generation Partnership Project; Technical Specification Group Radio Access Network; NR; Multiplexing and channel coding (Release 15), Mar. 2018, 94 pages.
3GPP TS 38.212 V15.2.0 (Jun. 2018), "3rd Generation Partnership Project;Technical Specification Group Radio Access Network;NR;Multiplexing and channel coding(Release 15)," Jun. 2018, 98 pages.
3GPP TS 38.213 V15.1.0 (Mar. 2018) "3rd Generation Partnership Project; Technical Specification Group Radio Access Network; NR; Physical layer procedures for control (Release 15)," Mar. 2018, 77 pages.
3GPP TS 38.214 V15.1.0 (Mar. 2018), "3rd Generation Partnership Project;Technical Specification Group Radio Access Network; NR; Physical layer procedures for data (Release 15)," Mar. 2018, 77 pages.
3GPP TS 38.214 V15.2.0 (Jun. 2018), "3rd Generation Partnership Project;Technical Specification Group Radio Access Network;NR;Physical layer procedures for data (Release 15)," Jun. 2018, total 95pages.
3GPP TS 38.321 V15.2.0 (Jun. 2018), "3rd Generation Partnership Project; Technical Specification Group Radio Access Network; NR; Medium Access Control (MAC) protocol specification (Release 15)," Jun. 2018, 73 pages.
3GPP TS 38.331 V15.1.0 (Mar. 2018), "3rd Generation Partnership Project;Technical Specification Group Radio Access Network;NR;Radio Resource Control (RRC) protocol specification(Release 15)," Mar. 2018, 268 pages.
ASUSTek, "Remaining issues on beam management," 3GPP TSG RAN WG1 Meeting #93, R1-1807210, Busan, Korea, May 21-25, 2018, 9 pages.
PCT International Search Report and Written Opinion issued in International Application No. PCT/CN2019/094651 dated Aug. 29, 2019, 17 pages (with English translation).
Office Action issued in Chinese Application No. 201810887249.7 dated Aug. 25, 2021, 5 pages.
Ericsson, "Remaining issues on beam measurement and reporting," 3GPP TSG-RAN WG1 Meeting #93, R1-1806217, Busan, Korea, May 21-25, 2018, 13 pages.
Extended European Search Report issued in European Application No. 19848112.9 dated Jul. 13, 2021, 10 pages.
Huawei, HiSilicon, "Introducing MAC CEs for NR MIMO," 3GPP TSG RAN WG2 #101, R2-1801948, Athens, Greece, Feb. 26-Mar. 2, 2018, 11 pages.
Office Action issued in Japanese Application No. 2021-500235 dated Mar. 15, 2022, 7 pages (with English translation) .
Sony, "Remaining issues on beam management," 3GPP TSG RAN WG1 #93, R1-1806563, Busan, Korea, May 21-25, 2018, 6 pages.

* cited by examiner

| R | Serving cell ID | | | | | BWP ID | | Oct 1 |
|---|---|---|---|---|---|---|---|---|
| $T_7$ | $T_6$ | $T_5$ | $T_4$ | $T_3$ | $T_2$ | $T_1$ | $T_0$ | Oct 2 |
| $T_{15}$ | $T_{14}$ | $T_{13}$ | $T_{12}$ | $T_{11}$ | $T_{10}$ | $T_9$ | $T_8$ | Oct 3 |

...

| $T_{(N-2)*8+7}$ | $T_{(N-2)*8+6}$ | $T_{(N-2)*8+5}$ | $T_{(N-2)*8+4}$ | $T_{(N-2)*8+3}$ | $T_{(N-2)*8+2}$ | $T_{(N-2)*8+1}$ | $T_{(N-2)*8}$ | Oct N |

FIG. 3

| R | Serving cell ID | BWP ID | Oct 1 |
| R | Serving cell ID | BWP ID | Oct 2 |

| $T_7$ | $T_6$ | $T_5$ | $T_4$ | $T_3$ | $T_2$ | $T_1$ | $T_0$ | Oct 3 |
|---|---|---|---|---|---|---|---|---|
| $T_{15}$ | $T_{14}$ | $T_{13}$ | $T_{12}$ | $T_{11}$ | $T_{10}$ | $T_9$ | $T_8$ | Oct 4 |

...

| $T_{(N-2)*8+7}$ | $T_{(N-2)*8+6}$ | $T_{(N-2)*8+5}$ | $T_{(N-2)*8+4}$ | $T_{(N-2)*8+3}$ | $T_{(N-2)*8+2}$ | $T_{(N-2)*8+1}$ | $T_{(N-2)*8}$ | Oct X |

SIGNAL RECEIVING AND SENDING METHOD AND COMMUNICATIONS APPARATUS

CROSS-REFERENCE TO RELATED APPLICATIONS

This application is a continuation of International Application No. PCT/CN2019/094651, filed on Jul. 4, 2019, which claims priority to Chinese Patent Application No. 201810887249.7, filed on Aug. 6, 2018, The disclosures of the aforementioned applications are hereby incorporated by reference in their entireties.

TECHNICAL FIELD

This application relates to the field of wireless communication, and more specifically, to a signal receiving and sending method and a communications apparatus.

BACKGROUND

To increase a transmission bandwidth more greatly, a carrier aggregation (CA) technology is introduced into long term evolution-advanced (LTE-A). Carrier aggregation is mainly to aggregate a plurality of component carriers (CC, or referred to as a carrier, or the like) into a carrier having a relatively large bandwidth, to support high-speed data transmission. In the carrier aggregation, it is allowed that on a CC, another CC is scheduled to transmit data. For example, a physical downlink control channel (PDCCH) and a physical downlink shared channel (PDSCH) are on a same CC or on different CCs.

In addition, in a high-frequency scenario, to resist a path loss, a network device and a terminal device may separately obtain a gain through beamforming. The network device and the terminal device may obtain a pairing relationship between a transmit beam and a receive beam through beam training. The terminal device may determine the receive beam based on the pairing relationship and a transmission configuration indicator (TCI) state dynamically indicated by the network device.

However, in some scenarios, for example, during cross-carrier scheduling, when the network device sends the PDCCH on a CC and transmits the PDSCH on another CC, the terminal device may receive TCI states from the two CCs. The terminal device may not be capable of determining a CC, where a TCI state from the CC is used to determine the receive beam.

SUMMARY

This application provides a signal receiving and sending method and a communications apparatus, to help a receive end and a transmit end use a paired receive beam and transmit beam to receive and send a signal, thereby helping improve signal transmission quality.

According to a first aspect, a signal receiving method is provided. The method provided in the first aspect may be performed by a terminal device, or may be performed by a chip disposed in a terminal device. This is not limited in this application.

Specifically, the method includes: receiving first indication information on a first CC, where the first indication information is used to indicate a bandwidth part (BWP) for transmitting a downlink signal and a second CC to which the BWP belongs; determining a first mapping relationship based on the second CC and the BWP that are indicated by using the first indication information, where the first mapping relationship is used to indicate a correspondence between at least one TCI state and at least one TCI value; determining a TCI state based on the first mapping relationship and a received TCI, and determining, based on the TCI state, a receive beam for receiving the downlink signal; and receiving the downlink signal in the BWP on the second CC by using the receive beam.

According to a second aspect, a signal sending method is provided. The method provided in the second aspect may be performed by a network device, or may be performed by a chip disposed in a network device. This is not limited in this application.

Specifically, the method includes: sending first indication information on a first CC, where the first indication information is used to indicate a BWP for transmitting a downlink signal and a second CC to which the BWP belongs; determining a first mapping relationship based on the second CC and the BWP, where the first mapping relationship is used to indicate a correspondence between at least one TCI state and at least one TCI value; determining a TCI state based on the first mapping relationship and a TCI, and determining, based on the TCI state, a transmit beam for sending the downlink signal; and sending the downlink signal in the BWP on the second CC by using the transmit beam.

Optionally, in another implementation, the method includes: determining, by a network device on a first CC, a BWP for transmitting a downlink signal and a second CC to which the BWP belongs, where the second CC and the first CC are different CCs; determining a first mapping relationship based on the second CC and the BWP, where the first mapping relationship is used to indicate a correspondence between at least one TCI state and at least one TCI value; determining a TCI state based on the first mapping relationship and a TCI, and determining, based on the TCI state, a transmit beam for sending the downlink signal; and sending the downlink signal in the BWP on the second CC by using the transmit beam.

Based on the foregoing technical solution, the network device and the terminal device may determine a TCI state based on a same mapping relationship, and separately determine a transmit beam and a receive beam based on a same TCI state. Because the transmit beam and the receive beam that are determined based on the TCI state are paired beams that are pre-determined through beam training, it can be ensured that a relatively large beamforming gain can be obtained during downlink signal transmission, thereby helping improve downlink signal transmission quality. On the contrary, if the network device and the terminal device cannot determine a TCI state based on a same mapping relationship, when there are a plurality of mapping relationships, the network device and the terminal device may respectively select different mapping relationships to determine the TCI state. In this way, the TCI state determined by the network device and the TCI state determined by the terminal device may be different. A transmit beam and a receive beam that are determined based on the different TCI states are not necessarily paired beams determined in beam training. Therefore, a beamforming gain cannot be obtained during downlink signal transmission, and downlink signal transmission quality is poor.

With reference to the first aspect, in some implementations of the first aspect, the determining a first mapping relationship based on the second CC and the BWP that are indicated by using the first indication information includes:

receiving a plurality of media access control (MAC) MAC control elements (CE), where each MAC CE is used to indicate a mapping relationship and a BWP on a corresponding CC; and determining, as the first mapping relationship based on the second CC and the BWP that are indicated by using the first indication information, a mapping relationship indicated by using a first MAC CE in the plurality of MAC CEs, where an identifier of a CC indicated by using the first MAC CE is the same as an identifier of the second CC indicated by using the first indication information, and an identifier of a BWP indicated by using the first MAC CE is the same as an identifier of the BWP indicated by using the first indication information.

When the terminal device determines the first mapping relationship based on the second CC and the BWP, the terminal device may determine the first mapping relationship based on a received MAC CE. An identifier of a CC indicated by using the MAC CE used to determine the first mapping relationship is the identifier of the second CC indicated by using the first indication information. An identifier of a BWP indicated by using the MAC CE used to determine the first mapping relationship is the identifier of the BWP indicated by using the first indication information.

With reference to the second aspect, in some implementations of the second aspect, the method further includes: sending a plurality of MAC CEs, where each MAC CE is used to indicate a mapping relationship of one BWP on one CC, the plurality of MAC CEs include a first MAC CE, an identifier of a CC indicated by using the first MAC CE is the same as an identifier of the second CC indicated by using the first indication information, and an identifier of a BWP indicated by using the first MAC CE is the same as an identifier of the BWP indicated by using the first indication information.

Optionally, the method further includes: receiving information for indicating the first mapping relationship.

The plurality of MAC CEs may be sent by a same network device to a terminal device. For example, CCs indicated by using the plurality of MAC CEs are co-sited, or CCs indicated by using the plurality of MAC CEs are inter-sited, but network devices on different CCs obtain related information of a mapping relationship through an X2 interface. For example, the network device on the first CC may obtain the first mapping relationship through the X2 interface.

Alternatively, the plurality of MAC CEs may be sent by different network devices to the terminal device. For example, the CCs indicated by using the plurality of MAC CEs are inter-sited, and network devices on the CCs may respectively send mapping relationships configured for the cells to the terminal device. For example, the network device on the first CC may send mapping relationships of BWPs on the first CC to the terminal device, or a network device on the second CC may send mapping relationships of BWPs on the second CC to the terminal device. This is not limited in this application.

With reference to the first aspect, in some implementations of the first aspect, before the determining a first mapping relationship based on the second CC and the BWP that are indicated by using the first indication information, the method further includes: receiving second indication information, where the second indication information is used to indicate to determine the first mapping relationship based on the second CC and the BWP.

Correspondingly, with reference to the second aspect, in some implementations of the second aspect, the method further includes: sending second indication information, where the second indication information is used to indicate to determine the first mapping relationship based on the second CC and the BWP.

To be specific, the network device may pre-indicate, to the terminal device, a CC and a BWP based on which the first mapping relationship is determined, so that the network device and the terminal device determine a TCI state based on a same mapping relationship.

With reference to the first aspect or the second aspect, the determining a first mapping relationship based on the second CC and the BWP that are indicated by using the first indication information includes: determining, when the first CC and the second CC satisfy a first preset condition, the first mapping relationship based on the second CC and the BWP that are indicated by using the first indication information.

The first preset condition includes: the first CC is in a low frequency band, and the second CC is in a high frequency band; a band to which the first CC belongs is different from a band to which the second CC belongs; or the first CC and the second CC belong to a same band, but the first CC and the second CC are non-contiguous in frequency domain.

When the first indication information is carried on a physical downlink control channel (PDCCH), and the downlink signal is carried on a physical downlink shared channel (PDSCH), the first indication information is suitable for low frequency transmission, and the downlink signal is suitable for high frequency transmission. Reasons are as follows: When a signal is sent on a low frequency, a path loss is relatively small and signal strength is relatively high, the network device usually configures a wide beam for a CC in a low frequency band, and the wide beam can be used to improve angle domain coverage. Therefore, transmission robustness is high, and a control channel such as the PDCCH is suitable for sending. When a signal is sent on a high frequency, a bandwidth is relatively large and a transmission rate is relatively high, the network device usually configures a narrow beam for a CC in a high frequency band, and a signal-to-noise ratio or a signal to interference plus noise ratio during reception can be improved by using the narrow beam. Therefore, a throughput can be enhanced, and a data channel such as the PDSCH is suitable for sending. Usually, a TCI state configured by the network device for the low frequency band may correspond to transmission with a wide beam or without beamforming, and a TCI state configured by the network device for the high frequency band may correspond to transmission with a narrow beam. Therefore, when the first CC is in the low frequency band and the second CC is in the high frequency band, the first mapping relationship may be determined based on the second CC in the high frequency band and the BWP.

The preset conditions enumerated above are merely possible implementations of determining whether the first CC is in the low frequency band and whether the second CC is in the high frequency band, and shall not constitute any limitation on this application. This embodiment of this application includes the preset conditions, but is not limited thereto.

According to a third aspect, a signal receiving method is provided. The method provided in the third aspect may be performed by a terminal device, or may be performed by a chip disposed in a terminal device. This is not limited in this application.

Specifically, the method includes: receiving first indication information in a first BWP on a first CC, where the first indication information is used to indicate a second BWP for transmitting a downlink signal and a second CC to which the second BWP belongs; determining a first mapping relationship based on the first CC and the first BWP, where the first mapping relationship is used to indicate a correspondence between at least one activated TCI state and at least one TCI value; determining a TCI state based on the first mapping relationship and a received TCI, and determining, based on the TCI state, a receive beam for receiving the downlink signal; and receiving the downlink signal in the second BWP on the second CC by using the receive beam.

According to a fourth aspect, a signal sending method is provided. The method provided in the fourth aspect may be performed by a network device, or may be performed by a chip disposed in a network device. This is not limited in this application.

Specifically, the method includes: sending first indication information in a first BWP on a first CC, where the first indication information is used to indicate a second BWP for transmitting a downlink signal and a second CC to which the second BWP belongs; determining a first mapping relationship based on the first CC and the first BWP, where the first mapping relationship is used to indicate a correspondence between at least one activated TCI state and at least one TCI value; determining a TCI state based on the first mapping relationship and a TCI, and determining, based on the TCI state, a transmit beam for sending the downlink signal; and sending the downlink signal in the first BWP on the second CC by using the transmit beam.

Optionally, in another implementation, the method includes: determining, by a network device on a first CC, a BWP for transmitting a downlink signal and a second CC to which the BWP belongs, where the second CC and the first CC are different CCs; determining a first mapping relationship based on the first CC, where the first mapping relationship is used to indicate a correspondence between at least one TCI state and at least one TCI value; determining a TCI state based on the first mapping relationship and a TCI, and determining, based on the TCI state, a transmit beam for sending the downlink signal; and sending the downlink signal in the BWP on the second CC by using the transmit beam.

Based on the foregoing technical solution of the method, the network device and the terminal device may determine a TCI state based on a same mapping relationship, and separately determine a transmit beam and a receive beam based on a same TCI state. Because the transmit beam and the receive beam that are determined based on the TCI state are paired beams that are pre-determined through beam training, it can be ensured that a relatively large beamforming gain can be obtained during downlink signal transmission, thereby helping improve downlink signal transmission quality. On the contrary, if the network device and the terminal device cannot determine a TCI state based on a same mapping relationship, when there are a plurality of mapping relationships, the network device and the terminal device may respectively select different mapping relationships to determine the TCI state. In this way, the TCI state determined by the network device and the TCI state determined by the terminal device may be different. A transmit beam and a receive beam that are determined based on the different TCI states are not necessarily paired beams determined in beam training. Therefore, a beamforming gain cannot be obtained during downlink signal transmission, and downlink signal transmission quality is poor.

With reference to the third aspect, in some implementations of the third aspect, the determining a first mapping relationship based on the first CC and the first BWP includes: receiving a plurality of MAC CEs, where each MAC CE is used to indicate a mapping relationship and a BWP on a corresponding CC; and determining, as the first mapping relationship based on the first CC and the first BWP, a mapping relationship indicated by using a second MAC CE in the plurality of MAC CEs, where an identifier of a CC indicated by using the second MAC CE is the same as an identifier of the first CC, and an identifier of a BWP indicated by using the second MAC CE is the same as an identifier of the first BWP.

When the terminal device determines the first mapping relationship based on the first CC and the first BWP, the terminal device may determine the first mapping relationship based on a received MAC CE. The identifier of the first CC indicated by using the MAC CE used to determine the first mapping relationship is an identifier of the CC indicated by using the first indication information. The identifier of the first BWP indicated by using the MAC CE used to determine the first mapping relationship is an identifier of the BWP indicated by using the first indication information.

With reference to the fourth aspect, in some implementations of the fourth aspect, the method further includes: sending a plurality of MAC CEs, where each MAC CE is used to indicate a mapping relationship of one BWP on one CC, the plurality of MAC CEs include a first MAC CE, an identifier of a CC indicated by using the first MAC CE is the same as an identifier of the second CC indicated by using the first indication information, and an identifier of a BWP indicated by using the first MAC CE is the same as an identifier of the BWP indicated by using the first indication information.

As described above, the plurality of MAC CEs may be sent by a same network device to a terminal device, or may be sent by different network devices to the terminal device. Because the first mapping relationship is determined based on the first CC and the first BWP, the first MAC CE used to determine the first mapping relationship may be sent by the network device that sends the first indication information. That is, a network device that sends the first MAC CE and the network device that sends the first indication information may be a same network device, namely, the network device on the first CC.

With reference to the third aspect, in some implementations of the third aspect, before the determining a first mapping relationship based on the first CC and the first BWP, the method further includes: receiving third indication information, where the third indication information is used to indicate to determine the first mapping relationship based on the first CC and the first BWP.

Correspondingly, with reference to the fourth aspect, in some implementations of the fourth aspect, the method further includes: sending third indication information, where the third indication information is used to indicate to determine the first mapping relationship based on the first CC and the first BWP.

To be specific, the network device may pre-indicate, to the terminal device, a CC and a BWP based on which the first mapping relationship is determined, so that the network device and the terminal device determine a TCI state based on a same mapping relationship.

With reference to the third aspect or the fourth aspect, in some implementations, the determining a first mapping relationship based on the first CC and the first BWP includes: determining, when the first CC and the second CC satisfy a second preset condition, the first mapping relationship based on the first CC and the first BWP.

The second preset condition includes: both the first CC and the second CC are in a low frequency band; both the first CC and the second CC are in a high frequency band; a band to which the first CC belongs is the same as a band to which the second CC belongs; or a band to which the first CC belongs is the same as a band to which the second CC belongs, and the first CC and the second CC are contiguous in frequency domain.

As described above, when the first indication information is carried on a PDCCH, and the downlink signal is carried on a PDSCH, the first indication information is suitable for low frequency transmission, and the downlink signal is suitable for high frequency transmission. When both the second CC and the first CC are in the low frequency band, no high frequency resource is available. Alternatively, when both the second CC and the first CC are in the high frequency band, no low frequency resource is available. Therefore, the first mapping relationship may be directly determined based on the first CC and the first BWP.

According to a fifth aspect, a signal receiving method is provided. The method provided in the fifth aspect may be performed by a terminal device, or may be performed by a chip disposed in a terminal device. This is not limited in this application.

Specifically, the method includes: receiving first indication information in a first BWP on a first CC, where the first indication information is used to indicate a second BWP for transmitting a downlink signal and a second CC to which the second BWP belongs; determining a first mapping relationship, where the first mapping relationship is used to indicate a correspondence between at least one TCI state and at least one TCI state value, and the first mapping relationship is a mapping relationship determined based on the first CC and the first BWP or a mapping relationship determined based on the second CC and the second BWP; determining a TCI state based on a received TCI and the first mapping relationship, and determining, based on the TCI state, a receive beam for receiving the downlink signal; and receiving the downlink signal in the second BWP on a second CC by using the receive beam.

According to a sixth aspect, a signal sending method is provided. The method provided in the sixth aspect may be performed by a network device, or may be performed by a chip disposed in a network device. This is not limited in this application.

Specifically, the method includes: sending first indication information in a first BWP on a first CC, where the first indication information is used to indicate a second BWP for transmitting a downlink signal and a second CC to which the second BWP belongs; determining a first mapping relationship, where the first mapping relationship is used to indicate a correspondence between at least one TCI state and at least one TCI state value, and the first mapping relationship is a mapping relationship determined based on the first CC and the first BWP or a mapping relationship determined based on the second CC and the second BWP; determining, based on a TCI and the first mapping relationship, a transmit beam for sending the downlink signal; and sending the downlink signal in the second BWP on the second CC by using the transmit beam.

Optionally, in another implementation, the method includes: determining, by a network device on a first CC, a BWP used to transmit a downlink signal and a second CC to which the BWP belongs, where the second CC and the first CC are different CCs; determining a first mapping relationship, where the first mapping relationship is used to indicate a correspondence between at least one TCI state and at least one TCI state value, and the first mapping relationship is a mapping relationship determined based on the first CC or a mapping relationship determined based on the second CC; determining, based on a TCI and the first mapping relationship, a transmit beam for sending the downlink signal; and sending the downlink signal in a second BWP on the second CC by using the transmit beam.

Based on the foregoing technical solution, the network device and the terminal device may determine a TCI state based on a same mapping relationship, and separately determine a transmit beam and a receive beam based on a same TCI state. Because the transmit beam and the receive beam that are determined based on the TCI state are paired beams that are pre-determined through beam training, it can be ensured that a relatively large beamforming gain can be obtained during downlink signal transmission, thereby helping improve downlink signal transmission quality. In addition, the network device and the terminal device may flexibly select a TCI state based on positions of the first CC and the second CC in frequency domain, and send a data channel on a high frequency as much as possible, thereby helping improve data transmission efficiency and increase a throughput.

With reference to the fifth aspect, in some implementations of the fifth aspect, the method further includes: receiving a plurality of MAC CEs, where the plurality of MAC CEs include at least a first MAC CE and a second MAC CE, the first MAC CE is used to indicate a mapping relationship configured for the first BWP on the first CC, and the second MAC CE is used to indicate a mapping relationship configured for the second BWP on the second CC.

Correspondingly, with reference to the sixth aspect, in some implementations of the sixth aspect, the method further includes: sending a plurality of media access control (MAC) control elements (CEs), where the plurality of MAC CEs include at least a first MAC CE and a second MAC CE, the first MAC CE is used to indicate a mapping relationship configured for the first BWP on the first CC, and the second MAC CE is used to indicate a mapping relationship configured for the second BWP on the second CC.

Optionally, the method further includes: receiving information for indicating a mapping relationship of the second BWP on the second CC.

As described above, the plurality of MAC CEs may be sent by a same network device to a terminal device, or may be sent by different network devices to the terminal device. For example, the mapping relationship of the second BWP on the second CC may be sent by a network device on the second CC to the network device on the first CC.

With reference to the fifth aspect, in some implementations of the fifth aspect, the method further includes: receiving fourth indication information, where the fourth indication information is used to indicate whether the first mapping relationship is determined based on the first CC and the first BWP or the first mapping relationship is determined based on the second CC and the second BWP.

Correspondingly, with reference to the sixth aspect, in some implementations of the sixth aspect, the method further includes: sending fourth indication information, where the fourth indication information is used to indicate whether the first mapping relationship is determined based on the first CC and the first BWP or the first mapping relationship is determined based on the second CC and the second BWP.

To be specific, the network device may pre-indicate, to the terminal device, a CC and a BWP based on which the first mapping relationship is determined, so that the network device and the terminal device determine a TCI state based on a same mapping relationship.

With reference to the fifth aspect or the sixth aspect, in some implementations, the method further includes: determining the first mapping relationship based on frequency domain positions of the first CC and the second CC.

Optionally, the determining the first mapping relationship based on frequency domain positions of the first CC and the second CC includes: determining, when the first CC and the second CC satisfy a first preset condition, that the first mapping relationship is the mapping relationship configured for the second BWP on the second CC.

The first preset condition includes:

the first CC is in a low frequency band, and the second CC is in a high frequency band; a band to which the first CC belongs is different from a band to which the second CC belongs; or the first CC and the second CC belong to a same band, but the first CC and the second CC are non-contiguous in frequency domain.

Optionally, the determining the first mapping relationship based on frequency domain positions of the first CC and the second CC includes: determining, when the first CC and the second CC satisfy a second preset condition, that the first mapping relationship is the mapping relationship configured for the second BWP on the second CC.

The second preset condition includes: both the first CC and the second CC are in a low frequency band; both the first CC and the second CC are in a high frequency band; a band to which the first CC belongs is the same as a band to which the second CC belongs; or a band to which the first CC belongs is the same as a band to which the second CC belongs, and the first CC and the second CC are contiguous in frequency domain.

As described above, when the first indication information is carried on a physical downlink control channel PDCCH, and the downlink signal is carried on a PDSCH, the first indication information is suitable for low frequency transmission, and the downlink signal is suitable for high frequency transmission. Therefore, when the first CC and the second CC satisfy any one of the first preset conditions, the first mapping relationship may be determined based on the second CC. When the first CC and the second CC satisfy any one of the second preset conditions, the first mapping relationship may be determined based on the first CC.

It should be understood that the first preset condition corresponds to the second preset condition. For example, a preset condition a corresponds to a preset condition i, a preset condition b corresponds to a preset condition ii, a preset condition c corresponds to a preset condition iii, a preset condition d corresponds to a preset condition iv, a preset condition e corresponds to a preset condition v, a preset condition f corresponds to a preset condition vi, and a preset condition g corresponds to a preset condition vii. The network device and the terminal device may pre-agree that determining is performed based on corresponding preset conditions, or the network device and the terminal device may pre-agree that determining is performed based on a same preset condition. It can be ensured, only in this way, that determined results are consistent.

With reference to the first aspect to the sixth aspect, in some implementations, the downlink signal is carried on a physical downlink shared channel, and the first indication information is carried in downlink control information (DCI).

With reference to the first aspect to the sixth aspect, in some implementations, the DCI further includes the TCI, and the TCI is used to indicate a selected TCI state.

According to a seventh aspect, a communications apparatus is provided, and includes modules or units configured to perform the method according to any one of the first aspect, the third aspect, the fifth aspect, or the possible implementations of the first aspect, the third aspect, or the fifth aspect.

According to an eighth aspect, a communications apparatus is provided, and includes a processor. The processor is coupled to a memory, and may be configured to execute an instruction in the memory, to implement the method according to any one of the possible implementations of the first aspect, the third aspect, or the fifth aspect. Optionally, the communications apparatus further includes the memory. Optionally, the communications apparatus further includes a communications interface, and the processor is coupled to the communications interface.

In an implementation, the communications apparatus is a terminal device. When the communications apparatus is the terminal device, the communications interface may be a transceiver or an input/output interface.

In another implementation, the communications apparatus is a chip disposed in a terminal device. When the communications apparatus is the chip disposed in the terminal device, the communications interface may be an input/output interface.

Optionally, the transceiver may be a transceiver circuit. Optionally, the input/output interface may be an input/output circuit.

According to a ninth aspect, a communications apparatus is provided, and includes modules or units configured to perform the method according to any one of the second aspect, the fourth aspect, the sixth aspect, or the possible implementations of the second aspect, the fourth aspect, or the sixth aspect.

According to a tenth aspect, a communications apparatus is provided, and includes a processor. The processor is coupled to a memory, and may be configured to execute an instruction in the memory, to implement the method according to any one of the possible implementations of the second aspect, the fourth aspect, or the sixth aspect. Optionally, the communications apparatus further includes the memory. Optionally, the communications apparatus further includes a communications interface, and the processor is coupled to the communications interface.

In an implementation, the communications apparatus is a network device. When the communications apparatus is the network device, the communications interface may be a transceiver or an input/output interface.

In another implementation, the communications apparatus is a chip disposed in a network device. When the communications apparatus is the chip disposed in the network device, the communications interface may be an input/output interface.

Optionally, the transceiver may be a transceiver circuit. Optionally, the input/output interface may be an input/output circuit.

According to an eleventh aspect, a processor is provided, and includes an input circuit, an output circuit, and a processing circuit. The processing circuit is configured to receive a signal by using the input circuit, and transmit a signal by using the output circuit, so that the processor performs the method according to any one of the first aspect to the sixth aspect or the possible implementations of the first aspect to the sixth aspect.

In a specific implementation process, the processor may be a chip, the input circuit may be an input pin, the output circuit may be an output pin, and the processing circuit may be a transistor, a gate circuit, a trigger, various logic circuits, or the like. The input signal received by using the input circuit may be received and input by using, for example, but not limited to, a receiver, the signal output by using the output circuit may be output to, for example, but not limited to, a transmitter and transmitted by using the transmitter, and the input circuit and the output circuit may be a same circuit, where the circuit is used as the input circuit and the output circuit at different moments. Specific implementations of the processor and the various circuits are not limited in this embodiment of this application.

According to a twelfth aspect, a processing apparatus is provided, and includes a processor and a memory. The processor is configured to read an instruction stored in the memory, and may receive a signal by using a receiver, and transmit a signal by using a transmitter, to perform the method according to any one of the first aspect to the sixth aspect or the possible implementations of the first aspect to the sixth aspect.

Optionally, there are one or more processors and one or more memories.

Optionally, the memory and the processor may be integrated together, or the memory and the processor may be separately disposed.

In a specific implementation process, the memory may be a non-transitory memory such as a read-only memory (ROM). The memory and the processor may be integrated on a same chip, or may be separately disposed on different chips. A type of the memory and a manner of disposing the memory and the processor are not limited in this embodiment of this application.

It should be understood that a related data exchange process such as indication information sending may be a process of outputting the indication information from the processor, and capability information receiving may be a process of receiving input capability information by the processor. Specifically, data output by the processor may be output to the transmitter, and input data received by the processor may be from the receiver. The transmitter and the receiver may be collectively referred to as a transceiver.

The processing apparatus in the twelfth aspect may be a chip. The processor may be implemented by using hardware, or may be implemented by using software. When the processor is implemented by using the hardware, the processor may be a logic circuit, an integrated circuit, or the like; or when the processor is implemented by using the software, the processor may be a general-purpose processor, and is implemented by reading software code stored in the memory. The memory may be integrated into the processor, may be located outside the processor, and may exist independently.

According to a thirteenth aspect, a computer program product is provided. The computer program product includes a computer program (also referred to as code or an instruction), and when the computer program is run, a computer is enabled to perform the method according to any one of the first aspect to the sixth aspect or the possible implementations of the first aspect to the sixth aspect.

According to a fourteenth aspect, a computer-readable medium is provided. The computer-readable medium stores a computer program (also referred to as code or an instruction), and when the computer program is run on a computer, the computer is enabled to perform the method according to any one of the first aspect to the sixth aspect or the possible implementations of the first aspect to the sixth aspect.

According to a fifteenth aspect, a communications system is provided, and includes the foregoing network device and the foregoing terminal device.

BRIEF DESCRIPTION OF DRAWINGS

FIG. 3 is a schematic diagram of a format of a MAC CE in the prior art;

DESCRIPTION OF EMBODIMENTS

The following describes technical solutions in this application with reference to accompanying drawings.

The technical solutions in the embodiments of this application may be used in various communications systems, such as a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunication system (UMTS) system, a worldwide interoperability for microwave access (WiMAX) communications system, and a 5th generation (5G) system or new radio (NR) system.

For ease of understanding the embodiments of this application, a communications system applicable to the embodiments of this application is described in detail with reference to FIG. 1 and FIG. 2.

Figure 1:
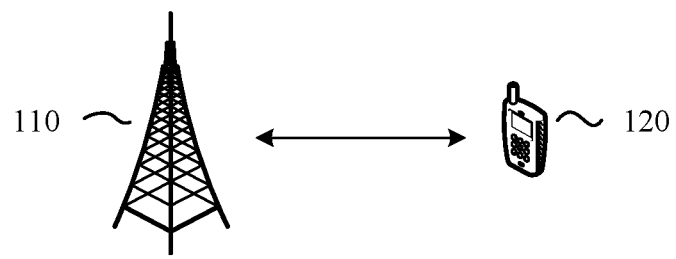
FIG. 1 is a schematic diagram of a communications system to which a signal receiving and sending method according to an embodiment of this application is applicable.

FIG. 1 is a schematic diagram of a communications system 100 applicable to a signal sending and receiving method and an apparatus according to an embodiment of this application. As shown in the figure, the communications system 100 may include at least one network device such as a network device 110 shown in FIG. 1. The communications system 100 may further include at least one terminal device such as a terminal device 120 shown in FIG. 1. The network device 110 and the terminal device 120 may communicate with each other through a radio link.

Figure 2:
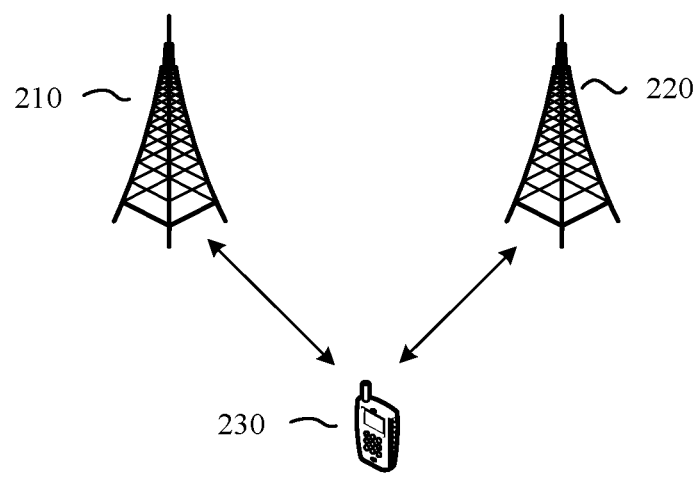
FIG. 2 is another schematic diagram of a communications system to which a signal receiving and sending method according to an embodiment of this application is applicable.

FIG. 2 is another schematic diagram of a communications system 200 applicable to a signal sending and receiving method and an apparatus according to an embodiment of this application. As shown in the figure, the communications system 200 may include at least two network devices such as network devices 210 and 220 shown in FIG. 2. The communications system 200 may further include at least one terminal device such as a terminal device 230 shown in FIG. 2. The terminal device 230 may establish a radio link with the network device 210 and the network device 220 by using a dual connectivity (DC) technology or a multi-connectivity technology. The network device 210 may be, for example, a primary base station, and the network device 220 may be, for example, a secondary base station. In this case, the network device 210 is a network device used when the terminal device 230 performs initial access, and is responsible for radio resource control (RRC) communication with the terminal device 230. The network device 220 may be added during RRC reconfiguration, and is configured to provide an additional radio resource.

Certainly, the network device 220 may alternatively be a primary base station, and the network device 210 may alternatively be a secondary base station. This is not limited in this application. In addition, for ease of understanding only, the figure shows a case in which the two network devices are connected to the terminal device in a wireless manner. However, this should not constitute any limitation on a scenario to which this application is applicable. The terminal device may further establish a radio link with more network devices.

A plurality of antennas may be configured for each communication device such as the network device 110 or the terminal device 120 in FIG. 1 or the network device 210, the network device 220, or the terminal device 230 in FIG. 2. The plurality of antennas may include at least one transmit antenna used to send a signal and at least one receive antenna used to receive a signal. In addition, the communication device may additionally include a transmitter chain and a receiver chain. A person of ordinary skill in the art may understand that the transmitter chain and the receiver chain each may include a plurality of components (for example, a processor, a modulator, a multiplexer, a demodulator, a demultiplexer, or an antenna) related to signal sending and receiving. Therefore, a network device and a terminal device may communicate with each other by using a multiple-antenna technology.

It should be understood that the network device in the wireless communications system may be any device that has a wireless transceiver function. The device includes but is not limited to an evolved NodeB (eNB), a radio network controller RNC), a NodeB (NB), a base station controller (BSC), a base transceiver station (BTS), a home base station (for example, a Home evolved NodeB or a Home NodeB, HNB), a baseband unit (BBU), an access point (AP) in a wireless fidelity (Wi-Fi) system, a wireless relay node, a wireless backhaul node, a transmission point (TP), a transmission reception point (TRP), or the like, may be a gNB or a transmission point (a TRP or a TP) in a 5G system such as an NR system or one antenna panel or one group (including a plurality of antenna panels) of antenna panels of a base station in a 5G system, or may be a network node that is included in a gNB or a transmission point, for example, a baseband unit (BBU) or a distributed unit (DU).

In some deployment, the gNB may include a centralized unit (CU) and a DU. The gNB may further include a radio unit (RU). The CU implements some functions of the gNB, and the DU implements some functions of the gNB. For example, the CU implements functions of a radio resource control (RRC) layer and a packet data convergence protocol (PDCP) layer, and the DU implements functions of a radio link control (RLC) layer, a media access control (MAC) layer, and a physical (PHY) layer. Information at the RRC layer eventually becomes information at the PHY layer, or is converted from information at the PHY layer. Therefore, in this architecture, higher layer signaling such as RRC layer signaling may also be considered as being sent by the DU or by the DU and the CU. It may be understood that the network device may be a CU node, a DU node, or a device including a CU node and a DU node. In addition, the CU may be classified as a network device in a radio access network (RAN), or may be classified as a network device in a core network (CN). This is not limited in this application.

It should be further understood that, the terminal device in the wireless communications system may also be referred to as user equipment (UE), an access terminal, a subscriber unit, a subscriber station, a mobile station a remote station, a remote terminal, a mobile device, a user terminal, a terminal, a wireless communications device, a user agent, or a user apparatus. The terminal device in the embodiments of this application may be a mobile phone, a tablet (pad), a computer having the wireless transceiver function, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. An application scenario is not limited in the embodiments of this application.

For ease of understanding the embodiments of this application, the following first briefly describes several terms in this application.

1. Beam: The beam in an NR protocol may be embodied as a spatial domain filter that is also referred to as a spatial filter or a spatial parameter. A beam used to send a signal may be referred to as a transmit beam (Tx beam), or may be referred to as a spatial domain transmit filter or a spatial domain transmit parameter. A beam used to receive a signal may be referred to as a receive beam (Rx beam), or may be referred to as a spatial domain receive filter or a spatial domain receive parameter.

The transmit beam may refer to distribution of signal strength formed in different directions in space after a signal is transmitted by using an antenna, and the receive beam may refer to distribution of signal strength that is of a radio signal received from an antenna and that is in different directions in space.

It should be understood that the foregoing enumerated embodying of the beam in the NR protocol is merely an example, and shall not constitute any limitation on this application. This application does not exclude a possibility that another term is defined in a future protocol to represent a same or similar meaning.

In addition, the beam may be a wide beam, a narrow beam, or a beam of another type. A technology for forming the beam may be a beamforming technology or another technology. The beamforming technology may be specifically a digital beamforming technology, an analog beamforming technology, a hybrid digital/analog beamforming technology, or the like Different beams may be considered as different resources. Same information or different information may be sent on different beams.

Optionally, a plurality of beams that have same or similar communication features may be considered as one beam. One beam may include one or more antenna ports, and is used to transmit a data channel, a control channel, a sounding signal, and the like. One or more antenna ports forming one beam may also be considered as one antenna port set.

2. Beam pairing relationship: The beam pairing relationship is a pairing relationship between a transmit beam and a receive beam, namely, a pairing relationship between a spatial domain transmit filter and a spatial domain receive filter. A relatively large beamforming gain can be obtained by transmitting a signal between a transmit beam and a receive beam that have a beam pairing relationship.

In an implementation, a transmit end and a receive end may obtain a beam pairing relationship through beam training. Specifically, the transmit end may send a reference signal in a beam sweeping manner, and the receive end may also receive a reference signal in the beam sweeping manner. Specifically, the transmit end may form different directional beams in space in a beamforming manner, and may perform polling on a plurality of different directional beams, to transmit a reference signal by using the different directional beams, so that a power of transmitting the reference signal can reach a maximum value in a direction directed by using a transmit beam. The receive end may also form different directional beams in space in the beamforming manner, and may perform polling on a plurality of different directional beams, to receive a reference signal by using the different directional beams, so that a power of receiving the reference signal by the receive end can reach a maximum value in a direction directed by using a receive beam.

By traversing each transmit beam and each receive beam, the receive end may perform channel measurement based on the received reference signal, and report a measurement result to the transmit end by using CSI. For example, the receive end may report, to the transmit end, a part of reference signal resources with relatively large reference signal received powers (RSRP), and for example, report an identifier of the reference signal resource, so that the transmit end sends and receives a signal by using a beam pairing relationship with relatively good channel quality during data or signaling transmission.

3. Reference signal and reference signal resource: The reference signal may be used for channel measurement, channel estimation, or the like. The reference signal resource may be used to configure a transmission attribute of the reference signal, for example, a time-frequency resource location, a port mapping relationship, a power factor, and a scrambling code. For details, refer to the current technology. A transmit end device may send the reference signal based on the reference signal resource, and a receive end device may receive the reference signal based on the reference signal resource.

The channel measurement in this application also includes beam measurement. To be specific, beam quality information is obtained by measuring a reference signal. A parameter used to measure beam quality includes an RSRP, but is not limited thereto. For example, beam quality may also be measured by using parameters such as reference signal received quality (RSRQ), a signal-to-noise ratio (SNR), and signal to interference plus noise ratio (SINR). In the embodiments of this application, for ease of description, unless otherwise specified, the channel measurement may be considered as the beam measurement.

The reference signal may include, for example, a channel state information reference signal (CSI-RS), a synchronization signal block (SSB), and a sounding reference signal (SRS). Correspondingly, the reference signal resource may include a CSI-RS resource, an SSB resource, or an SRS resource.

It should be noted that the foregoing SSB may also be referred to as a synchronization signal/physical broadcast channel block (SS/PBCH block), and the corresponding SSB resource may also be referred to as a synchronization signal/physical broadcast channel block resource (SS/PBCH block resource) that may be referred to as an SSB resource for short.

To distinguish between different reference signal resources, each reference signal resource may correspond to a reference signal resource identifier, for example, a CSI-RS resource indicator (CRI), an SSB resource indicator (SSBRI), or an SRS resource index (SRI).

The SSB resource identifier may also be referred to as an SSB index.

It should be understood that the reference signals and the corresponding reference signal resources enumerated above are merely examples for description, and shall not constitute any limitation on this application. This application does not exclude a possibility of defining another reference signal in a future protocol to implement a same or similar function.

4. Antenna port: The antenna port is referred to as a port for short. The port is a transmit antenna identified by a receive end device or a transmit antenna that can be distinguished in space. One antenna port may be configured for each virtual antenna, the virtual antenna may be a weighted combination of a plurality of physical antennas, and each antenna port may correspond to one reference signal port.

5. Quasi-colocation (QCL): The quasi-colocation is also referred to as quasi-colocation. Signals corresponding to antenna ports that have a QCL relationship have a same parameter, a parameter of one antenna port may be used to determine a parameter of another antenna port that has a QCL relationship with the antenna port, two antenna ports have a same parameter, or a parameter difference between two antenna ports is less than a threshold. The parameter may include one or more of the following: a delay spread, a Doppler spread, a Doppler shift, an average delay, an average gain, and a spatial receive parameter. The spatial receive parameter may include one or more of the following: an angle of arrival (AOA), an average AOA, an AOA spread, an angle of departure (AOD), an average angle of departure AOD, an AOD spread, a receive antenna spatial correlation parameter, a transmit antenna spatial correlation parameter, a transmit beam, a receive beam, and a resource identifier.

The foregoing angles may be decomposition values at different dimensions or a combination of decomposition values at different dimensions. The antenna ports are antenna ports having different antenna port numbers, antenna ports that have a same antenna port number and that are used to send or receive information at different time, on different frequencies, and/or on different code domain resources, and/or antenna ports that have different antenna port numbers and that are used to send or receive information at different time, on different frequencies, and/or on different code domain resources. The resource identifier may include: the CSI-RS resource identifier, an SRS resource identifier, the SSB resource identifier, a resource identifier of a preamble sequence transmitted on a physical random access channel (PRACH), or a resource identifier of a demodulation reference signal (DMRS), used to indicate a beam on a resource.

In the NR protocol, the QCL relationship may be classified into the following four types based on different parameters:
- type A (type A): the Doppler shift, the Doppler spread, the average delay, and the delay spread;
- type B (type B): the Doppler shift and the Doppler spread;
- type C (type C): the Doppler shift and the average delay; and
- type D (type D): the spatial receive parameter.

The QCL in the embodiments of this application is QCL of the type D. Unless otherwise specified in the following, the QCL may be understood as the QCL of the type D, namely, QCL defined based on the spatial receive parameter.

When the QCL relationship is a QCL relationship of the type D, the QCL relationship may be considered as spatial QCL. When the antenna ports satisfy the spatial QCL relationship, a QCL relationship between a port for a downlink signal and a port for a downlink signal or between a port for an uplink signal and a port for an uplink signal may be that the two signals have a same AOA or AOD, and is used to indicate that the two signals have a same receive beam or transmit beam. For another example, a QCL relationship between a downlink signal and an uplink signal or between a port for an uplink signal and a port for a downlink signal may be that there is a correspondence between AOAs and AODs of the two signals, or that there is a correspondence between AODs and AOAs of the two signals. To be specific, beam reciprocity may be used to determine an uplink transmit beam based on a downlink receive beam or determine a downlink receive beam based on an uplink transmit beam.

From a perspective of the transmit end, if two antenna ports are spatial QCLed, it may mean that corresponding beam directions of the two antenna ports are consistent in space. From a perspective of the receive side, if two antenna ports are spatial QCLed, it may mean that the receive side can receive, in a same beam direction, signals sent by using the two antenna ports.

Signals transmitted on ports having a spatial QCL relationship may further have corresponding beams. The corresponding beam includes at least one of the following: a same receive beam, a same transmit beam, a transmit beam corresponding to a receive beam (corresponding to a reciprocity scenario), and a receive beam corresponding to a transmit beam (corresponding to a reciprocity scenario).

Signals transmitted on ports having a spatial QCL relationship may alternatively be understood as signals received or sent by using a same spatial filter. The spatial filter may be at least one of the following: precoding, a weight of an antenna port, a phase deflection of the antenna port, and an amplitude gain of the antenna port.

Signals transmitted on ports having a spatial QCL relationship may alternatively be understood as having corresponding beam pair links (BPL). The corresponding BPL includes at least one of the following: a same downlink BPL, a same uplink BPL, an uplink BPL corresponding to a downlink BPL, and a downlink BPL corresponding to an uplink BPL.

Therefore, the spatial receive parameter (namely, the QCL of the type D) may be understood as a parameter used to indicate direction information of a receive beam.

6. Transmission configuration indicator (TCI) status: The TCI state may be used to indicate a QCL relationship between two types of reference signals. Each TCI state may include a serving cell index, a bandwidth part (BWP) identifier (ID), and the reference signal resource identifier. The reference signal resource identifier may be, for example, at least one of the following: a non-zero-power (NZP) CSI-RS resource identifier (NZP-CSI-RS-ResourceId), a non-zero-power CSI-RS resource set identifier (NZP-CSI-RS-ResourceSetId), or an SSB index (SSB-Index).

The serving cell index, the BWP ID, and the reference signal resource identifier are used to indicate a reference signal resource used in a beam training process, a corresponding serving cell, and a corresponding BWP. In the beam training process, a network device sends, by using different transmit beams, reference signals based on different reference signal resources, and therefore, the reference signals sent by using the different transmit beams may be associated with the different reference signal resources; a terminal device receives, by using different receive beams, reference signals based on different reference signal resources, and therefore, the reference signals received by using the different receive beams may also be associated with the different reference signal resources. Therefore, in the beam training process, the terminal device may maintain a correspondence among the serving cell index, the BWP ID, the reference signal resource identifier, and a receive beam, and the network device may maintain a correspondence among the serving cell index, the BWP ID, the reference signal resource identifier, and a transmit beam. A pairing relationship between the receive beam and the transmit beam may be established by using the reference signal resource identifier.

In a subsequent communication process, the terminal device may determine the receive beam based on a TCI state indicated by the network device, and the network device may determine the transmit beam based on a same TCI state.

In addition, a TCI state may be globally configured. In TCI states configured for different cells and different BWPs, if indexes of the TCI states are the same, configurations of corresponding TCI states are also the same. For example, configurations of TCI states 0 in Table 1 and Table 2 shown below may be the same.

7. TCI: The TCI may be used to indicate a TCI state.

In an implementation, a network device may configure a TCI state list for the terminal device by using higher layer signaling (for example, an RRC message). For example, the network device may configure the TCI state list for the terminal device by using a tci-StatesToAddModList in the RRC message. The TCI state list may include a plurality of TCI states. For example, the network device may configure a maximum of 64 TCI states for each BWP in each cell.

Subsequently, the network device may activate one or more TCI states by using higher layer signaling (for example, a MAC CE). The activated TCI state is a subset of the TCI state list configured by using the RRC message. For example, the network device may activate a maximum of eight TCI states for each BWP in each cell.

FIG. 3 is a schematic diagram of a format of a MAC CE in the prior art. As shown in the figure, an octet in the figure represents a byte including eight bits. The MAC CE is used to configure a TCI state for a PDSCH, a PUSCH, a PDCCH, or the like in an indicated serving cell. Specifically, the MAC CE includes an identifier (ID) of the serving cell, an ID of a BWP, and indication bits used to indicate whether TCI states are activated. An activated TCI state indicated by using the MAC CE may be understood as a TCI state configured for the serving cell and the BWP that are indicated by using the MAC CE. In other words, when the PDSCH, the PUSCH, or the PDCCH is transmitted in the BWP in the serving cell, a transmit beam and a receive beam may be determined based on information indicated by using the TCI state.

Specifically, $T_i$ in the MAC CE is used to indicate whether each TCI state is activated. Each $T_i$ may occupy one bit, and i corresponds to an $i^{th}$ TCI state in the TCI state list configured by using the tci-StatesToAddModList in the RRC message. For example, i is equal to a value of a TCI-state ID. A value of $T_i$ may be 1 or 0. 1 may indicate that a TCI state is selected for activation, and 0 may indicate that a TCI state is not selected for activation. If there may be a maximum of eight $T_i$s whose values are 1, the $T_i$s may respectively correspond to values of a 3-bit TCI field in DCI. In other words, there is a one-to-one correspondence between TCIs and TCI states. For example, a method for enabling the TCI states to correspond to the TCI values may be enabling $T_i$s to correspond to 000, 001, 010, 011, 100, 101, 110, and 111 in ascending order of i, or may be enabling $T_i$s to correspond to 000, 001, 010, 011, 100, 101, 110, and 111 in descending order of i. This is not limited in this application. A method in which correspondence is performed in ascending order of i is used as an example. If that eight values of $T_0$, $T_1$, . . . , and $T_7$ are 1 is indicated by using the MAC CE, a correspondence between all the values of the 3-bit TCI field in the DCI and the TCI states may be: 000 corresponds to $T_0$, namely, a TCI state 0, 001 corresponds to $T_1$, namely, a TCI state 1, and the rest may be deduced by analogy. The mapping relationship may be specifically shown in the following Table 1:

TABLE 1

| 3-bit TCI field in DCI | TCI state configured in an RRC message |
|---|---|
| 000 | TCI state 0 |
| 001 | TCI state 1 |
| 010 | TCI state 2 |
| 011 | TCI state 3 |
| 100 | TCI state 4 |
| 101 | TCI state 5 |
| 110 | TCI state 6 |
| 111 | TCI state 7 |

It should be understood that, for ease of understanding only, the foregoing shows the one-to-one correspondence between the plurality of TCI values and the plurality of TCI states. However, this should not constitute any limitation on this application. In addition, for ease of understanding only, the foregoing presents the one-to-one correspondence between the plurality of TCI field values and the plurality of TCI states in a form of a table. However, this should not constitute any limitation on this application. The mapping relationship may alternatively be presented in another manner. This is not limited in this application. In addition, the mapping relationship is not limited to the one-to-one correspondence between the plurality of TCI values and the plurality of TCI states. When there is only one activated TCI state, the mapping relationship is a correspondence between one TCI value and one TCI state. In this case, the TCI state may be directly determined. The network device may further indicate a selected TCI state by using TCI described below, or may not additionally indicate a selected TCI state by using TCI. This is not limited in this application.

For ease of description, a one-to-one correspondence, indicated by using the MAC CE, between at least one TCI value and at least one TCI state is referred to as a mapping relationship for short below. A mapping relationship is configured for each BWP on each CC.

Then, the network device may further indicate a selected TCI state by using a TCI field in physical layer signaling (for example, downlink control information (DCI)). The DCI may be, for example, applicable to DCI for scheduling a physical downlink resource.

Configuration information of one TCI state may include one or two reference signal resource identifiers and a QCL type associated with the reference signal resource identifier. When a QCL relationship is configured to be of one of the type A, the type B, or the type C, the terminal device may demodulate a PDCCH or a PDSCH based on an indication of the TCI state. When a QCL relationship is configured to be of the type D, the terminal device may learn of a transmit beam used by the network device to send a signal, and may further determine, based on the beam pairing relationship determined through the channel measurement, a receive beam used to receive a signal. The terminal device may determine, based on a TCI field in DCI on a physical downlink control channel (PDCCH), a receive beam for receiving a physical downlink shared channel (PDSCH).

It should be noted that, when a serving cell indicated by using the TCI state and a serving cell scheduled to transmit a downlink signal to the terminal device are not a same serving cell, for example, when the serving cell indicated by using the TCI state is a cell #0, and the serving cell scheduled to transmit the downlink signal to the terminal device is a cell #1, the terminal device may also determine the receive beam based on the TCI state. A transmit beam indicated by using the TCI state is a transmit beam, for example, denoted as a transmit beam #0, of a network device in the cell #0. If the cell #0 and the cell #1 are co-sited, a network device in the cell #1 may directly use the transmit beam #0 to send a downlink signal. If the cell #0 and the cell #1 are inter-sited, a network device in the cell #1 may determine, based on a direction of the transmit beam #0, a direction of a beam transmitted by the network device. For example, the direction may be a direction that has an angle the same as or similar to that of the transmit beam #0, or an omnidirectional transmit beam may be selected. A specific method for selecting, by the network device based on the transmit beam #0, the direction of the beam transmitted by the network device may be implemented by using an algorithm. This is not limited in this application.

8. Spatial relation (SR): The spatial relation may also be referred to as an uplink TCI (UL TCI). Similar to the TCI described above, the spatial relation may be used to determine a beam for sending an uplink signal. The spatial relation may be determined through beam training. A reference signal used for the beam training may be, for example, an uplink reference signal such as a sounding reference signal (SRS), or may be a downlink reference signal such as the SSB or CSI-RS enumerated above.

Each spatial relation may include a serving cell index and a reference signal resource identifier. The reference signal resource identifier may be, for example, any one of the following: a downlink BWP ID and an SSB index, a downlink BWP ID and a non-zero-power CSI-RS reference signal resource identifier (NZP-CSI-RS-Resource Id), or an uplink BWP ID and an SRS resource identifier (SRS-Resource Id).

The serving cell index, a BWP ID, and the reference signal resource identifier indicate a reference signal resource used in the beam training process, a corresponding serving cell, and a corresponding BWP. One spatial relation is used to determine one transmit beam. To be specific, one serving cell index, one BWP ID, and one reference signal resource identifier may be used to determine one transmit beam. The terminal device may maintain, in the beam training process, a correspondence between all of the serving cell index, the BWP ID, and the reference signal resource identifier and the transmit beam. A network device may maintain, in the beam training process, a correspondence between all of the serving cell index, the BWP ID, and the reference signal resource identifier and a receive beam. A pairing relationship between the transmit beam and the receive beam may be established by using the reference signal resource identifier.

In a subsequent communication process, the terminal device may determine the transmit beam based on a spatial relation indicated by the network device, and the network device may determine the receive beam based on a same spatial relation.

In addition, each spatial relation may further include power control information. The power control information may include, for example, at least one of the following: an expected receive power, a path loss reference signal, and a path loss compensation parameter $\alpha$. The terminal device may determine, based on the power control information, a transmit power used to send the uplink signal.

In addition, the spatial relation may be globally configured. In spatial relations configured for different cells and different BWPs, if identifiers of the spatial relations are the same, configurations of corresponding spatial relations are also the same.

9. Spatial relation indicator (SRI): The spatial relation indicator may be used to indicate a spatial relation.

In an implementation, the network device may configure a spatial relation list for the terminal device by using higher layer signaling (for example, an RRC message). The spatial relation list may include a plurality of spatial relations. For example, the network device may configure a maximum of 64 spatial relations for each BWP in each cell.

Then, the network device may activate one or more spatial relations by using higher layer signaling (for example, a MAC CE). The activated spatial relation is a subset of the spatial relation list configured by using the RRC message. For example, the network device may activate a maximum of eight TCI states for each BWP in each cell. A specific manner in which the network device activates the spatial relation by using the MAC CE is the same as the specific manner of activating the TCI state. The specific manner of activating the TCI state by using the MAC CE has been described in detail above. For brevity, details are not described herein again. Based on activation performed by using the MAC CE, the terminal device may determine a mapping relationship between at least one SRI and at least one spatial relation. A specific form of the mapping relationship may be, for example, similar to that shown in Table 1 above. For brevity, no description is given herein by using an example.

Then, the network device may indicate a selected spatial relation by using an SRI field in physical layer signaling (for example, DCI). The DCI may be, for example, DCI used for scheduling an uplink grant (UL grant) resource. The terminal device may determine the selected spatial relation based on the mapping relationship between the at least one SRI and the at least one spatial relation and a received SRI.

Similar to a downlink TCI, configuration information of one spatial relation may include one or two reference signal resource identifiers and an associated QCL type. When a QCL relationship is configured to be of one of the type A, the type B, or the type C, the terminal device may demodulate a PDCCH or a PDSCH based on an indication of the TCI state. When a QCL relationship is configured to be of the type D, the terminal device may learn of a receive beam used by the network device to receive a signal, and may further determine, based on the beam pairing relationship determined through the channel measurement, a transmit beam used to send a signal.

In addition, configuration information of one spatial relation may include one or two reference signal resource identifiers and an associated spatial filter. For example, when an SSB index is configured in a spatial relation, the terminal device may transmit a signal by using a spatial filter corresponding to the SSB index. The spatial filter corresponding to the SSB index may be a spatial filter used to receive, in the beam training process, an SSB identified by using the SSB index.

The terminal device may determine, based on an SRI field in DCI on a PDCCH, a transmit beam for sending a physical uplink shared channel (PUSCH).

It should be noted that, when a serving cell indicated by using the spatial relation and a serving cell scheduled to transmit an uplink signal to the terminal device are not a same serving cell, for example, when the serving cell indicated by using the spatial relation is a cell #0, and the serving cell scheduled to transmit the uplink signal to the terminal device is a cell #1, the terminal device may also determine the transmit beam based on the spatial relation. A receive beam indicated by using the spatial relation is a receive beam, for example, denoted as a receive beam #0, of a network device in the cell #0. If the cell #0 and the cell #1 are co-sited, a network device in the cell #1 may directly use the receive beam #0 to receive an uplink signal. If the cell #0 and the cell #1 are inter-sited, a network device in the cell #1 may determine, based on a direction of the receive beam #0, a direction of a receive beam of the network device. For example, the direction may be a direction that has an angle the same as or similar to that of the receive beam #0, or an omnidirectional receive beam may be selected. A specific method for selecting, by the network device based on the receive beam #0, the direction of the receive beam of the network device may be implemented by using an algorithm. This is not limited in this application.

10. Cell: The cell is a radio coverage area identified by either base station identity code or cell global identification. Coverage of each network device may be divided into one or more serving cells, and the serving cell may be considered to include a frequency domain resource. In the embodiments of this application, the cell may be replaced with a serving cell or a CC. In the embodiments of this application, the terms "the cell", "the serving cell", and "the CC" are used alternately, and when a difference between the terms is not emphasized, meanings to be expressed by the terms are consistent. Similarly, terms "the serving cell index", "a serving cell identifier (ID)", "a cell identifier (cell ID)", and "a CC identifier (CC ID)" are used alternately, and when a difference between the terms is not emphasized, meanings to be expressed by the terms are consistent.

It should be noted that the cell may be an area within coverage of a wireless network of a network device. In the embodiments of this application, different cells may correspond to different network devices. For example, a network device in a cell #1 and a network device in a cell #2 may be different network devices such as base stations. That is, the cell #1 and the cell #2 may be managed by the different base stations. In this case, in other words, the cell #1 and the cell #2 are co-sited or co-sited. The network device in the cell #1 and the network device in the cell #2 may alternatively be different radio frequency processing units, for example, radio remote units (RRU), of a same base station. In other words, the cell #1 and the cell #2 may be managed by the same base station, and have a same baseband processing unit and a same intermediate frequency processing unit, but have the different radio frequency processing units. This is not particularly limited in this application.

Figure 4:
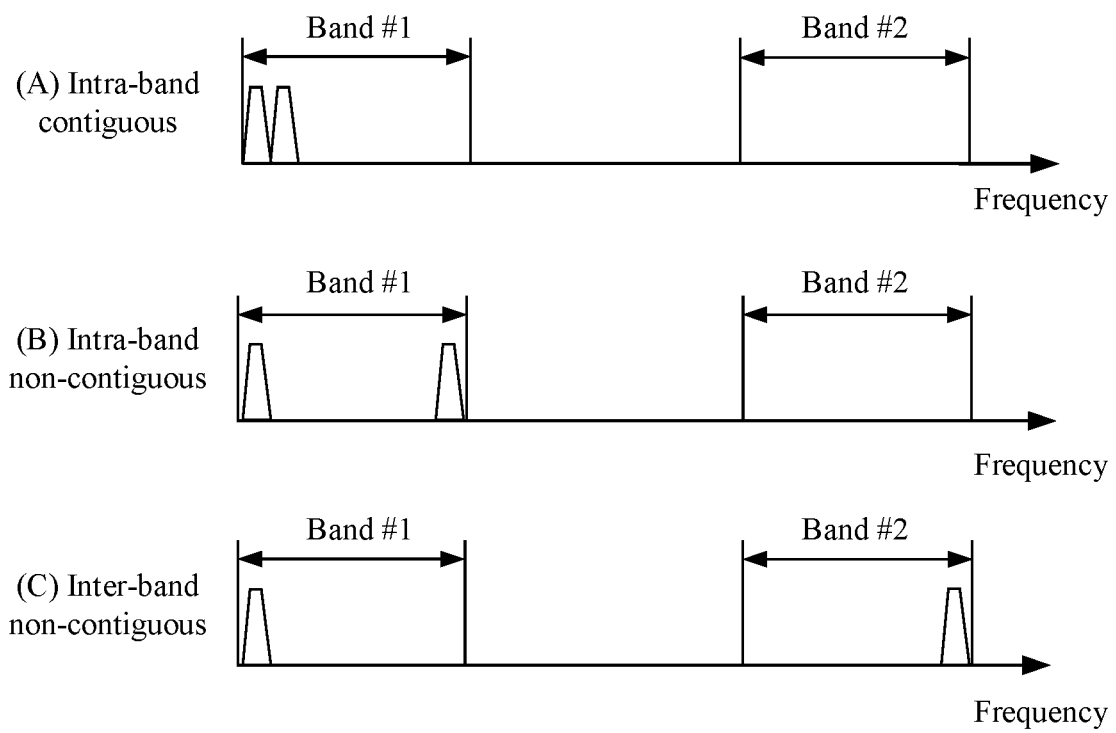
FIG. 4 is a schematic diagram of carrier aggregation according to an embodiment of this application.

11. Carrier aggregation (CA): To efficiently use fragmented spectra, a system supports aggregation between different component carriers. A technology in which two or more carriers are aggregated to support a larger transmission bandwidth may be referred to as the carrier aggregation. FIG. 4 is a schematic diagram of carrier aggregation according to an embodiment of this application. As shown in the figure, A in FIG. 4 shows that two contiguous CCs in a same band are scheduled, which may be referred to as being intra-band contiguous for short. B in FIG. 4 shows that two non-contiguous CCs in a same band are scheduled, which may be referred to as being intra-band non-contiguous for short. C in FIG. 4 shows that two CCs in different bands are scheduled, which may be referred to as being inter-band non-contiguous for short.

The carrier aggregation is specific to a terminal device. Different CCs may be configured for different terminal devices. Each CC may correspond to an independent cell. In this embodiment of this application, one CC may be equivalent to one cell. For example, a primary cell (PCell) corresponds to a primary CC, and may be a cell that establishes an initial connection for the terminal, a cell that reestablishes an RRC connection, or a primary cell specified in a handover process. A secondary cell (SCell) corresponds to a secondary CC (or referred to as a secondary component carrier), and may be a cell that is added during RRC reconfiguration and that is used to provide an additional radio resource.

For a terminal device in a connected state, if the carrier aggregation is not configured, the terminal device has one serving cell; or if the carrier aggregation is configured, the terminal device may have a plurality of serving cells that may be referred to as a serving cell set. For example, the serving cell set of the terminal device includes the primary cell and the secondary cell. In other words, the serving cell set includes at least one primary cell and at least one secondary cell. In other words, the terminal for which the carrier aggregation is configured may be connected to one PCell and a plurality of SCells.

For example, the network device 110 shown in FIG. 1 may configure the carrier aggregation for the terminal device 120. Both the network device 210 and the network device 220 that are shown in FIG. 2 may configure the carrier aggregation for the terminal device 230.

12. Cross-carrier scheduling: A network device sends a physical downlink control channel (PDCCH) on a CC, to schedule data transmission on another CC. To be specific, the network device transmits a physical downlink shared channel (PDSCH) on the another CC, or transmits a physical uplink shared channel (PUSCH) on the another CC. More specifically, the network device may send the PDCCH in a BWP on the CC, to schedule transmission of the PDSCH or the PUSCH in a BWP on the another CC. That is, a control channel is transmitted on a CC, and a corresponding data channel is transmitted on another CC.

Downlink control information (DCI) on the PDCCH may be used to indicate a scheduled CC by using a carrier indicator field (CIF). That is, the CIF may be used to specify a cell, where the PDCCH corresponds to a PDSCH/PUSCH resource in the cell.

13. Bandwidth part (BWP): In NR, transmit or receive capabilities of different terminal devices in a same cell may be different. Therefore, a system may configure a corresponding bandwidth for each terminal device. This part of bandwidth configured for the terminal device is referred to as a BWP, and the terminal device performs transmission in the BWP of the terminal device. The BWP may be a group of contiguous frequency domain resources on a carrier. Different BWPs may occupy frequency domain resources that partially overlap, or may occupy frequency domain resources that do not overlap. The different BWPs may occupy frequency domain resources in a same bandwidth or different bandwidths. This is not limited in this application.

Different BWPs may be configured for the different terminal devices in the system. To support different services, the different BWPs may support different configuration parameters (numerologies). The numerology is a concept newly introduced into NR, and may be specifically understood as a set of parameters used in a communications system. For example, the numerology may include a subcarrier spacing (SCS), a symbol length, a cyclic prefix (CP) length, a quantity of resource blocks (RB), a slot length, a frame format, and the like. One cell may support one or more numerologies, and one BWP may support one numerology. It should be understood that the enumerated specific content included in the numerology herein is merely used as an example for description, and should not constitute any limitation on this application. For example, the numerology may further include a parameter at another granularity that can be supported in NR.

In conclusion, different transmission bandwidths (for example, different quantities of RBs included in the BWPs), different subcarrier spacings, different cyclic prefixes (CP), and the like may be configured for the different BWPs.

Before transmitting data to a terminal device, the network device may pre-schedule a physical resource for the terminal device. The network device may schedule a physical downlink shared channel PDSCH or a PUSCH for the terminal device by using, for example, a PDCCH. If the network device configures the carrier aggregation for the terminal device, a CC on which the network device sends the PDCCH may be different from a CC on which the PDSCH or the PUSCH is transmitted. For example, the PDCCH is sent on a CC #0, and the PDSCH or the PUSCH is transmitted on a CC #1, which is the cross-carrier scheduling described above. Alternatively, a BWP used by the network device to send the PDCCH is different from a BWP used to transmit the PDSCH or the PUSCH. For example, the PDCCH is sent in a BWP #0 on a CC #0, and the PDSCH or the PUSCH is transmitted in a BWP #2 on the CC #0. Alternatively, both a CC and a BWP that are used by the network device to send the PDCCH are different from a CC and a BWP that are used to transmit the PDSCH or the PUSCH. For example, the PDCCH is sent in a BWP #0 on a CC #0, and the PDSCH or the PUSCH is transmitted in a BWP #1 on a CC #1.

Downlink transmission is used as an example. The network device configures an activated TCI state for the terminal device based on each BWP on each CC. For example, the network device sends the PDCCH in the BWP #0 on the CC #0, and transmits the PDSCH in the BWP #1 on the CC #1. In this case, the terminal device may pre-receive an activated TCI state configured based on the BWP #0 on the CC #0 and an activated TCI state configured for the BWP #1 on the CC #1.

For example, activated TCI states configured for the BWP #0 on the CC #0 include TCI states 0 to 7, and activated TCI states configured for a BWP #2 on the CC #1 include TCI states 0 and TCI states 4 to 6. In this case, mapping relationships in Table 1 and Table 2 may be obtained. Table 1 shows a mapping relationship configured for the BWP #0 on the CC #0. Because Table 1 has been shown above, Table 1 is not repeated herein again. Table 2 shows a mapping relationship configured for the BWP #1 on the CC #1. Details are as follows:

TABLE 2

| 3-bit TCI field in DCI | TCI state configured in an RRC message |
|---|---|
| 000 | TCI state 0 |
| 001 | TCI state 4 |
| 010 | TCI state 5 |
| Oil | TCI state 6 |

It can be learned that when different mapping relationships are used, TCI states indicated by using a TCI field may be different. For example, when the TCI field is "010", the TCI field corresponds to the TCI state 2 in Table 1, and corresponds to the TCI state 5 in Table 2. It may be understood that the TCI state 2 and the TCI state 5 are obtained through training based on different transmit beams and/or receive beams, and both transmit beams and receive beams determined based on the TCI state 2 and the TCI state 5 may be different.

Because the terminal device may not know whether the network device sends a PDSCH based on a TCI state configured for the BWP #0 on the CC #0 or sends a PDSCH based on a TCI state configured for the BWP #1 on the CC #1, the terminal device cannot determine a receive beam used to receive the PDSCH. If a receive beam selected by the terminal device does not correspond to a transmit beam used by the network device to send the PDSCH, quality of the PDSCH received by the terminal device may not be quite good. Therefore, signal receiving quality is affected, and user experience is reduced.

In view of this, this application provides a signal receiving and sending method, to help a receive end and a transmit end use a correct receive beam and a correct transmit beam to receive and send a signal, thereby improving signal receiving quality and improving user experience.

The following describes the embodiments of this application in detail with reference to the accompanying drawings.

It may be understood that, in the embodiments shown below, "first", "second", "third", "fourth", and various numerical numbers are merely used for distinguishing for ease of description, and are not used to limit the scope of the embodiments of this application. For example, "first", "second", "third", "fourth", and the various numerical numbers are used to distinguish between different component carriers, different cells, different BWPs, different indication information, and the like.

It should be further understood that, in the embodiments shown below, "pre-obtaining" may include being indicated by using network device signaling or being predefined, for example, being defined in a protocol. "Being predefined" may be implemented by pre-storing corresponding code or a corresponding table in a device (for example, including a terminal device and a network device) or in another manner that may be used to indicate related information. A specific implementation of "being predefined" is not limited in this application.

It should be further understood that "storing" in the embodiments of this application may be storage in one or more memories. The one or more memories may be separately disposed, or may be integrated into an encoder or a decoder, a processor, or a communications apparatus. Alternatively, a part of the one or more memories may be separately disposed, and a part of the one or more memories are integrated into a decoder, a processor, or a communications apparatus. A type of the memory may be a storage medium in any form. This is not limited in this application.

It should be further understood that "the protocol" in the embodiments of this application may be a standard protocol in the communications field, and for example, may include an LTE protocol, an NR protocol, and a related protocol used in a future communications system. This is not limited in this application.

The technical solutions in this application may be used in a wireless communications system, for example, the communications system 100 shown in FIG. 1 or the communications system 200 shown in FIG. 2. There may be a wireless communication connection relationship between two communications apparatuses located in the wireless communications system. One of the two communications apparatuses may correspond to, for example, the network device 110 shown in FIG. 1, and for example, may be the network device 110 or a chip disposed in the network device 110. The other of the two communications apparatuses may correspond to, for example, the terminal device 120 in FIG. 1, and for example, may be the terminal device 120 or a chip disposed in the terminal device 120. One of the two communications apparatuses may correspond to, for another example, the network device 210 shown in FIG. 2, and for example, may be the network device 210 or a chip disposed in the network device 210. The other of the two communications apparatuses may correspond to, for another example, the terminal device 230 shown in FIG. 2, and for example, may be the terminal device 230 or a chip disposed in the terminal device 230. One of the two communications apparatuses may correspond to, for still another example, the network device 220 shown in FIG. 2, and for example, may be the network device 220 or a chip disposed in the network device 220. The other of the two communications apparatuses may correspond to, for still another example, the terminal device 230 shown in FIG. 2, and for example, may be the terminal device 230 or a chip disposed in the terminal device 230.

Without loss of generality, the following first describes the embodiments of this application in detail by using a downlink transmission process between one terminal device and one network device as an example. It may be understood that any terminal device in the wireless communications system or a chip disposed in a terminal device may receive a downlink signal based on a same method, and any network device in the wireless communications system or a chip disposed in a network device may send the downlink signal based on a same method. This is not limited in this application.

Figure 5:
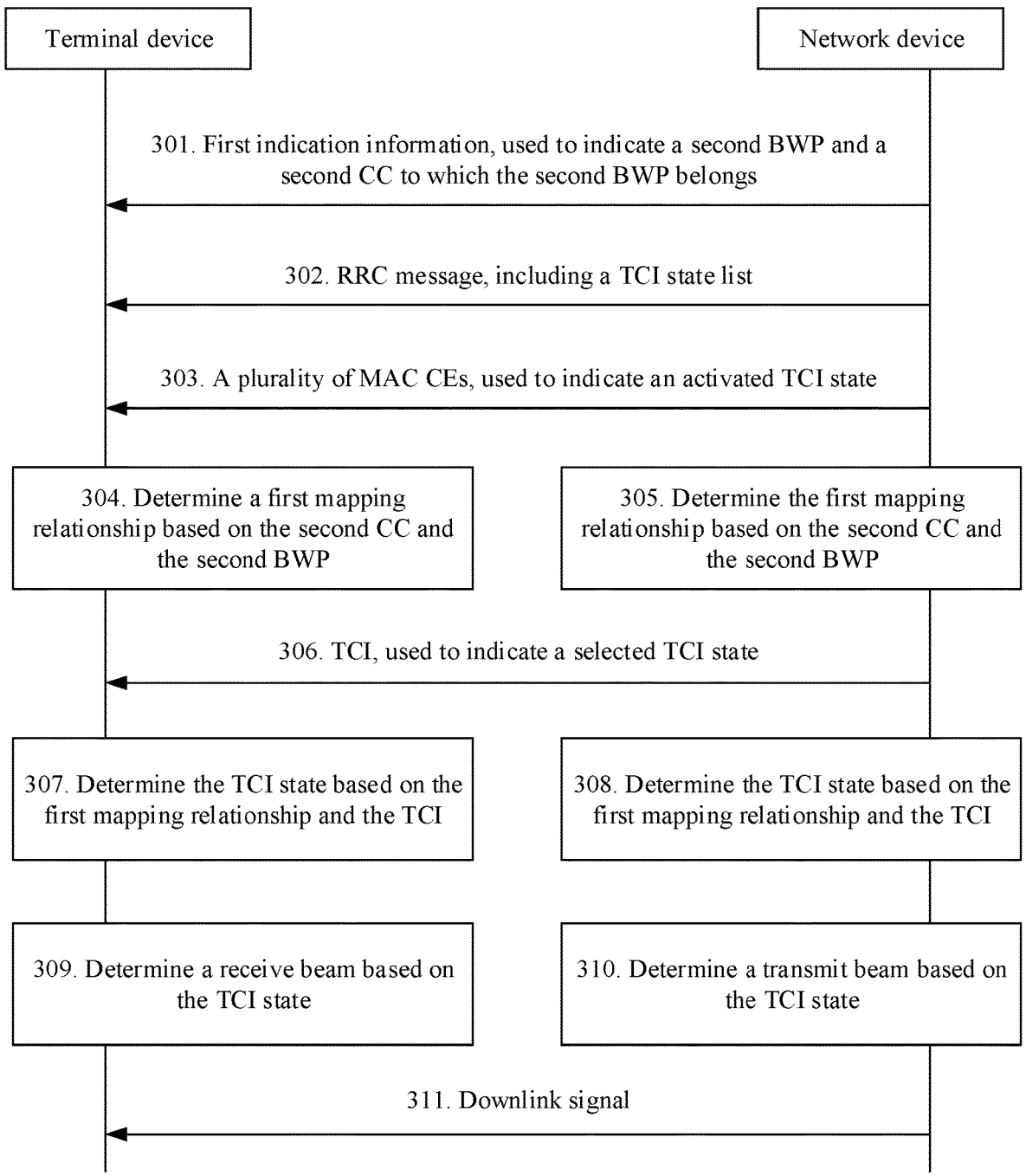
FIG. 5 is a schematic flowchart of a signal receiving and sending method according to an embodiment of this application.

FIG. 5 is a schematic flowchart of a signal receiving and sending method 300 from a perspective of device interaction. As shown in the figure, the method 300 shown in FIG. 5 may include step 301 to step 311. The following describes steps in the method 300 in detail with reference to FIG.

In step 301, a network device sends first indication information in a first BWP on a first CC, where the first indication information is used to indicate a second BWP for transmitting a downlink signal and/or a second CC to which the second BWP belongs. Correspondingly, in step 301, a terminal device receives the first indication information in the first BWP on the first CC.

For ease of differentiation and description, in this embodiment, a BWP in which the network device sends the first indication information is denoted as the first BWP, and the first BWP belongs to the first CC; and a BWP in which the network device sends the downlink signal is denoted as the second BWP, and the second BWP belongs to the second CC. BWPs may be distinguished by using different identifiers. That is, different BWPs correspond to different BWP IDs. CCs may also be distinguished by using different identifiers. That is, different CCs correspond to different CC IDs.

For example, the first CC may be the CC #0 described above, the first BWP may be the BWP #0 described above, the second CC may be the CC #1 described above, and the second BWP may be the BWP #1 described above.

It should be understood that the first CC, the first BWP, the second CC, and the second BWP that are enumerated above are merely examples, and should not constitute any limitation on this application. The first CC and the second CC may be a same CC, or may be different CCs. Regardless of whether the first CC and the second CC are the same CC, the first BWP and the second BWP are different BWPs. In other words, a frequency domain resource used to transmit the first indication information and a frequency domain resource used to transmit the downlink signal belong to different BWPs.

An indication field in the first indication information may include an indication field of a CC and/or an indication field of a BWP. Therefore, the first indication information may be used to indicate only the second CC, or may be used to indicate only the second BWP, or may indicate the second CC and the second BWP. Specifically, when the first CC and the second CC are the same CC, the first indication information may include only an indication field of the second BWP, or may include an indication field of the second CC and an indication field of the second BWP. When the first CC and the second CC are the different CCs, and the second CC includes only one BWP, namely, the second BWP, the first indication information may include only an indication field of the second CC, or may include an indication field of the second CC and an indication field of the second BWP. When the first CC and the second CC are the different CCs, and the second CC includes a plurality of BWPs, the first indication information may include an indication field of the second CC and an indication field of the second BWP.

It should be noted that when a CC includes only one BWP, the CC may be understood as the BWP. In this case, the CC and the BWP may be considered to be equivalent. A same subcarrier spacing may be configured for resources on the entire CC. A subcarrier spacing of the BWP may be considered as a subcarrier spacing of the CC.

In a possible case, the first indication information may be carried in DCI, an RRC message, or a MAC CE. The downlink signal may be carried on a PDSCH.

When the first indication information is carried in the DCI, the network device may send the first indication information to the terminal device by using a PDCCH, and the downlink signal may be carried on the PDSCH. In other words, the first BWP may be a BWP used to transmit the PDCCH, and the second BWP may be a BWP used to transmit the PDSCH.

In another possible case, the first indication information may be carried in an RRC message, and the downlink signal may be a PDCCH.

In other words, the first BWP may be a BWP used to transmit the RRC message, and the second BWP may be a BWP used to transmit the PDCCH.

After receiving the first indication information, the terminal device may determine to receive the downlink signal in the second BWP on the second CC. Before receiving the downlink signal, the terminal device may further determine a receive beam based on a TCI state indicated by using a received TCI.

As described above, the network device may indicate a TCI state list to the terminal device by using the RRC message, and the TCI state list may include a plurality of TCI states. Optionally, the method 300 further includes step 302: The network device sends the RRC message, where the RRC message includes the TCI state list, and the TCI state list includes the plurality of TCI states. Correspondingly, in step 302, the terminal device receives the RRC message.

Then, the network device may indicate an activated TCI state to the terminal device by using the MAC CE. Optionally, the method 300 further includes step 303: The terminal device receives a plurality of MAC CEs, where each of the plurality of MAC CEs is used to indicate at least one mapping relationship and a corresponding CC and BWP.

The plurality of MAC CEs may be sent by a same network device to the terminal device. For example, CCs indicated by using the plurality of MAC CEs are co-sited, or CCs indicated by using the plurality of MAC CEs are inter-sited, but network devices on different CCs obtain related information of a mapping relationship through an X2 interface. For example, a network device on the first CC may obtain a mapping relationship, namely, a first mapping relationship described below, of each BWP on the second CC through an X2 interface, or obtain a mapping relationship, namely, a first mapping relationship described below, of the second BWP on the second CC through an X2 interface.

Alternatively, the plurality of MAC CEs may be sent by different network devices to the terminal device. For example, CCs indicated by using the plurality of MAC CEs are inter-sited, and network devices on the CCs may respectively send mapping relationships configured for the cells to the terminal device. For example, a network device on the first CC may send mapping relationships of the BWPs (including the first BWP) on the first CC to the terminal device, or send a mapping relationship of the first BWPs on the first CC to the terminal device. A network device on the second CC may send mapping relationships of BWPs (including the second BWP) on the second CC to the terminal device, or send a mapping relationship of the second BWP on the second CC to the terminal device.

The figure is merely an example, and shows a case in which the same network device sends the plurality of MAC CEs to the terminal device. However, this should not constitute any limitation on this application.

After receiving the plurality of MAC CEs, the terminal device may determine a mapping relationship of each BWP on each CC based on the method described above. Therefore, the terminal device may determine a plurality of mapping relationships. Each mapping relationship may be used to indicate a one-to-one correspondence between at least one TCI value and at least one TCI state. A specific indication manner of the mapping relationship and content indicated by using the mapping relationship are described in detail above. For brevity, details are not described herein again.

In this embodiment, the terminal device and the network device may determine, based on the second CC and the second BWP that are indicated by using the first indication information, which mapping relationship is selected from the plurality of mapping relationships to determine a TCI state. For ease of differentiation and description, the mapping relationship used to determine the TCI state is denoted as the first mapping relationship herein.

In step 304, the terminal device determines the first mapping relationship based on the second CC and/or the second BWP that are/is indicated by using the first indication information.

Specifically, the terminal device may determine the first mapping relationship in the plurality of mapping relationships based on the second CC and/or the second BWP.

When the first CC and the second CC are the same CC, in an implementation, the first indication information may be used to indicate only the second BWP. A protocol may specify by default that, when the first indication information is used to indicate only a BWP, a CC for transmitting the first indication information and a CC scheduled for transmitting the downlink signal is a same CC. When receiving the first indication information, the terminal device may determine, based on the second BWP indicated by using the first indication information, that the second BWP and the first BWP for transmitting the first indication information belong to a same CC. In addition, the terminal device may determine the first mapping relationship based on the CC for receiving the first indication information and the BWP indicated by using the first indication information. In another implementation, the first indication information may alternatively be used to indicate the second CC and the second BWP, and the terminal device may determine the first mapping relationship based on the second CC and the second BWP that are indicated by using the first indication information. In this case, the second CC and the first CC are the same CC.

When the first CC and the second CC are the different CCs, and the second CC includes only one BWP, in an implementation, the first indication information may be used to indicate only the second CC. A protocol may specify by default that, when the first indication information is used to indicate only a CC, the indicated CC includes only one BWP. When receiving the first indication information, the terminal device may determine the first mapping relationship based on the second CC indicated by using the first indication information. In this case, a BWP ID in a MAC CE used to activate a TCI state may be all "0s". As described above, when one CC includes only one BWP, the CC and the BWP may be considered to be equivalent. The terminal device determines the first mapping relationship based on the second CC, or it may be considered that the terminal device determines the first mapping relationship based on the second BWP. In another implementation, the first indication information may alternatively be used to indicate the second CC and the second BWP, and the terminal device may determine the first mapping relationship based on the second CC and the second BWP that are indicated by using the first indication information.

When the first CC and the second CC are the different CCs, and the second CC includes a plurality of BWPs, the first indication information may be used to indicate the second CC and the second BWP. The terminal device may determine the first mapping relationship based on the second CC and the second BWP that are indicated by using the first indication information.

The following uses the format of the MAC CE shown in FIG. 3 as an example to describe a process of determining the first mapping relationship based on the second CC and/or the second BWP.

When determining the first mapping relationship based on the second CC and the second BWP, the terminal device may search, based on an ID of the second CC and an ID of the second BWP, for a MAC CE that can be used to determine the first mapping relationship. In the MAC CE used to determine the first mapping relationship, an ID of a serving cell is the ID of the second CC, an ID of a BWP is the ID of the second BWP, and $T_i$ whose indication bit is "1" indicates an activated TCI state. For example, when the second CC is the CC #1 described above and the second BWP is the BWP #1 described above, a TCI state 0 and TCI states 4 to 6 are activated, so that the mapping relationship shown in Table 2 may be obtained. The mapping relationship shown in Table 2 is an example of the first mapping relationship.

When determining the first mapping relationship based only on an ID of the second CC, the terminal device may search, based on the ID of the second CC, for a MAC CE that can be used to determine the first mapping relationship. In the MAC CE used to determine the first mapping relationship, an ID of a serving cell is the ID of the second CC, an ID of a BWP is all "0s", and $T_i$ whose indication bit is "1" indicates an activated TCI state.

In step 305, the network device determines the first mapping relationship based on the second CC and/or the second BWP.

A specific process in which the network device determines the first mapping relationship based on the second CC and/or the second BWP is similar to the specific process in which the terminal device determines the first mapping relationship based on the second CC and/or the second BWP. For brevity, details are not described herein again.

The foregoing describes in detail that the first mapping relationship is determined based on the second CC and/or the second BWP in different cases.

In this embodiment, the network device may determine to determine the first mapping relationship based on the second CC and/or the second BWP, and may indicate, by using signaling, the terminal device to determine the first mapping relationship based on the second CC and/or the second BWP.

Optionally, before step 304 and step 305, the method 300 further includes: The network device sends second indication information, where the second indication information is used to indicate to determine the first mapping relationship based on the second CC and/or the second BWP. Correspondingly, the terminal device receives the second indication information.

The second indication information may be understood as being used to explicitly indicate to determine the first mapping relationship based on the second CC and/or the second BWP.

In a possible design, the second indication information may be carried in an RRC message. For example, an information element (IE) is added to the RRC message, to be used to indicate to determine whether to determine the first mapping relationship based on the second CC and/or the second BWP. For example, the IE may occupy one bit. When the bit is set to "1", the IE may be used to indicate to determine the first mapping relationship based on the second CC and/or the second BWP, and when the IE is set to "0", the IE may be used to indicate not to determine the first mapping relationship based on the second CC and/or the second BWP. Alternatively, when the bit is set to "0", the IE may be used to indicate to determine the first mapping relationship based on the second CC and/or the second BWP, and when the IE is set to "1", the IE may be used to indicate not to determine the first mapping relationship based on the second CC and/or the second BWP. When the network device indicates the terminal device not to determine the first mapping relationship based on the second CC and/or the second BWP, the network device and the terminal device may pre-agree on another manner used to determine the first mapping relationship, for example, a manner of determining the first mapping relationship based on the first CC and/or the first BWP.

It should be understood that the enumerated indicating, by using the IE in an RRC message, whether to determine the first mapping relationship based on the second CC and/or the second BWP is only a possible implementation of the second indication information, and should not constitute any limitation on this application. A method for indicating, by using the second indication information, a specific method used to determine the first mapping relationship is not limited in this application.

In this embodiment, the network device and the terminal device may alternatively determine, based on a preset condition, whether to determine the first mapping relationship based on the second CC and/or the second BWP.

When the first indication information is DCI, and the downlink signal is carried on a PDSCH, because the first indication information is sent on a PDCCH through the DCI, a CC (namely, the first CC) or a BWP (namely, the first BWP) for sending the PDCCH is suitable for low frequency sending, and a CC (namely, the second CC) or a BWP (namely, the second BWP) for sending the PDSCH is suitable for high frequency sending. Reasons are as follows: When a signal is sent on a low frequency, a path loss is relatively small and signal strength is relatively high, the network device usually configures a wide beam for a CC in a low frequency band, and the wide beam can be used to improve angle domain coverage. Therefore, transmission robustness is high, and a control channel such as the PDCCH is suitable for sending. When a signal is sent on a high frequency, a bandwidth is relatively large and a transmission rate is relatively high, the network device usually configures a narrow beam for a CC in a high frequency band, and a signal-to-noise ratio or a signal to interference plus noise ratio during reception can be improved by using the narrow beam. Therefore, a throughput can be enhanced, and a data channel such as the PDSCH is suitable for sending. Usually, a TCI state configured by the network device for the low frequency band may correspond to transmission with a wide beam or without beamforming, and a TCI state configured by the network device for the high frequency band may correspond to transmission with a narrow beam. Therefore, when the first CC or the first BWP is in the low frequency band and the second CC or the second BWP is in the high frequency band, the first mapping relationship may be determined based on the second CC and/or the second BWP in the high frequency band.

Optionally, step 304 specifically includes: when the first CC and the second CC or the first BWP and the second BWP satisfy a first preset condition, determining, by the terminal device, the first mapping relationship based on the second CC and/or the second BWP.

Correspondingly, step 305 specifically includes: when the first CC and the second CC or the first BWP and the second BWP satisfy the first preset condition, determining, by the network device, the first mapping relationship based on the second CC and/or the second BWP.

The first preset condition includes any one of the following:
a. the first CC is in the low frequency band, and the second CC is in the high frequency band;
b. a band to which the first CC belongs is different from a band to which the second CC belongs;
c. the first CC and the second CC belong to a same band, but the first CC and the second CC are non-contiguous in frequency domain;
d. the first BWP is in the low frequency band, and the second BWP is in the high frequency band;
e. a band to which the first BWP belongs is different from a band to which the second BWP belongs;
f. the first BWP and the second BWP belong to a same band, but the first BWP and the second BWP are non-contiguous in frequency domain; or
g. a subcarrier spacing of the first BWP is different from a subcarrier spacing of the second BWP. In other words, the network device and the terminal device may determine, based on any one of the foregoing enumerated preset condition a, b, c, d, e, f, or g, whether to determine the first mapping relationship based on the second CC. When a preset condition enumerated above is used by default in the protocol, the network device and the terminal device may determine, based on a same preset condition, whether to determine the first mapping relationship based on the second CC and/or the second BWP.

The following describes in detail the preset conditions enumerated above.

a. The first CC is in the low frequency band, and the second CC is in the high frequency band.

In a possible implementation, the network device may indicate operating bands of the first CC and the second CC to the terminal device by using signaling. When an operating band of the first CC is less than a predetermined threshold such as 6 GHz, it may be considered that the first CC is in the low frequency band. When an operating band of the first CC is greater than or equal to a predetermined threshold such as 6 GHz, it may be considered that the first CC is in the high frequency band. Similarly, when an operating band of the second CC is lower than a preset threshold such as 6 GHz, it may be considered that the second CC is in the low frequency band. When an operating band of the second CC is higher than or equal to a preset threshold such as 6 GHz, it may be considered that the second CC is in the high frequency band.

Specifically, the network device may indicate the bands of the first CC and the second CC to the terminal device by using at least one of the following enumerated configuration information:
(1) a parameter used to indicate an actually transmitted or measured SSB, for example, SSB-transmitted or SSB-measured;
(2) a related parameter used to indicate a subcarrier spacing (SCS), for example, remaining system information (RMSI)-scs or SSB-scs; and
(3) a related parameter used to indicate a physical layer parameter set, also referred to as a numerology related parameter, for example, DL-BWP-µ (downlink bandwidth part-µ).

The network device may deliver the configuration information by using an RRC message or another message such as a system message or a broadcast message. In addition, the network device may alternatively directly deliver the foregoing parameters to the terminal device. A specific manner in which the network device delivers the configuration information is not limited in this application.

For ease of understanding, the following enumerates the foregoing configuration information and several examples of determining an operating band based on the foregoing configuration information.

Table 3 shows a correspondence between an indication bit length of SSB-transmitted and an operating band.

TABLE 3

| Parameter name | Bit length (bit) | Operating band (GHz) |
| --- | --- | --- |
| SSB-transmitted | 4 | <3 GHz |
|  | 8 | 3-6 GHz |
|  | 64 | >6 GHz |

Table 4 shows a correspondence between RMSI-scs and an operating band.

TABLE 4

| SCS indicated by using RMSI-scs (kHz) | Operating band (GHz) |
| --- | --- |
| 15 | <6 |
| 30 | <6 |
| 60 | >6 |
| 120 | >6 |

Table 5 shows a correspondence between SSB-scs and an operating band.

TABLE 5

| SCS indicated by using SSB-scs (kHz) | Operating band (GHz) |
| --- | --- |
| 15 | <6 |
| 30 | <6 |
| 120 | >6 |
| 240 | >6 |

Table 6 shows a correspondence between DL-BWP-$\mu$ and an operating band.

TABLE 6

| DL-BWP-$\mu$ | Operating band (GHz) |
| --- | --- |
| 0 | <6 |
| 1 | <6 |
| 2 | <6 |
| 3 | <6 |
| 4 | >6 |
| 5 | >6 | b. The band to which the first CC belongs is different from the band to which the second CC belongs.

Herein, bands may be understood as operating bands allocated to operators. Bands to which CCs belong may be predefined, and for example, defined in the protocol. For bands of a same operator, if the band, for example, denoted as a band #1, to which the first CC belongs and the band, for example, denoted as a band #2, to which the second CC belongs are different bands, the band #1 and the band #2 may be two bands that are relatively far away from each other in frequency domain. For example, one band is in the low frequency band, and the other band is in the high frequency band. Usually, the network device selects a high-frequency band to send control signaling. To be specific, the band #1 may be in the low frequency band, and the band #2 that is relatively far away from the band #1 may be in the high frequency band.

c. The first CC and the second CC belong to the same band, but the first CC and the second CC are non-contiguous in frequency domain.

As described above, bands to which the CCs belong may be predefined, and for example, defined in the protocol. When the first CC and the second CC belong to the same band, if the two CCs are non-contiguous in frequency domain, the two CCs may be relatively far away from each other in frequency domain. For example, one CC is in the low frequency band, and the other CC is in the high frequency band. Usually, the network device selects a low-frequency frequency domain resource to send control signaling. In this case, the first CC may be in the low frequency band, and the second CC that is relatively far away from the first CC may be in the high frequency band.

d. The first BWP is in the low frequency band, and the second BWP is in the high frequency band.

When the first BWP and the second BWP belong to different CCs, if the first CC is in the low frequency band, and the second CC is in the high frequency band, the first BWP is in the low frequency band, and the second BWP is in the high frequency band. That is, when the first CC and the second CC satisfy the condition a, the first BWP and the second BWP satisfy the condition d. The terminal device may determine the first mapping relationship based on the second CC and/or the second BWP.

When the first BWP and the second BWP belong to a same CC, the first BWP and the second BWP belong to a same band.

In a possible implementation, the terminal device may determine operating bands of the first BWP and the second BWP based on CCs to which the first BWP and the second BWP respectively belong. For example, when the first CC is in the high frequency band, the first BWP is also in the high frequency band. When the second CC is in the low frequency band, the second BWP is also in the low frequency band. The network device may indicate, by using signaling, operating bands of the CCs. The foregoing describes in detail the specific process in which the network device indicates, by using the signaling, the operating bands of the CCs. For brevity, details are not described herein again.

When an operating band of the first BWP is less than a predetermined threshold such as 6 GHz, it may be considered that the first BWP is in the low frequency band. When an operating band of the first BWP is greater than or equal to a predetermined threshold such as 6 GHz, it may be considered that the first BWP is in the high frequency band. Similarly, when an operating band of the second BWP is lower than a preset threshold such as 6 GHz, it may be considered that the second BWP is in the low frequency band. When an operating band of the second BWP is higher than or equal to a preset threshold such as 6 GHz, it may be considered that the second BWP is in the high frequency band.

e. The band to which the first BWP belongs is different from the band to which the second BWP belongs.

When the first BWP and the second BWP belong to the different CCs, if the band to which the first CC belongs is different from the band to which the second CC belongs, the band to which the first BWP belongs is definitely different from the band to which the second BWP belongs. That is, when the first CC and the second CC satisfy the condition b, the first BWP and the second BWP satisfy the condition e.

When the first BWP and the second BWP belong to the same CC, the first BWP and the second BWP belong to the same band.

f. The first BWP and the second BWP belong to the same band, but the first BWP and the second BWP are non-contiguous in frequency domain.

When the first BWP and the second BWP belong to the different CCs, if the band to which the first CC belongs and the band to which the second CC belongs are a same band, and the first CC and the second CC are non-contiguous in frequency domain, the band to which the first BWP belongs and the band to which the second BWP belongs are also a same band, and the first BWP and the second BWP are non-contiguous in frequency domain. That is, when the first CC and the second CC satisfy the condition c, the first BWP and the second BWP satisfy the condition f.

When the first BWP and the second BWP belong to the same CC, the first BWP and the second BWP may be non-contiguous in frequency domain. When the first BWP and the second BWP belong to the same band, but the first BWP and the second BWP are relatively far away from each other in frequency domain, for example, one BWP is located in the low frequency band, and the other BWP is in the high frequency band, usually, the network device selects the low-frequency frequency domain resource to send the control signaling. In this case, the first BWP may be in the low frequency band, and the second BWP that is relatively far away from the first BWP may be in the high frequency band.

g. The subcarrier spacing of the first BWP is different from the subcarrier spacing of the second BWP.

When the subcarrier spacing of the first BWP is different from the subcarrier spacing of the second BWP, the first BWP and the second BWP are different BWPs. In addition, when the two BWPs are the different BWPs, positions in frequency domain are different. For example, a subcarrier spacing in the low frequency band is small, for example, 15 kHz or 30 kHz, and a subcarrier spacing in the high frequency band is large, for example, 60 kHz or 120 kHz. When the subcarrier spacing of the first BWP is different from the subcarrier spacing of the second BWP, one subcarrier spacing may be in the low frequency band, and the other subcarrier spacing may be in the high frequency band. Usually, the network device selects the low-frequency frequency domain resource to send the control signaling. In this case, the first BWP may be in the low frequency band, and the second BWP may be in the high frequency band.

It should be noted that when the first CC includes only one BWP and the second CC includes only one BWP, because the CC is equivalent to the BWP, that the subcarrier spacing of the first BWP is different from the subcarrier spacing of the second BWP may be understood as that a subcarrier spacing of the first CC is different from a subcarrier spacing of the second CC.

The foregoing preset conditions b and c may be understood as several possible cases of the preset condition a, or may be understood as possible implementations of determining whether the preset condition a is satisfied, and the preset conditions e, f, and g may be understood as several possible cases of the preset condition d. However, it should be understood that a preset condition used to determine whether the first mapping relationship is determined based on the second CC and/or the second BWP is not limited to the foregoing enumerated conditions. To send a data channel on a high frequency as much as possible, all methods used to determine whether the first mapping relationship is determined based on the second CC and/or the second BWP should fall within the protection scope of this application.

Optionally, the method 300 further includes step 306: The network device sends a TCI, where the TCI is used to indicate a selected TCI state. Correspondingly, in step 306, the terminal device receives the TCI.

Specifically, the TCI may be used to indicate the selected TCI state from the first mapping relationship.

Optionally, the TCI may be carried in DCI. That is, step 306 specifically includes: The network device sends the DCI, where the DCI includes the TCI, and the TCI is used to indicate the selected TCI state. Correspondingly, the terminal device receives the DCI, where the DCI includes the TCI, and the TCI is used to indicate the selected TCI state.

As described above, in a possible case, the first indication information may be carried in DCI. The DCI used to carry the first indication information and the DCI used to carry the TCI may be same DCI, or may be different DCI. This is not limited in this application.

Optionally, the TCI may be preconfigured. For example, the terminal device and the network device agree on the TCI and locally store the TCI in advance.

In step 307, the terminal device determines the TCI state based on the first mapping relationship and the TCI.

Specifically, the terminal device may determine the TCI state based on a value in a TCI field and the first mapping relationship (for example, Table 2 above) described above. For example, when the value in the TCI field is "010", the TCI state 5 may be determined based on the first mapping relationship. In other words, the terminal device may determine the receive beam based on a configuration in the TCI state 5.

Correspondingly, in step 308, the network device determines the TCI state based on the first mapping relationship and the TCI.

Specifically, a specific process in which the network device determines the TCI state based on the first mapping relationship and the TCI may be the same as the specific process in which the terminal device determines the TCI state based on the first mapping relationship and the TCI. For brevity, details are not described herein again.

In addition, the specific method for indicating, by the network device, the TCI state by using the TCI is described in detail above. For brevity, details are not described herein again.

In step 309, the terminal device determines, based on the TCI state, the receive beam used to receive the downlink signal.

As described above, the terminal device has stored, in a beam training process, a pairing relationship between a reference signal resource identifier and the receive beam. After the TCI state is determined, the receive beam may be determined based on a reference signal resource identifier indicated by using the TCI state.

In step 310, the network device determines, based on the TCI state, a transmit beam used to send the downlink signal.

Corresponding to the terminal device, the network device has stored, in the beam training process, a pairing relationship between the reference signal resource identifier and the transmit beam. After the TCI state is determined, the transmit beam may be determined based on the reference signal resource identifier indicated by using the TCI state.

In step 311, the network device sends the downlink signal by using the transmit beam. Correspondingly, in step 311, the terminal device receives the downlink signal by using the receive beam.

A specific process in which the network device sends the downlink signal by using the transmit beam and a specific process in which the terminal device receives the downlink signal by using the receive beam may be the same as those in the prior art. For brevity, detailed description of the specific processes is omitted herein.

Based on the foregoing technical solution, the network device and the terminal device may determine the TCI state based on a same mapping relationship, and separately determine the transmit beam and the receive beam based on a same TCI state. Because the transmit beam and the receive beam that are determined based on the TCI state are paired beams that are pre-determined through beam training, it can be ensured that a relatively large beamforming gain can be obtained during downlink signal transmission, thereby helping improve downlink signal transmission quality.

It should be understood that sequence numbers of the foregoing processes do not mean an execution sequence in this embodiment of this application. The execution sequence of the processes should be determined according to functions and internal logic of the processes, and should not be construed as any limitation on the implementation processes of this embodiment of this application. For example, step 305 is not necessarily performed after step 303, and step 305 may be performed before step 303. Step 307 is not necessarily performed after step 306, and step 307 may alternatively be performed before step 306.

It should be further understood that a method for determining the first mapping relationship by the network device and the terminal device is not limited to the foregoing description in step 304 and step 305. This application further provides a method that may also be used by the network device and the terminal device to determine the first mapping relationship.

Figure 6:
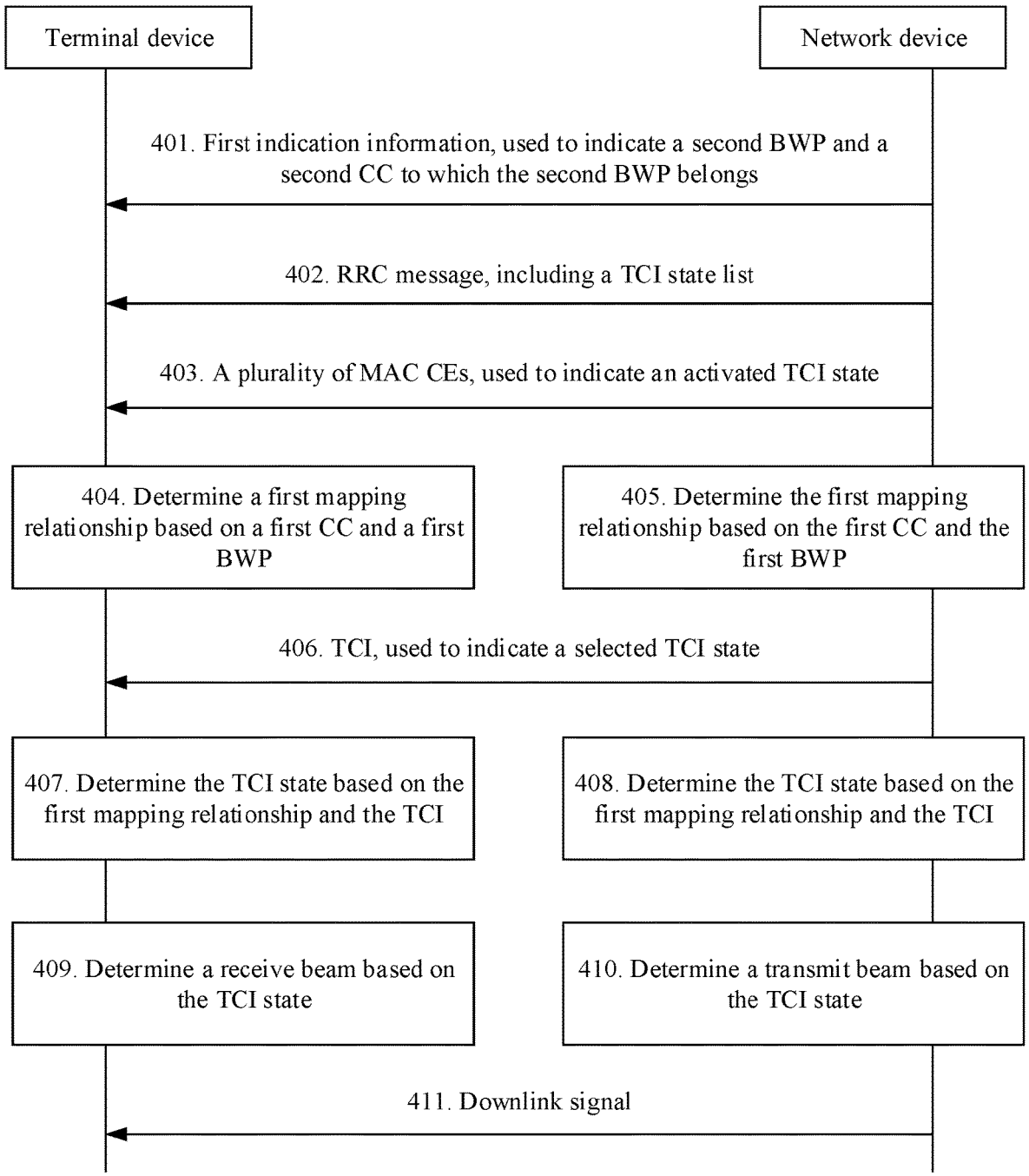
FIG. 6 is a schematic flowchart of a signal receiving and sending method according to another embodiment of this application.

FIG. 6 is a schematic flowchart of a signal sending and receiving method 400 according to another embodiment of this application from a perspective of device interaction. As shown in the figure, the method 400 shown in FIG. 6 may include step 401 to step 411. The following describes steps in the method 400 in detail with reference to FIG. 6.

In step 401, a network device sends first indication information in a first BWP on a first CC, where the first indication information is used to indicate a second BWP for transmitting a downlink signal and/or a second CC to which the second BWP belongs. Correspondingly, in step 401, a terminal device receives the first indication information in the first BWP on the first CC.

For ease of differentiation and description, in this embodiment, a BWP in which the network device sends the first indication information is denoted as the first BWP, and the first BWP belongs to the first CC; and a BWP in which the network device sends the downlink signal is denoted as the second BWP, and the second BWP belongs to the second CC. BWPs may be distinguished by using different identifiers. That is, different BWPs correspond to different BWP IDs. CCs may also be distinguished by using different identifiers. That is, different CCs correspond to different CC IDs.

For example, the first CC may be the CC #0 described above, the first BWP may be the BWP #0 described above, the second CC may be the CC #1 described above, and the second BWP may be the BWP #1 described above.

It should be understood that the first CC, the first BWP, the second CC, and the second BWP that are enumerated above are merely examples, and should not constitute any limitation on this application. The first CC and the second CC may be a same CC, or may be different CCs. Regardless of whether the first CC and the second CC are the same CC, the first BWP and the second BWP are different BWPs. In other words, a frequency domain resource used to transmit the first indication information and a frequency domain resource used to transmit the downlink signal belong to different BWPs.

An indication field in the first indication information may include an indication field of a CC and/or an indication field of a BWP. Therefore, the first indication information may be used to indicate only the second CC, or may be used to indicate only the second BWP, or may indicate the second CC and the second BWP. Specifically, when the first CC and the second CC are the same CC, the first indication information may include only an indication field of the second BWP, or may include an indication field of the second CC and an indication field of the second BWP. When the first CC and the second CC are the different CCs, and the second CC includes only one BWP, namely, the second BWP, the first indication information may include only an indication field of the second CC, or may include an indication field of the second CC and an indication field of the second BWP. When the first CC and the second CC are the different CCs, and the second CC includes a plurality of BWPs, the first indication information may include an indication field of the second CC and an indication field of the second BWP.

Because a specific process of step 401 is similar to that of step 301 in the method 300, and step 301 has been described in detail above, for brevity, details are not described herein again.

Optionally, the method 400 further includes step 402: The network device sends an RRC message, where the RRC message includes a TCI state list, and the TCI state list includes a plurality of TCI states. Correspondingly, in step 402, the terminal device receives the RRC message.

Optionally, the method 400 further includes step 403: The terminal device receives a plurality of MAC CEs, where each of the plurality of MAC CEs is used to indicate at least one mapping relationship and a corresponding CC and BWP. The plurality of MAC CEs may be sent by a same network device to the terminal device, or may be sent by a plurality of network devices to the terminal device. This is not limited in this application.

It should be understood that a specific process of step 402 and step 403 is similar to that of step 302 and step 303 in the method 300. Because step 302 and step 303 have been described in detail in the foregoing method 300, for brevity, details are not described herein again.

In step 404, the terminal device determines a first mapping relationship based on the first CC and/or the first BWP.

Specifically, because the terminal device may know in advance the first CC and the first BWP for receiving the first indication information, when the first CC includes a plurality of BWPs, the terminal device may directly determine the first mapping relationship based on the first CC and the first BWP. When the first CC includes only one BWP (namely, the first BWP), the terminal device may determine the first mapping relationship based only on the first CC, or determine the first mapping relationship based only on the first BWP. Therefore, the terminal device may determine the first mapping relationship in a plurality of mapping relationships based on the first CC and/or the first BWP.

For example, a MAC CE that may be used to determine the first mapping relationship may be found based on a format of the MAC CE. In this embodiment, in the MAC CE used to determine the first mapping relationship, an ID of a serving cell is an ID of the first CC, an ID of a BWP is an ID of the first BWP, and $T_i$ whose indication bit is "1" indicates an activated TCI state. For example, when the first CC is the CC #0 described above and the first BWP is the BWP #0 described above, TCI states 0 to 7 are activated, so that the mapping relationship shown in Table 1 may be obtained. The mapping relationship shown in Table 1 is another example of the first mapping relationship.

When the first CC and the second CC are the different CCs, and the first CC includes only one BWP (namely, the first BWP), in the MAC CE used to determine the first mapping relationship, the ID of the serving cell is the ID of the first CC, and the ID of the BWP is all "0s".

Correspondingly, in step 405, the network device determines the first mapping relationship based on the first CC and/or the first BWP.

A specific process in which the network device determines the first mapping relationship based on the first CC and/or the first BWP is similar to the specific process in which the terminal device determines the first mapping relationship based on the first CC and/or the first BWP. For brevity, details are not described herein again.

In this embodiment, the network device may determine to determine the first mapping relationship based on the first CC and/or the first BWP, and may indicate, by using signaling, the terminal device to determine the first mapping relationship based on the first CC and/or the first BWP.

Optionally, before step 404 and step 405, the method 300 further includes: The network device sends third indication information, where the third indication information is used to indicate to determine the first mapping relationship based on the first CC and/or the first BWP. Correspondingly, the terminal device receives the third indication information.

The third indication information may be understood as being used to explicitly indicate to determine the first mapping relationship based on the first CC and/or the first BWP.

In a possible design, the third indication information may be carried in an RRC message. For example, an IE is added to the RRC message, to be used to indicate to determine whether to determine the first mapping relationship based on the first CC and/or the first BWP. For example, the IE may occupy one bit. When the bit is set to "1", the IE may be used to indicate to determine the first mapping relationship based on the first CC and/or the first BWP, and when the IE is set to "0", the IE may be used to indicate not to determine the first mapping relationship based on the first CC and/or the first BWP. Alternatively, when the bit is set to "0", the IE may be used to indicate to determine the first mapping relationship based on the first CC and/or the first BWP, and when the IE is set to "1", the IE may be used to indicate not to determine the first mapping relationship based on the first CC and/or the first BWP. When the network device indicates the terminal device not to determine the first mapping relationship based on the first CC and/or the first BWP, the network device and the terminal device may pre-agree on another manner used to determine the first mapping relationship, for example, a manner of determining the first mapping relationship based on the second CC.

It should be understood that the enumerated indicating, by using the IE in an RRC message, whether to determine the first mapping relationship based on the first CC and/or the first BWP is only a possible implementation of the third indication information, and should not constitute any limitation on this application. A method for indicating, by using the third indication information, a specific method used to determine the first mapping relationship is not limited in this application.

In this embodiment, the network device and the terminal device may alternatively determine, based on a preset condition, whether to determine the first mapping relationship based on the first CC and/or the first BWP.

When the first indication information is DCI, and the downlink signal is carried on a PDSCH, because the first indication information is sent on a PDCCH through the DCI, a CC (namely, the first CC) or a BWP (namely, the first BWP) for sending the PDCCH is suitable for low frequency sending, and a CC (namely, the second CC) or a BWP (namely, the second BWP) for sending the PDSCH is suitable for high frequency sending. Reasons are as follows:

When a signal is sent on a low frequency, a path loss is relatively small and signal strength is relatively high, the network device usually configures a wide beam for a CC in a low frequency band, and the wide beam can be used to improve angle domain coverage. Therefore, transmission robustness is high, and a control channel such as the PDCCH is suitable for sending. When a signal is sent on a high frequency, a bandwidth is relatively large and a transmission rate is relatively high, the network device usually configures a narrow beam for a CC in a high frequency band, and a signal-to-noise ratio or a signal to interference plus noise ratio during reception can be improved by using the narrow beam. Therefore, a throughput can be enhanced, and a data channel such as the PDSCH is suitable for sending. Usually, a TCI state configured by the network device for the low frequency band may correspond to transmission with a wide beam or without beamforming, and a TCI state configured by the network device for the high frequency band may correspond to transmission with a narrow beam. Therefore, when the first CC or the first BWP is in the low frequency band and the second CC or the second BWP is in the high frequency band, the first mapping relationship may be determined based on the first CC and/or the first BWP in the low frequency band.

Optionally, step 404 specifically includes: when the first CC and the second CC or the first BWP and the second BWP satisfy a second preset condition, determining, by the terminal device, the first mapping relationship based on the first CC and/or the first BWP.

Correspondingly, step 405 specifically includes: when the first CC and the second CC satisfy the second preset condition, determining, by the network device, the first mapping relationship based on the first CC and/or the first BWP.

The second preset condition includes any one of the following:
i. both the first CC and the second CC are in the low frequency band or the high frequency band;
ii. a band to which the first CC belongs is the same as a band to which the second CC belongs;
iii. a band to which the first CC belongs is the same as a band to which the second CC belongs, and the first CC and the second CC are contiguous in frequency domain;
iv. both the first BWP and the second BWP are in the low frequency band or the high frequency band;
v. a band to which the first BWP belongs is the same as a band to which the second BWP belongs;
vi. a band to which the first BWP belongs is the same as a band to which the second BWP belongs, and the first BWP and the second BWP are contiguous in frequency domain; or
vii. a subcarrier spacing of the first BWP is the same as a subcarrier spacing of the second BWP.

In other words, the network device and the terminal device may determine, based on any one of the foregoing enumerated preset condition i, ii, iii, iv, v, vi, or vii, whether to determine the first mapping relationship based on the first CC and/or the first BWP. When a preset condition enumerated above is used by default in a protocol, the network device and the terminal device may determine, based on a same preset condition, whether to determine the first mapping relationship based on the first CC and/or the first BWP.

The following describes in detail the preset conditions enumerated above.

i. Both the first CC and the second CC are in the low frequency band or the high frequency band.

When both the first CC and the second CC are in the low frequency band, because there is no available resource in the high frequency band, the first mapping relationship may be directly determined based on the first CC and/or the first BWP. When both the first CC and the second CC are in the high frequency band, both the first CC and the second CC are suitable for data channel sending. Therefore, the first mapping relationship may be directly determined based on the first CC and/or the first BWP.

The method for determining, by the terminal device, the bands of the first CC and the second CC has been described in detail in the foregoing method 300. For brevity, details are not described herein again.

ii. The band to which the first CC belongs is the same as the band to which the second CC belongs.

When the band to which the first CC belongs is the same as the band to which the second CC belongs, both the first CC and the second CC are quite possible to be in the low frequency band or the high frequency band. Therefore, the first mapping relationship may be directly determined based on the first CC and/or the first BWP. iii. The band to which the first CC belongs is the same as the band to which the second CC belongs, and the first CC and the second CC are contiguous in frequency domain.

When the band to which the first CC belongs is the same as the band to which the second CC belongs, and the first CC and the second CC are contiguous in frequency domain, there is a quite high possibility that both the first CC and the second CC are in the low frequency band or the high frequency band. Therefore, the first mapping relationship may be directly determined based on the first CC and/or the first BWP.

iv. Both the first BWP and the second BWP are in the low frequency band or the high frequency band.

When both the first BWP and the second BWP are in the low frequency band, because there is no available resource in the high frequency band, the first mapping relationship may be directly determined based on the first CC and/or the first BWP. When both the first BWP and the second BWP are in the high frequency band, both the first CC and the second CC are suitable for data channel sending. Therefore, the first mapping relationship may be directly determined based on the first CC and/or the first BWP.

It should be noted that when the first BWP and the second BWP belong to different CCs, if both the first CC and the second CC are in the low frequency band, both the first BWP and the second BWP are also in the low frequency band; or if both the first CC and the second CC are in the high frequency band, both the first BWP and the second BWP are also in the high frequency band. That is, when the first CC and the second CC satisfy the condition i, the first BWP and the second BWP definitely satisfy the condition iv.

The method for determining, by the terminal device, the bands of the first BWP and the second BWP has been described in detail in the foregoing method 300. For brevity, details are not described herein again.

v. The band to which the first BWP belongs is the same as the band to which the second BWP belongs.

When the band to which the first BWP belongs is the same as the band to which the second BWP belongs, both the first BWP and the second BWP are quite possible to be in the low frequency band or the high frequency band. Therefore, the first mapping relationship may be directly determined based on the first CC and/or the first BWP.

It should be noted that when the first BWP and the second BWP belong to the different CCs, if the band to which the first CC belongs is the same as the band to which the second CC belongs, the band to which the first BWP belongs is definitely the same as the band to which the second BWP belongs. That is, when the first CC and the second CC satisfy the condition ii, the first BWP and the second BWP definitely satisfy the condition v.

vi. The band to which the first BWP belongs is the same as the band to which the second BWP belongs, and the first BWP and the second BWP are contiguous in frequency domain.

vii. The subcarrier spacing of the first BWP is the same as the subcarrier spacing of the second BWP.

When the subcarrier spacing of the first BWP is the same as the subcarrier spacing of the second BWP, both the first BWP and the second BWP may be in the low frequency band or the high frequency band. The terminal device may directly determine the first mapping relationship based on the first CC and/or the first BWP. It should be noted that when the first CC includes only one BWP and the second CC includes only one BWP, because the CC is equivalent to the BWP, that the subcarrier spacing of the first BWP is same as the subcarrier spacing of the second BWP may be understood as that a subcarrier spacing of the first CC is same as a subcarrier spacing of the second CC.

The foregoing preset conditions ii and iii may be understood as several possible cases of the preset condition i, or may be understood as possible implementations of determining whether the preset condition i is satisfied, and the preset conditions iv, v, vi and vii may be understood as several possible cases of the preset condition iv, or may be understood as possible implementations of determining whether the preset condition iv is satisfied. However, it should be understood that a preset condition used to determine whether the first mapping relationship is determined based on the first CC and/or the first BWP is not limited to the foregoing enumerated conditions. To send a data channel on a high frequency as much as possible, all methods used to determine whether the first mapping relationship is determined based on the first CC and/or the first BWP should fall within the protection scope of this application.

Optionally, the method 400 further includes step 406: The network device sends a TCI, where the TCI is used to indicate a selected TCI state. Correspondingly, in step 406, the terminal device receives the TCI.

It should be understood that a specific process of step 406 is similar to the specific process of step 306 in the foregoing method 300. Because step 306 has been described in detail above, for brevity, details are not described herein again.

Optionally, the TCI may be preconfigured. For example, the terminal device and the network device agree on the TCI and locally store the TCI in advance.

In step 407, the terminal device determines the TCI state based on the first mapping relationship and the TCI.

Specifically, the terminal device may determine the TCI state based on a value in a TCI field and the first mapping relationship (for example, Table 1 above) described above. For example, when the value in the TCI field is "010", the TCI state 2 may be determined based on Table 1. In other words, the terminal device may determine a receive beam based on a configuration in the TCI state 2 in the following step 409.

Correspondingly, in step 408, the network device determines the TCI state based on the first mapping relationship and the TCI.

It should be understood that a specific process in which the network device determines the TCI state based on the first mapping relationship and the TCI may be the same as the specific process in which the terminal device determines the TCI state based on the first mapping relationship and the TCI. For brevity, details are not described herein again.

In step 409, the terminal device determines, based on the TCI state, the receive beam for receiving the downlink signal.

Correspondingly, in step 410, the network device determines, based on the TCI state, a transmit beam for sending the downlink signal.

It should be understood that a specific process of step 409 and step 410 is similar to the specific process of step 309 and step 310 in the foregoing method 300. Because step 309 and step 310 have been described in detail above, for brevity, details are not described herein again.

In step 411, the network device sends the downlink signal by using the transmit beam. Correspondingly, in step 411, the terminal device receives the downlink signal by using the receive beam.

A specific process in which the network device sends the downlink signal by using the transmit beam and a specific process in which the terminal device receives the downlink signal by using the receive beam may be the same as those in the prior art. For brevity, detailed description of the specific processes is omitted herein.

Based on the foregoing technical solution, the network device and the terminal device may determine the TCI state based on a same mapping relationship, and separately determine the transmit beam and the receive beam based on a same TCI state. Because the transmit beam and the receive beam that are determined based on the TCI state are paired beams that are pre-determined through beam training, it can be ensured that a relatively large beamforming gain can be obtained during downlink signal transmission, thereby helping improve downlink signal transmission quality.

It should be understood that sequence numbers of the foregoing processes do not mean an execution sequence in this embodiment of this application. The execution sequence of the processes should be determined according to functions and internal logic of the processes, and should not be construed as any limitation on the implementation processes of this embodiment of this application. For example, step 405 is not necessarily performed after step 403, and step 405 may be performed before step 403. Step 407 is not necessarily performed after step 406, and step 407 may alternatively be performed before step 406.

The foregoing enumerates two methods for determining the first mapping relationship. In the method 300, the network device and the terminal device determine the first mapping relationship based on a scheduled CC (namely, the second CC). For ease of differentiation and description, the method is denoted as a method 1 below. In the method 400, the network device and the terminal device determine the first mapping relationship based on a CC (namely, the first CC) for sending the first indication information. For ease of differentiation and description, the method is denoted as a method 2 below.

As described above, transmitting the control channel in the low frequency band can ensure robustness, and transmitting the data channel in the high frequency band can improve a throughput. Therefore, the network device and the terminal device may further determine, based on locations, in a band, of a scheduled frequency domain resource and a frequency domain resource for sending signaling, a method used to determine the first mapping relationship.

Figure 7:
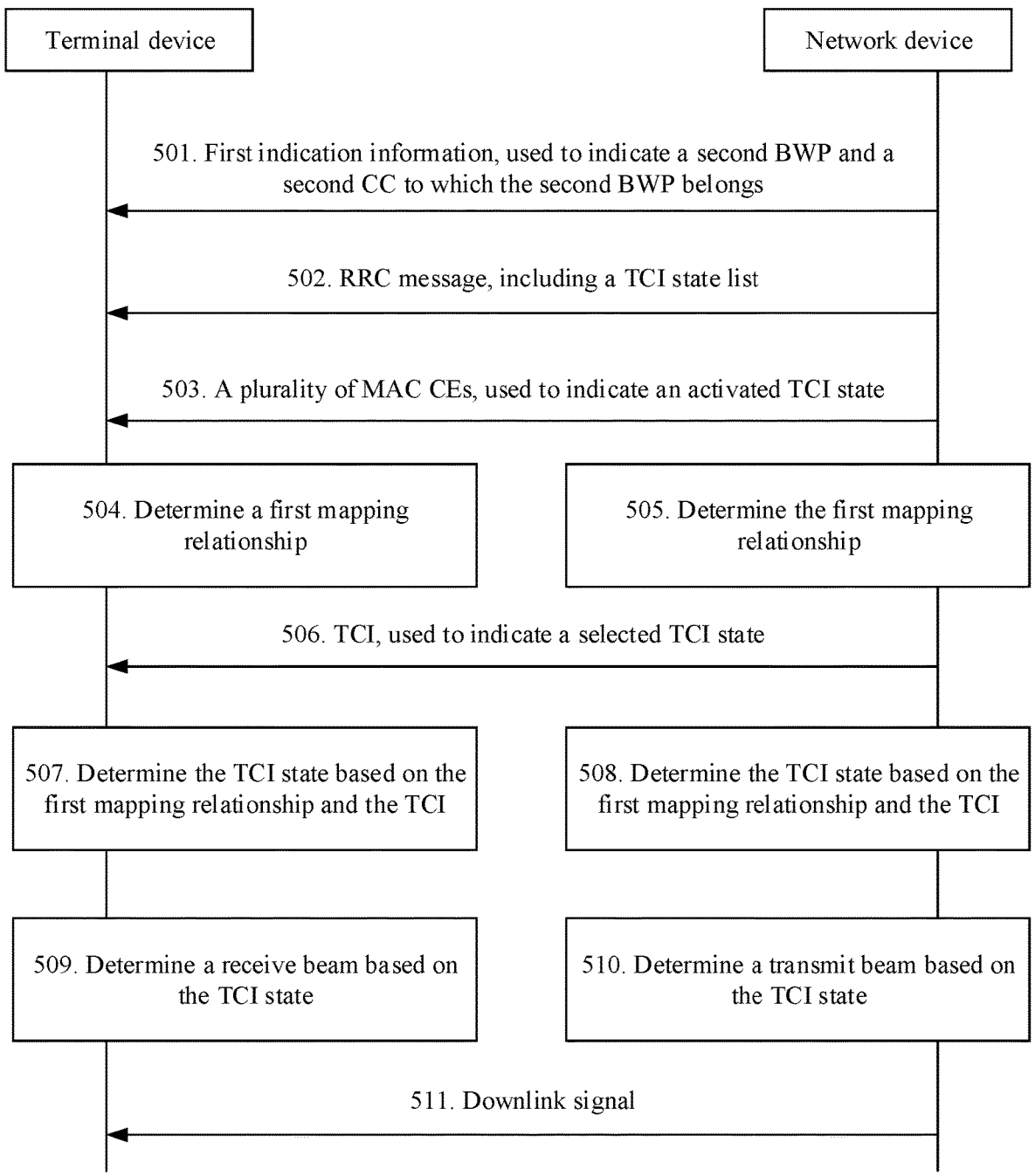
FIG. 7 is a schematic flowchart of a signal receiving and sending method according to still another embodiment of this application.

FIG. 7 is a schematic flowchart of a signal receiving and sending method 500 according to still another embodiment of this application from a perspective of device interaction. As shown in the figure, the method 500 shown in FIG. 7 may include step 501 to step 511. The following describes steps in the method 500 in detail with reference to FIG. 7.

In step 501, a network device sends first indication information in a first BWP on a first CC, where the first indication information is used to indicate a second BWP for transmitting a downlink signal and a second CC to which the second BWP belongs. Correspondingly, in step 501, a terminal device receives the first indication information in the first BWP on the first CC.

A specific process of step 501 is same as the specific process of step 301 in the foregoing method 300. Because step 301 has been described in detail above, for brevity, details are not described herein again.

After receiving the first indication information, the terminal device may determine to receive the downlink signal in the second BWP on the second CC. Before receiving the downlink signal, the terminal device may further determine a receive beam based on a TCI state indicated by using a received TCI.

Optionally, the method 500 further includes step 502: The network device sends an RRC message, where the RRC message includes a TCI state list, and the TCI state list includes a plurality of TCI states. Correspondingly, in step 502, the terminal device receives the RRC message.

Optionally, the method 500 further includes step 503: The terminal device receives a plurality of MAC CEs, where each of the plurality of MAC CEs is used to indicate at least one mapping relationship and a corresponding CC and BWP. The plurality of MAC CEs may be sent by a same network device to the terminal device, or may be sent by a plurality of network devices to the terminal device. This is not limited in this application.

It should be understood that a specific process of step 502 and step 503 is similar to that of step 302 and step 303 in the method 300. Because step 302 and step 303 have been described in detail in the foregoing method 300, for brevity, details are not described herein again.

In step 504, the terminal device determines a first mapping relationship, where the first mapping relationship is a mapping relationship determined based on the first CC and/or the first BWP or a mapping relationship determined based on the second CC and/or the second BWP.

After receiving the plurality of MAC CEs, the terminal device may determine the first mapping relationship in the plurality of mapping relationships indicated by using the plurality of MAC CEs. In the embodiment provided in the foregoing method 400, the terminal device may determine the first mapping relationship based on the first CC and/or the first BWP, namely, the foregoing method 2. In the embodiment provided in the foregoing method 300, the terminal device may determine the first mapping relationship based on the second CC and/or the second BWP, namely, the foregoing method 1. Therefore, in step 502, the terminal device may determine whether the first mapping relationship is determined based on the method 2, that is, based on the first CC and/or the first BWP, or determined based on the method 1, that is, based on the second CC and/or the second BWP.

Optionally, step 504 specifically includes:
determining, by the terminal device, whether to determine the first mapping relationship based on the method 1 or the method 2; and
determining, by the terminal device, the first mapping relationship based on the determined method.

In this embodiment, the network device may determine whether to determine the first mapping relationship based on the method 1 or the method 2, and may notify, by using signaling, the terminal device to determine the first mapping relationship based on a same method.

Optionally, step 504 specifically includes:

receiving, by the terminal device, fourth indication information, where the fourth indication information is used to indicate whether the first mapping relationship is determined based on the method 1 or the method 2; and correspondingly, sending, by the network device, the fourth indication information; and determining, by the terminal device, the first mapping relationship based on the method indicated by using the fourth indication information.

In a possible design, the fourth indication information may be carried in an RRC message. For example, an IE is added to the RRC message, to be used to indicate whether the method for determining the first mapping relationship is the method 1 or the method 2. For example, the IE may occupy one bit. When the bit is set to "0", the method 1 may be indicated, and when the bit is set to "1", the method 2 may be indicated. Alternatively, when the bit is set to "1", the method 1 may be indicated, and when the bit is set to "0", the method 2 may be indicated.

It should be understood that the enumerated method for indicating, by using the IE in an RRC message, the method used to determine the first mapping relationship is merely a possible implementation, and shall not constitute any limitation on this application. A method for indicating, by using the fourth indication information, a specific method used to determine the first mapping relationship is not limited in this application.

It should be further understood that the fourth indication information and the second indication information in the method 300 may be information carried in a same field in same signaling, or may be information carried in different signaling or different fields. The fourth indication information and the third indication information in the method 400 may be information carried in a same field in same signaling, or may be information carried in different signaling or different fields. This is not limited in this application.

Correspondingly, in step 505, the network device determines the first mapping relationship.

Optionally, step 505 specifically includes: determining, by the network device, the first mapping relationship based on the method indicated by using the fourth indication information.

In this embodiment, the network device and the terminal device may determine, based on frequency domain positions of the first CC and the second CC, whether to determine the first mapping relationship based on the method 1 or the method 2.

Optionally, when the first CC and the second CC or the first BWP and the second BWP satisfy a first preset condition, it is determined that the first mapping relationship is determined based on the first method.

The first preset condition includes any one of the following:

a. the first CC is in a low frequency band, and the second CC is in a high frequency band;
b. a band to which the first CC belongs is different from a band to which the second CC belongs;
c. the first CC and the second CC belong to a same band, but the first CC and the second CC are non-contiguous in frequency domain;
d. the first BWP is in a low frequency band, and the second BWP is in a high frequency band;
e. a band to which the first BWP belongs is different from a band to which the second BWP belongs;
f. the first BWP and the second BWP belong to a same band, but the first BWP and the second BWP are non-contiguous in frequency domain; or
g. a subcarrier spacing of the first BWP is different from a subcarrier spacing of the second BWP.

In the foregoing method 300, detailed descriptions have been provided with reference to the foregoing preset conditions. For brevity, details are not described herein again.

Optionally, when the first CC and the second CC or the first BWP and the second BWP satisfy a second preset condition, it is determined that the first mapping relationship is determined based on the second method.

The second preset condition includes any one of the following:

i. both the first CC and the second CC are in a low frequency band or a high frequency band;
ii. a band to which the first CC belongs is the same as a band to which the second CC belongs;
iii. a band to which the first CC belongs is the same as a band to which the second CC belongs, and the first CC and the second CC are contiguous in frequency domain;
iv. both the first BWP and the second BWP are in a low frequency band or a high frequency band;
v. a band to which the first BWP belongs is the same as a band to which the second BWP belongs;
vi. a band to which the first BWP belongs is the same as a band to which the second BWP belongs, and the first BWP and the second BWP are contiguous in frequency domain; or
vii. a subcarrier spacing of the first BWP is the same as a subcarrier spacing of the second BWP.

In the foregoing method 400, detailed descriptions have been provided with reference to the foregoing preset conditions. For brevity, details are not described herein again.

It should be noted that the first preset condition corresponds to the second preset condition. For example, the preset condition a corresponds to the preset condition i, the preset condition b corresponds to the preset condition ii, the preset condition c corresponds to the preset condition iii, the preset condition d corresponds to the preset condition iv, the preset condition e corresponds to the preset condition v, the preset condition f corresponds to the preset condition vi, and the preset condition g corresponds to the preset condition vii. That the network device and the terminal device determine, based on one of the first preset conditions enumerated above, whether to determine the first mapping relationship based on the method 1 is equivalent to determining, based on a corresponding condition in the second preset conditions, whether to determine the first mapping relationship based on the method 2. For example, that the network device and the terminal device determine, based on the preset condition a, whether to determine the first mapping relationship based on the method 1 is equivalent to that the network device and the terminal device determine, based on the preset condition i, whether to determine the first mapping relationship based on the method 2. For brevity, details are not described herein again.

Therefore, regardless of whether the network device and the terminal device perform determining based on the first preset condition or the second preset condition, the network device and the terminal device may pre-agree that determining is performed based on corresponding preset conditions, or the network device and the terminal device may pre-agree that determining is performed based on a same preset condition. It can be ensured, only in this way, that determined results are consistent.

After determining the first mapping relationship, the terminal device and the network device may determine the selected TCI state based on the first mapping relationship and the TCI. Optionally, the method 500 further includes step 506: The network device sends the TCI, where the TCI is used to indicate the selected TCI state. Correspondingly, in step 506, the terminal device receives the TCI.

Optionally, the TCI may be preconfigured. For example, the terminal device and the network device agree on the TCI and locally store the TCI in advance.

In step 507, the terminal device determines the TCI state based on the received TCI and the first mapping relationship.

Correspondingly, in step 508, the network device determines the TCI state based on the TCI and the first mapping relationship.

In step 509, the terminal device determines, based on the TCI state, the receive beam for receiving the downlink signal.

Correspondingly, in step 510, the network device determines, based on the TCI state, a transmit beam for sending the downlink signal.

In step 511, the network device sends the downlink signal in the second BWP on the second CC by using the transmit beam. Correspondingly, in step 511, the terminal device receives the downlink signal in the second BWP on the second CC by using the receive beam.

It should be understood that a specific process of step 507 to step 511 is the same as a specific process of step 307 to step 311 in the foregoing method 300. Because step 307 to step 311 have been described in detail above, for brevity, details are not described herein again.

Based on the foregoing technical solution, the network device and the terminal device may determine the TCI state based on a same mapping relationship, and separately determine the transmit beam and the receive beam based on a same TCI state. Because the transmit beam and the receive beam that are determined based on the TCI state are paired beams that are pre-determined through beam training, it can be ensured that a relatively large beamforming gain can be obtained during downlink signal transmission, thereby helping improve downlink signal transmission quality. In addition, the network device and the terminal device may flexibly select a TCI state based on positions of the first CC and the second CC in frequency domain, and send a data channel on a high frequency as much as possible, thereby helping improve data transmission efficiency and increase a throughput.

It should be understood that sequence numbers of the foregoing processes do not mean an execution sequence in this embodiment of this application. The execution sequence of the processes should be determined according to functions and internal logic of the processes, and should not be construed as any limitation on the implementation processes of this embodiment of this application. For example, step 505 is not necessarily performed after step 503, and step 505 may be performed before step 503. Step 507 is not necessarily performed after step 506, and step 507 may alternatively be performed before step 506.

Similar to downlink transmission, when a physical uplink resource scheduled by the network device for the terminal device and a physical downlink resource for sending scheduling information belong to different CCs or different BWPs, the terminal device may also face a plurality of spatial relations. For example, the network device schedules a granted physical uplink resource for the terminal device by using DCI on a PDCCH, and the terminal device may transmit a PUSCH on the physical uplink resource. The PDCCH and the PUSCH may be on different CCs or in different BWPs. Because the network device configures a spatial relation list for each CC and each BWP, the terminal device may not know a CC or a BWP, where the network device determines a receive beam based on a spatial relation list configured for the CC or the BWP, and the terminal device cannot determine a transmit beam used to send the PUSCH. If the transmit beam selected by the terminal device does not correspond to the receive beam selected by the network device, quality of receiving the PUSCH by the network device may be poor. Therefore, uplink signal receiving quality is affected, and user experience deteriorates.

Therefore, the signal receiving and sending methods provided in this application are also applicable to uplink transmission.

Without loss of generality, the following describes the embodiments of this application in detail by using uplink transmission between one terminal device and one network device as an example. It may be understood that any terminal device in a wireless communications system or a chip disposed in a terminal device may send an uplink signal based on a same method, and any network device in the wireless communications system or a chip disposed in a network device may receive the uplink signal based on a same method. This is not limited in this application.

The following describes application of the embodiments of this application in uplink transmission in detail with reference to the accompanying drawings.

Figure 8:
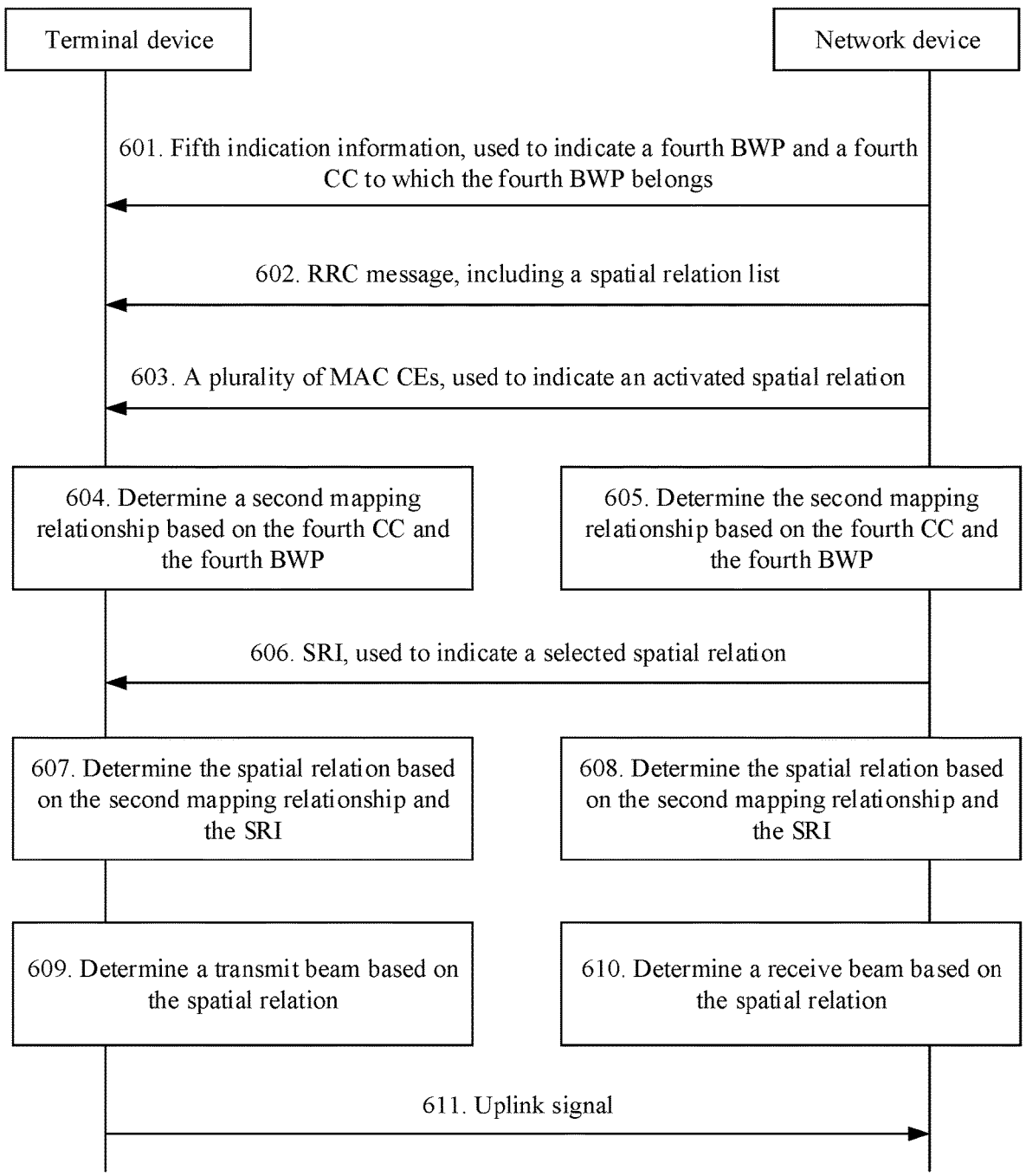
FIG. 8 is a schematic flowchart of a signal receiving and sending method according to another embodiment of this application.

FIG. 8 is a schematic flowchart of a signal receiving and sending method 600 according to another embodiment of this application from a perspective of device interaction. As shown in the figure, the method 600 shown in FIG. 8 may include step 601 to step 611. The following describes steps in the method 600 in detail with reference to FIG. 8.

In step 601, a network device sends fifth indication information in a third BWP on a third CC, where the fifth indication information is used to indicate a fourth BWP for transmitting an uplink signal and/or a fourth CC to which the fourth BWP belongs. Correspondingly, in step 601, a terminal device receives the fifth indication information in the third BWP on the third CC.

For ease of differentiation from the embodiments described above, in this embodiment, indication information that is sent by the network device and that is used to indicate a BWP for transmitting the uplink signal is denoted as the fifth indication information, a BWP of the fifth indication information is denoted as the third BWP, and the third BWP belongs to the third CC; and a BWP scheduled by the network device to the terminal device for transmitting the uplink signal is denoted as the fourth BWP, and the fourth BWP belongs to the fourth CC. BWPs may be distinguished by using different identifiers. That is, different BWPs correspond to different BWP IDs. CCs may also be distinguished by using different identifiers. That is, different CCs correspond to different CC IDs.

In step 602, the network device sends an RRC message, where the RRC message includes a spatial relation list, and the spatial relation list includes a plurality of spatial relations. Correspondingly, in step 602, the terminal device receives the RRC message.

In step 603, the terminal device receives a plurality of MAC CEs, and each MAC CE is used to indicate at least one mapping relationship and a corresponding CC and BWP.

As described above, the plurality of MAC CEs may be sent by a same network device to the terminal device, or may be sent by a plurality of network devices to the terminal device. This is not limited in this application.

The figure is merely an example, and shows a case in which the same network device sends the plurality of MAC CEs to the terminal device. However, this should not constitute any limitation on this application.

In step 604, the terminal device determines a second mapping relationship based on the fourth CC and/or the fourth BWP that are/is indicated by using the fifth indication information.

For ease of differentiation from the embodiments described above, in this embodiment, a mapping relationship used to determine the spatial relation is denoted as the second mapping relationship. The second mapping relationship may be used to determine a transmit beam of the terminal device and a receive beam of the network device.

Specifically, the terminal device may determine the second mapping relationship based on the fourth CC and/or the fourth BWP.

When the third CC and the fourth CC are a same CC, the fifth indication information may be used to indicate only the fourth BWP. A protocol may specify by default that, when the fifth indication information is used to indicate only a BWP, a CC for transmitting the fifth indication information and a CC scheduled for transmitting the uplink signal is a same CC. When receiving the fifth indication information, the terminal device may determine, based on the fourth BWP indicated by using the fifth indication information, that the fourth BWP and the third BWP for transmitting the fifth indication information belong to a same CC. In addition, the terminal device may determine the second mapping relationship based on the CC for receiving the fifth indication information and the BWP indicated by using the fifth indication information. Alternatively, the fifth indication information may alternatively be used to indicate the fourth CC and the fourth BWP, and the terminal device may determine the second mapping relationship based on the fourth CC and the fourth BWP that are indicated by using the fifth indication information. In this case, the fourth CC and the third CC are the same CC.

When the third CC and the fourth CC are different CCs, and the fourth CC includes only one BWP, in an implementation, the fifth indication information may be used to indicate only the fourth CC. A protocol may specify by default that, when the fifth indication information is used to indicate only a CC, the indicated CC includes only one BWP. When receiving the fifth indication information, the terminal device may determine the second mapping relationship based on the fourth CC indicated by using the fifth indication information. In this case, a BWP ID in a MAC CE used to activate a TCI state may be all "0s". When one CC includes only one BWP, the CC and the BWP may be considered to be equivalent. The terminal device determines the second mapping relationship based on the fourth CC, or it may be considered that the terminal device determines the second mapping relationship based on the fourth BWP. In another implementation, the fifth indication information may alternatively be used to indicate the fourth CC and the fourth BWP, and the terminal device may determine the second mapping relationship based on the fourth CC and the fourth BWP that are indicated by using the fifth indication information.

When the third CC and the fourth CC are the different CCs, and the fourth CC includes a plurality of BWPs, the fifth indication information may be used to indicate the fourth CC and the fourth BWP. The terminal device may determine the second mapping relationship based on the fourth CC and the fourth BWP that are indicated by using the fifth indication information.

Correspondingly, in step 605, the network device determines the second mapping relationship based on the fourth CC and/or the fourth BWP.

Optionally, before step 604 and step 605, the method further includes: The network device sends sixth indication information, where the sixth indication information is used to indicate to determine the second mapping relationship based on the fourth CC. Correspondingly, the terminal device receives the sixth indication information.

The sixth indication information may be understood as being used to explicitly indicate to determine the second mapping relationship based on the fourth CC and/or the fourth BWP.

Optionally, when the third CC and the fourth CC or the third BWP and the fourth BWP satisfy a third preset condition, the terminal device and the network device may determine the second mapping relationship based on the fourth CC and/or the fourth BWP.

The third preset condition includes any one of the following:
  a. the third CC to which the third BWP belongs is in a low frequency band, and the fourth CC to which the fourth BWP belongs is in a high frequency band;
  b. a band in which the third CC to which the third BWP belongs is located is different from a band in which the fourth CC to which the fourth BWP belongs is located;
  c. the third CC to which the third BWP belongs and the fourth CC belong to a same band, but the third CC and the fourth CC are non-contiguous in frequency domain;
  d. the third BWP is in a low frequency band, and the fourth BWP is in a high frequency band;
  e. a band to which the third BWP belongs is different from a band to which the fourth BWP belongs;
  f. the third BWP and the fourth BWP belong to a same band, but the third BWP and the fourth BWP are non-contiguous in frequency domain; or
  g. a subcarrier spacing of the third BWP is different from a subcarrier spacing of the fourth BWP.

It should be understood that the preset conditions a to g enumerated above are similar to the preset conditions a to g enumerated in the method 300. Because the preset conditions have been described in detail above, for brevity, details are not described herein again.

In step 606, the network device sends an SRI, where the SRI is used to indicate a selected spatial relation. Correspondingly, in step 606, the terminal device receives the SRI.

Optionally, the SRI may be preconfigured. For example, the terminal device and the network device agree on the SRI and locally store the SRI in advance.

In step 607, the terminal device determines the spatial relation based on the SRI and the second mapping relationship. Correspondingly, in step 608, the network device determines the spatial relation based on the SRI and the second mapping relationship.

In step 609, the terminal device determines, based on the spatial relation, the transmit beam and a transmit power that are used to send the uplink signal. Correspondingly, in step 610, the network device determines, based on the spatial relation, the receive beam used to receive the uplink signal.

In step 611, the terminal device sends the uplink signal by using the transmit beam based on the transmit power. Correspondingly, in step 611, the network device receives the uplink signal by using the receive beam.

It should be understood that the steps in the method 600 are basically similar to the steps in the foregoing method 300. Because the steps in the method 300 have been described in detail above, for brevity, details are not described herein again.

Based on the foregoing technical solution, the network device and the terminal device may determine the spatial relation based on a same mapping relationship, and respectively determine the receive beam and the transmit beam based on a same spatial relation. Because the transmit beam and the receive beam that are determined based on the spatial relation are paired beams that are pre-determined through beam training, it can be ensured that a relatively large beamforming gain can be obtained during uplink signal transmission, thereby helping improve uplink signal transmission quality. In addition, when terminal devices in a communications system can send uplink signals based on a transmit power expected by the network device, powers at which uplink signals sent by different terminal devices arrive at the network device are similar. This helps reduce signal processing complexity of the network device.

It should be understood that sequence numbers of the foregoing processes do not mean an execution sequence in this embodiment of this application. The execution sequence of the processes should be determined according to functions and internal logic of the processes, and should not be construed as any limitation on the implementation processes of this embodiment of this application. For example, step 605 is not necessarily performed after step 603, and step 605 may be performed before step 603. Step 607 is not necessarily performed after step 606, and step 607 may alternatively be performed before step 606.

It should be further understood that a method for determining the second mapping relationship by the network device and the terminal device is not limited to the foregoing description in step 604 and step 605. This application further provides a method that may also be used by the network device and the terminal device to determine the second mapping relationship.

Figure 9:
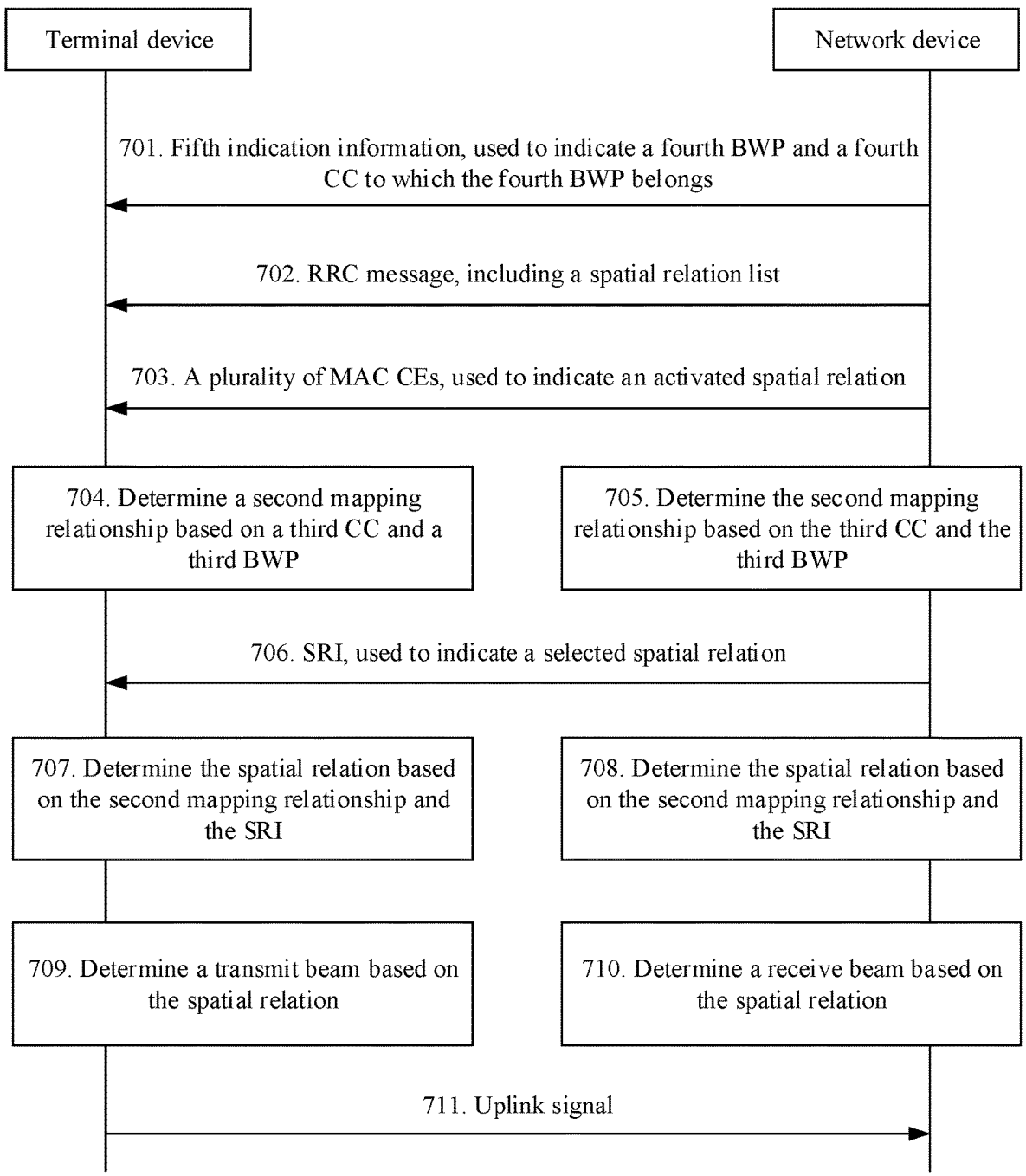
FIG. 9 is a schematic flowchart of a signal receiving and sending method according to still another embodiment of this application.

FIG. 9 is a schematic flowchart of a signal receiving and sending method 700 according to still another embodiment of this application from a perspective of device interaction. As shown in the figure, the method 700 shown in FIG. 9 may include step 701 to step 711. The following describes steps in the method 700 in detail with reference to FIG. 9.

In step 701, a network device sends fifth indication information in a third BWP on a third CC, where the fifth indication information is used to indicate a fourth BWP for transmitting an uplink signal and/or a fourth CC to which the fourth BWP belongs. Correspondingly, in step 701, a terminal device receives the fifth indication information in the third BWP on the third CC.

In step 702, the network device sends an RRC message, where the RRC message includes a spatial relation list, and the spatial relation list includes a plurality of spatial relations. Correspondingly, in step 702, the terminal device receives the RRC message. In step 703, the terminal device receives a plurality of MAC CEs, and each MAC CE is used to indicate at least one mapping relationship and a corresponding CC and BWP.

As described above, the plurality of MAC CEs may be sent by a same network device to the terminal device, or may be sent by a plurality of network devices to the terminal device. This is not limited in this application.

The figure is merely an example, and shows a case in which the same network device sends the plurality of MAC CEs to the terminal device. However, this should not constitute any limitation on this application.

In step 704, the terminal device determines a second mapping relationship based on the third CC and/or the third BWP.

Because the terminal device may know in advance the third CC and the third BWP for receiving the fifth indication information, the terminal device may directly determine the second mapping relationship based on the third CC and the third BWP. When the third CC and the fourth CC are different CCs, and the third CC includes only one BWP (namely, the third BWP), the terminal device may determine the second mapping relationship based only on the third CC, or determine the second mapping relationship based only on the third BWP. Therefore, the terminal device may determine the second mapping relationship in a plurality of mapping relationships based on the third CC and/or the third BWP.

Correspondingly, in step 705, the network device determines the second mapping relationship based on the third CC and/or the third BWP.

Optionally, before step 704 and step 705, the method further includes: The network device sends seventh indication information, where the seventh indication information is used to indicate to determine the second mapping relationship based on the third CC. Correspondingly, the terminal device receives the seventh indication information.

The seventh indication information may be understood as being used to explicitly indicate to determine the second mapping relationship based on the third CC and/or the third BWP.

Optionally, when the third CC and the fourth CC or the third BWP and the fourth BWP satisfy a fourth preset condition, the terminal device determines the second mapping relationship based on the third CC and/or the third BWP.

The fourth preset condition includes any one of the following:
 i. both the third CC and the fourth CC are in a low frequency band or a high frequency band;
 ii. a band to which the third CC belongs is the same as a band to which the fourth CC belongs;
 iii. a band to which the third CC belongs is the same as a band to which the fourth CC belongs, and the third CC and the fourth CC are contiguous in frequency domain;
 iv. both the third BWP and the fourth BWP are in a low frequency band or a high frequency band;
 v. a band to which the third BWP belongs is the same as a band to which the fourth BWP belongs;
 vi. a band to which the third BWP belongs is the same as a band to which the fourth BWP belongs, and the third BWP and the fourth BWP are contiguous in frequency domain; or
 vii. a subcarrier spacing of the third BWP is the same as a subcarrier spacing of the fourth BWP.

It should be understood that the preset conditions i to vii enumerated above are similar to the preset conditions i to vii enumerated in the method 400. Because the preset conditions have been described in detail above, for brevity, details are not described herein again.

In step 706, the network device sends an SRI, where the SRI is used to indicate a selected spatial relation. Correspondingly, in step 706, the terminal device receives the SRI.

Optionally, the SRI may be preconfigured. For example, the terminal device and the network device agree on the SRI and locally store the SRI in advance.

In step 707, the terminal device determines the spatial relation based on the SRI and the second mapping relationship. Correspondingly, in step 708, the network device determines the spatial relation based on the SRI and the second mapping relationship.

In step 709, the terminal device determines, based on the spatial relation, a transmit beam and a transmit power that are used to send the uplink signal. Correspondingly, in step 710, the network device determines, based on the spatial relation, a receive beam used to receive the uplink signal.

In step 711, the terminal device sends the uplink signal by using the transmit beam based on the transmit power. Correspondingly, in step 711, the network device receives the uplink signal by using the receive beam.

It should be understood that the steps in the method 700 are basically similar to the steps in the foregoing method 400. Because the steps in the method 300 have been described in detail above, for brevity, details are not described herein again.

Based on the foregoing technical solution, the network device and the terminal device may determine the spatial relation based on a same mapping relationship, and respectively determine the receive beam and the transmit beam based on a same spatial relation. Because the transmit beam and the receive beam that are determined based on the spatial relation are paired beams that are pre-determined through beam training, it can be ensured that a relatively large beamforming gain can be obtained during uplink signal transmission, thereby helping improve uplink signal transmission quality. In addition, when terminal devices in a communications system can send uplink signals based on a transmit power expected by the network device, powers at which uplink signals sent by different terminal devices arrive at the network device are similar. This helps reduce signal processing complexity of the network device.

It should be understood that sequence numbers of the foregoing processes do not mean an execution sequence in this embodiment of this application. The execution sequence of the processes should be determined according to functions and internal logic of the processes, and should not be construed as any limitation on the implementation processes of this embodiment of this application. For example, step 705 is not necessarily performed after step 703, and step 705 may be performed before step 703. Step 707 is not necessarily performed after step 706, and step 707 may alternatively be performed before step 706.

The foregoing enumerates two methods for determining the second mapping relationship. In the method 600, the network device and the terminal device determine the second mapping relationship based on a scheduled frequency domain resource (namely, the fourth CC and/or the fourth BWP). For ease of differentiation and description, the method is denoted as a method A below. In the method 700, the network device and the terminal device determine the second mapping relationship based on a frequency domain resource (namely, the first CC and/or the third BWP) for sending the fifth indication information. For ease of differentiation and description, the method is denoted as a method B below.

As described above, transmitting a control channel in the low frequency band can ensure robustness, and transmitting a data channel in the high frequency band can improve a throughput. Therefore, the network device and the terminal device may further determine, based on locations, in a band, of a scheduled frequency domain resource and a frequency domain resource for sending signaling, a method used to determine the second mapping relationship.

Figure 10:
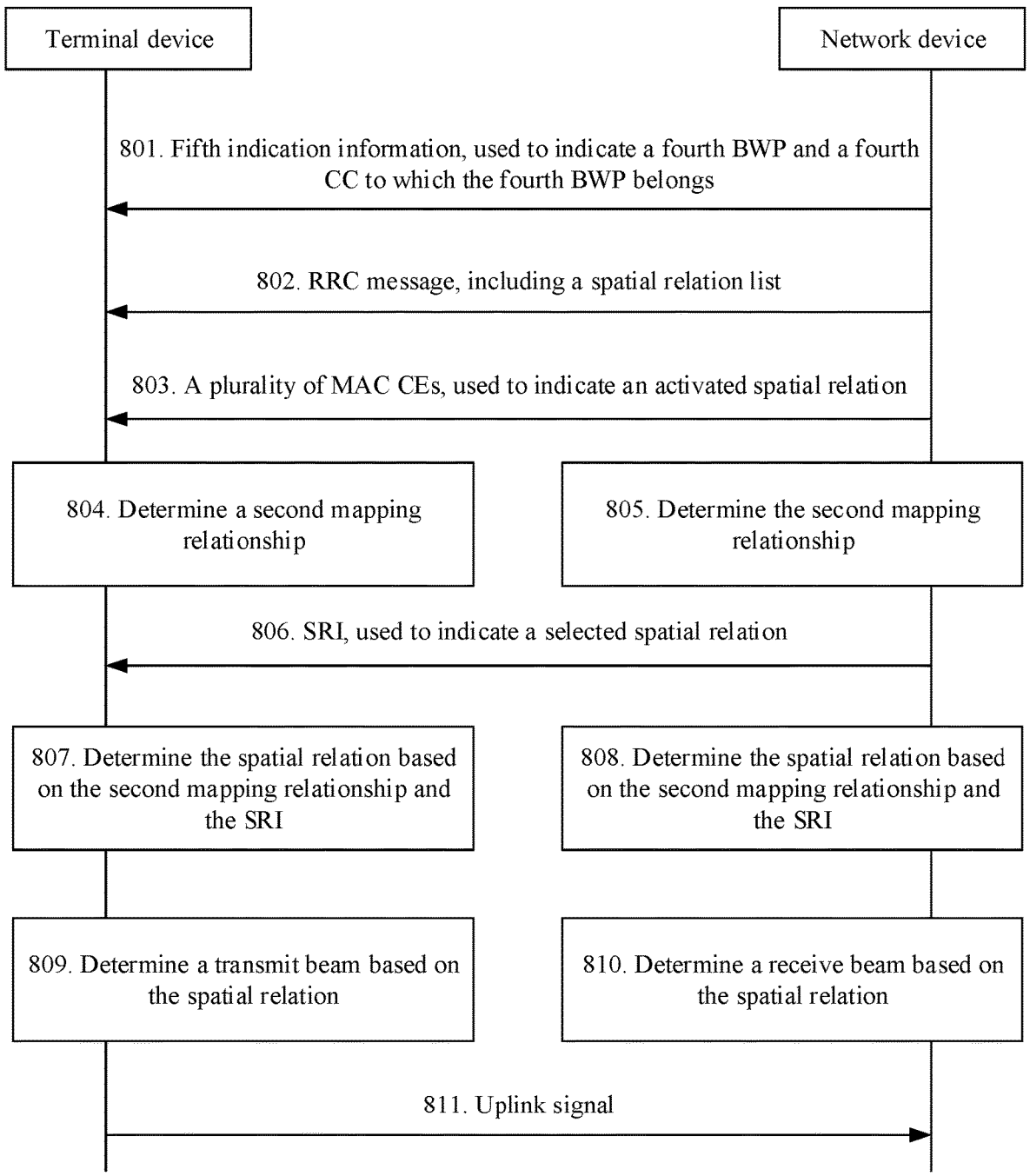
FIG. 10 is a schematic flowchart of a signal receiving and sending method according to yet another embodiment of this application.

FIG. 10 is a schematic flowchart of a signal receiving and sending method 800 according to yet another embodiment of this application from a perspective of device interaction. As shown in the figure, the method 800 shown in FIG. 10 may include step 801 to step 811. The following describes steps in the method 800 in detail with reference to FIG. 10.

In step 801, a network device sends fifth indication information in a third BWP on a third CC, where the fifth indication information is used to indicate a fourth BWP for transmitting an uplink signal and a fourth CC to which the fourth BWP belongs. Correspondingly, in step 801, a terminal device receives the fifth indication information in the third BWP on the third CC.

In step 802, the network device sends an RRC message, where the RRC message includes a spatial relation list, and the spatial relation list includes a plurality of spatial relations. Correspondingly, in step 802, the terminal device receives the RRC message.

In step 803, the terminal device receives a plurality of MAC CEs, where each of the plurality of MAC CEs is used to indicate at least one mapping relationship and a corresponding CC and BWP. The plurality of MAC CEs may be sent by a same network device to the terminal device, or may be sent by a plurality of network devices to the terminal device. This is not limited in this application.

In step 804, the terminal device determines a second mapping relationship, where the second mapping relationship is a mapping relationship determined based on the third CC and/or the third BWP or a mapping relationship determined based on the fourth CC and/or the fourth BWP.

Optionally, step 804 specifically includes:
determining, by the terminal device, whether to determine the second mapping relationship based on a method A or a method B; and
determining, by the terminal device, the second mapping relationship based on the determined method.

In this embodiment, the network device may determine whether to determine the second mapping relationship based on the method A or the method B, and may notify, by using signaling, the terminal device to determine the second mapping relationship based on a same method.

Optionally, step 804 specifically includes:
receiving, by the terminal device, eighth indication information, where the eighth indication information is used to indicate whether the second mapping relationship is determined based on the method A or the method B; and correspondingly, sending, by the network device, the eighth indication information; and
determining, by the terminal device, the second mapping relationship based on the method indicated by using the eighth indication information.

In a possible design, the eighth indication information may be carried in an RRC message. For example, an IE is added to the RRC message, to be used to indicate whether the method for determining the second mapping relationship is the method A or the method B. For example, the IE may occupy one bit. When the bit is set to "0", the method A may be indicated, and when the bit is set to "1", the method B may be indicated. Alternatively, when the bit is set to "1", the method A may be indicated, and when the bit is set to "0", the method B may be indicated.

It should be understood that the enumerated method for indicating, by using the IE in an RRC message, the method used to determine the second mapping relationship is merely a possible implementation, and shall not constitute any limitation on this application. A method for indicating, by using the eighth indication information, a specific method used to determine the second mapping relationship is not limited in this application.

It should be further understood that the fifth indication information and the sixth indication information in the method 600 may be information carried in a same field in same signaling, or may be information carried in different signaling or different fields. The eighth indication information and the seventh indication information in the method 700 may be information carried in a same field in same signaling, or may be information carried in different signaling or different fields. This is not limited in this application.

Correspondingly, in step 805, the network device determines the second mapping relationship.

Optionally, step 805 specifically includes: determining, by the network device, the second mapping relationship based on the method indicated by using the eighth indication information.

Optionally, when the third CC and the fourth CC or the third BWP and the fourth BWP satisfy a third preset condition, it is determined that the second mapping relationship is determined based on the method A.

The third preset condition includes any one of the following:
a. the third CC is in a low frequency band, and the fourth CC is in a high frequency band;
b. a band to which the third CC belongs is different from a band to which the fourth CC belongs;
c. the third CC and the fourth CC belong to a same band, but the third CC and the fourth CC are non-contiguous in frequency domain;
d. the third BWP is in a low frequency band, and the fourth BWP is in a high frequency band;
e. a band to which the third BWP belongs is different from a band to which the fourth BWP belongs;
f. the third BWP and the fourth BWP belong to a same band, but the third BWP and the fourth BWP are non-contiguous in frequency domain; or
g. a subcarrier spacing of the third BWP is different from a subcarrier spacing of the fourth BWP.

In the foregoing method 600, detailed descriptions have been provided with reference to the foregoing preset conditions. For brevity, details are not described herein again.

Optionally, when the third CC and the fourth CC or the third BWP and the fourth BWP satisfy a fourth preset condition, it is determined that the second mapping relationship is determined based on the method B.

The fourth preset condition includes any one of the following:
i. both the third CC and the fourth CC are in a low frequency band or a high frequency band;
ii. a band to which the third CC belongs is the same as a band to which the fourth CC belongs;
iii. a band to which the third CC belongs is the same as a band to which the fourth CC belongs, and the third CC and the fourth CC are contiguous in frequency domain;
iv. both the third BWP and the fourth BWP are in a low frequency band or a high frequency band;
v. a band to which the third BWP belongs is the same as a band to which the fourth BWP belongs;
vi. a band to which the third BWP belongs is the same as a band to which the fourth BWP belongs, and the third BWP and the fourth BWP are contiguous in frequency domain; or
vii. a subcarrier spacing of the third BWP is the same as a subcarrier spacing of the fourth BWP.

In the foregoing method 700, detailed descriptions have been provided with reference to the foregoing preset conditions. For brevity, details are not described herein again.

It should be noted that the third preset condition corresponds to the fourth preset condition. For example, the preset condition a corresponds to the preset condition i, the preset condition b corresponds to the preset condition ii, the preset condition c corresponds to the preset condition iii, the preset condition d corresponds to the preset condition iv, the preset condition e corresponds to the preset condition v, the preset condition f corresponds to the preset condition vi, and the preset condition g corresponds to the preset condition vii. That the network device and the terminal device determine, based on one of the third preset conditions enumerated above, whether to determine the second mapping relationship based on the method A is equivalent to determining, based on a corresponding condition in the fourth preset conditions, whether to determine the second mapping relationship based on the method B. For example, that the network device and the terminal device determine, based on the preset condition a, whether to determine the second mapping relationship based on the method A is equivalent to that the network device and the terminal device determine, based on the preset condition i, whether to determine the second mapping relationship based on the method B. For brevity, details are not described herein again.

Therefore, regardless of whether the network device and the terminal device perform determining based on the third preset condition or the fourth preset condition, the network device and the terminal device may pre-agree that determining is performed based on corresponding preset conditions, or the network device and the terminal device may pre-agree that determining is performed based on a same preset condition. It can be ensured, only in this way, that determined results are consistent.

After determining the second mapping relationship, the terminal device and the network device may determine a selected spatial relation based on the second mapping relationship and an SRI. Optionally, the method 800 further includes step 806: The network device sends the SRI, where the SRI is used to indicate the selected spatial relation. Correspondingly, in step 806, the terminal device receives the SRI.

Optionally, the SRI may be preconfigured. For example, the terminal device and the network device agree on the SRI and locally store the SRI in advance.

In step 807, the terminal device determines the spatial relation based on the received SRI and the second mapping relationship.

Correspondingly, in step 808, the network device determines the spatial relation based on the SRI and the second mapping relationship.

In step 809, the terminal device determines, based on the spatial relation, a transmit beam and a transmit power for sending an uplink signal.

Correspondingly, in step 810, the network device determines, based on the spatial relation, a receive beam for receiving the uplink signal.

In step 811, the terminal device sends the uplink signal in the fourth BWP on the fourth CC by using the transmit beam based on the transmit power. Correspondingly, in step 811, the network device receives the uplink signal in the fourth BWP on the fourth CC by using the receive beam.

It should be understood that a specific process of step 807 to step 811 is the same as a specific process of step 607 to step 611 in the foregoing method 600. Because step 607 to step 611 have been described in detail above, for brevity, details are not described herein again.

Based on the foregoing technical solution, the network device and the terminal device may determine the spatial relation based on a same mapping relationship, and respectively determine the receive beam and the transmit beam based on a same spatial relation. Because the transmit beam and the receive beam that are determined based on the spatial relation are paired beams that are pre-determined through beam training, a relatively large beamforming gain can be obtained during uplink signal transmission, thereby helping improve uplink signal transmission quality. In addition, the network device and the terminal device may flexibly select a TCI state based on positions of the third CC and the fourth CC in frequency domain, and send a data channel on a high frequency as much as possible, thereby helping improve data transmission efficiency and increase a throughput. In addition, when terminal devices in a communications system can send uplink signals based on a transmit power expected by the network device, powers at which uplink signals sent by different terminal devices arrive at the network device are similar. This helps reduce signal processing complexity of the network device.

It should be understood that sequence numbers of the foregoing processes do not mean an execution sequence in this embodiment of this application. The execution sequence of the processes should be determined according to functions and internal logic of the processes, and should not be construed as any limitation on the implementation processes of this embodiment of this application. For example, step 805 is not necessarily performed after step 803, and step 805 may be performed before step 803. Step 807 is not necessarily performed after step 806, and step 807 may alternatively be performed before step 806.

It should be further understood that the signal receiving and sending methods provided in the foregoing embodiments are not limited to the scenarios enumerated above. When a network device schedules another frequency domain resource on one frequency domain resource for a terminal device to transmit a signal, a plurality of mapping relationships may be to be selected. In this case, a used mapping relationship may still be determined by using the embodiments provided in this application, so that the terminal device and the network device determine a TCI state or a spatial relation based on a same mapping relationship, thereby determining a transmit beam and a receive beam based on a same TCI state or spatial relation. Therefore, a relatively large beamforming gain can be obtained during transmission, thereby helping improve signal transmission quality.

In addition, the network device may configure a TCI state list or a spatial relation list for each BWP on each CC by using an RRC message. As described above, the network device may configure a maximum of 64 TCI states or spatial relations for each BWP on each CC. Therefore, signaling overheads are huge.

Actually, TCI states or spatial relations of a plurality of BWPs may overlap or partially overlap. For example, TCI states of two adjacent BWPs on a same CC may overlap. Therefore, this manner, namely, configuring the TCI state list for each BWP by using RRC may cause unnecessary signaling overheads. For another example, spatial relations between two adjacent BWPs on a same CC may also overlap. Therefore, this manner, namely, configuring the spatial relation list for each BWP by using RRC may also cause unnecessary signaling overheads.

In view of this, this application further provides a method, to reduce signaling overheads.

It should be understood that a specific process in which a network device configures a TCI state for a terminal device is basically similar to a specific process of configuring the spatial relation. For ease of understanding and description, the following describes the method provided in this embodiment of this application by using an example in which the TCI state is configured. It may be understood that the method is also applicable to a scenario in which the network device configures the spatial relation for the terminal device. In this scenario, the method may also be referred to as a spatial relation determining method, the TCI state may be replaced with the spatial relation, TCI may be replaced with an SRI, and a downlink signal may be replaced with an uplink signal. The terminal device may determine a transmit beam and a transmit power based on the spatial relation, and the network device may determine a receive beam based on the spatial relation.

Figure 11:
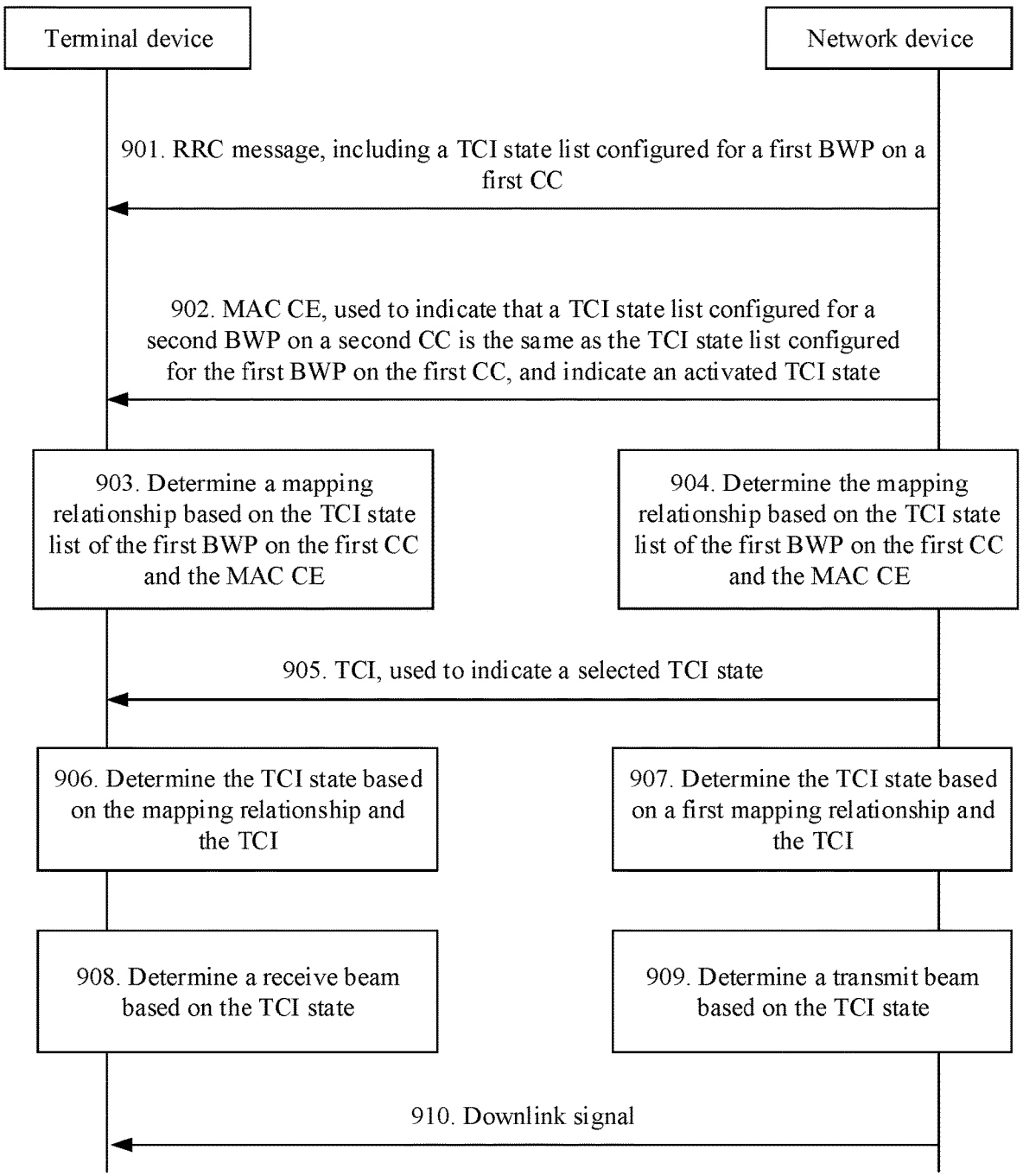
FIG. 11 is a schematic flowchart of a TCI state determining method according to an embodiment of this application.

The following describes in detail a TCI state determining method according to an embodiment of this application with reference to FIG. 11.

FIG. 11 is a schematic flowchart of a TCI state determining method 900 according to an embodiment of this application from a perspective of device interaction. As shown in the figure, the method 900 shown in FIG. 11 may include step 901 to step 909. The following describes steps in the method 900 in detail with reference to FIG. 11.

In step 901, a network device sends an RRC message, where the RRC message carries a TCI state list configured for a first BWP on a first CC. Correspondingly, in step 901, a terminal device receives the RRC message.

It should be understood that a specific process of step 901 is similar to that of step 302 in the method 300. Because step 302 has been described in detail in the foregoing method 300, for brevity, details are not described herein again.

In step 902, the network device sends a MAC CE, where the MAC CE is used to indicate that a TCI state list configured for a second BWP on a second CC is the same as the TCI state list configured for the first BWP on the first CC, and indicate an activated TCI state. Correspondingly, in step 902, the terminal device receives the MAC CE.

Optionally, the MAC CE in this embodiment may be obtained by changing a format of an existing MAC CE. Two new fields are added to the existing MAC CE, to be used to indicate a BWP on a CC, where a used TCI state list comes from a TCI state list of the BWP on the CC. For example, the two new fields are used to indicate that the TCI state list configured for the second BWP on the second CC comes from the TCI state list configured for the first BWP on the first CC. In this case, the terminal device may determine, based on the TCI state list that is in the RRC message and that is configured for the first BWP on the first CC, the TCI state list that is configured for the second BWP on the second CC.

Figures 12, 13:
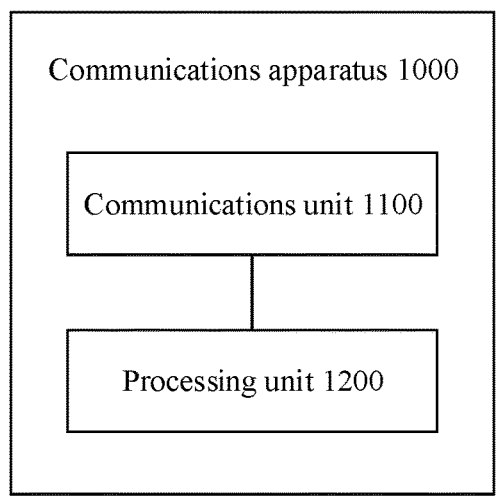
FIG. 12 is a schematic diagram of a format of a MAC CE according to an embodiment of this application.
FIG. 13 is a schematic block diagram of a communications apparatus according to an embodiment of this application.

FIG. 12 is a schematic diagram of a format of a MAC CE according to an embodiment of this application. As shown in the figure, compared with the MAC CE shown in FIG. 3, at least two fields may be added to the MAC CE, and the two fields may be respectively used to indicate an ID of the first CC and an ID of the first BWP. The two fields may be carried in a newly added byte, as shown in an Oct 2 in the figure.

Specifically, a serving cell ID indicated by using an Oct 1 in the figure may be an ID of the second CC, and a BWP ID may be an ID of the second BWP. In other words, a CC and a BWP that are indicated by using fields in the Oct 1 indicate a BWP on a CC, where the MAC CE is configured for the BWP on the CC. A serving cell ID indicated by using the Oct 2 in the figure may be the ID of the first CC, and a BWP ID may be the ID of the first BWP. In other words, a CC and a BWP that are indicated by using the fields in the Oct 2 indicate a BWP in a cell, where a TCI state list configured for the BWP in the cell may be reused. $T_i$ indicated by using an Oct 3 to an Oct X in the figure is used to indicate whether each TCI state is activated. A specific indication manner of $T_i$ may be the same as that in the prior art. For brevity, details are not described herein again.

It should be understood that FIG. 12 shows an example of a format of a MAC CE merely for ease of understanding, but this should not constitute any limitation on this application. For example, the fields in the Oct 1 may alternatively be used to indicate a BWP in a cell, where a TCI state list configured for the BWP in the cell may be reused, and the fields in the Oct 2 are used to indicate a BWP in a cell, where the MAC CE is configured for the BWP in the cell. This is not limited in this application.

It should be further understood that, that the MAC CE is modified to indicate to reuse a TCI state list configured for a BWP on a CC is merely a possible implementation. The embodiments of this application are not limited thereto.

Optionally, the network device configures only one TCI state list for one terminal device.

One terminal device may use one or more BWPs. When the terminal device uses a plurality of BWPs, the plurality of BWPs may belong to a same CC, or may belong to different CCs. However, regardless of whether the terminal device uses one or more BWPs or uses one or more CCs, the network device configures only one TCI state list for each terminal device. In other words, the TCI state list is configured at a UE level. When the network device configures the TCI state list for the terminal device by using an RRC message, a CC and a BWP may not be indicated.

Optionally, the network device configures one TCI state list for each BWP of each terminal device. When the network device configures a plurality of BWPs for the terminal device, the network device configures a same TCI state list for the plurality of BWPs of the terminal device. In other words, although a TCI state list is configured based on a BWP, it may still be considered that the network device configures only one TCI state list for one terminal device. When the network device configures the TCI state list for the terminal device by using the RRC message, CCs and BWPs may still be distinguished, but TCI state lists configured for different BWPs of a same terminal device are the same.

In the foregoing two cases, the network device configures the same TCI state list for the plurality of BWPs of the terminal device, or configures only one TCI state list for the plurality of BWPs of the terminal device, and BWPs and CCs do not need to be distinguished. Therefore, an activated TCI state may be indicated by using the format of the existing MAC CE, or the existing MAC CE may be modified. For example, a serving cell index and a BWP ID may not be indicated. This is not limited in this application. Optionally, the network device configures one TCI state list for a plurality of CCs or a plurality of BWPs that have a QCL relationship.

The network device may predetermine the plurality of CCs or the plurality of BWPs that have the QCL relationship, and configure a same TCI state list for the plurality of CCs or the plurality of BWPs that have the QCL relationship.

The plurality of CCs or the plurality of BWPs that have the QCL relationship herein may be understood as follows: When the plurality of CCs satisfy the QCL relationship in space domain, for example, when a CC #1 and a CC #2 satisfy the QCL relationship in space domain, a beam on the CC #1 is still available on the CC #2. In other words, the beam on the CC #1 and a beam on the CC #2 are used to send signals in a same direction, and signal receiving strength measured by the terminal device is the same or approximately the same. When the plurality of BWPs satisfy the QCL relationship in space domain, for example, when a BWP #1 and a BWP #2 satisfy the QCL relationship in space domain, a beam in the BWP #1 is still available in the BWP #2. In other words, signal receiving strength obtained by sending a signal in a same direction by using the beam in the BWP #1 and a beam in the BWP #2 is the same or approximately the same.

Optionally, the network device configures one TCI state list for a plurality of BWPs in a same band.

The network device may predetermine the plurality of BWPs in the same band, and configure a same TCI state list for the plurality of BWPs.

When the network device configures one TCI state list for a plurality of CCs or a plurality of BWPs, it may be considered that the network device and the terminal device predetermine CC groups or BWP groups that have a same TCI state list, and a same TCI state list may be configured for a same CC group or a same BWP group.

In this case, when the network device configures a TCI state list for the terminal device by using the RRC message, a format of an existing RRC message may be still used, to configure the TCI state list for each BWP on each CC, or may configure the TCI state list for each CC group or each BWP group. Information about the CC group or the BWP group may be indicated to the terminal device by using additional signaling. In addition, the network device may still use the existing MAC CE to configure the activated TCI state, or may change the existing MAC CE, to be specific, change the serving cell index into a cell group index and change the BWP ID to a BWP group ID. This is not limited in this application.

It should be understood that, a protocol may specify by default that the network device and the terminal device use any one of the foregoing enumerated manners to reduce configuration overheads of the TCI state list. The network device and the terminal device may generate and parse the MAC CE in a same manner, to accurately determine a mapping relationship.

In step 903, the terminal device determines the mapping relationship based on the TCI state list of the first BWP on the first CC and the MAC CE.

The terminal device may determine, based on the TCI state list that is in the RRC message and that is configured for the first BWP on the first CC, the TCI state list that is configured for the second BWP on the second CC. The terminal device may further determine the mapping relationship based on the TCI state list and the activated TCI state indicated by using the MAC CE. The mapping relationship is the foregoing correspondence between the at least one TCI value and the at least one TCI state.

Correspondingly, in step 904, the network device determines the mapping relationship based on the TCI state list of the first BWP on the first CC and the MAC CE.

A specific process in which the network device determines the mapping relationship based on the TCI state list of the first BWP on the first CC and the MAC CE is the same as the specific process in which the terminal device determines the mapping relationship based on the TCI state list of the first BWP on the first CC and the MAC CE. For brevity, details are not described again.

Optionally, the method 900 further includes step 905: The network device sends a TCI, where the TCI is used to indicate a selected TCI state. Correspondingly, in step 905, the terminal device receives the TCI.

Optionally, the TCI may be preconfigured. For example, the terminal device and the network device agree on the TCI and locally store the TCI in advance.

Optionally, the method 900 further includes step 906: The terminal device determines the TCI state based on the TCI and the mapping relationship.

Correspondingly, the method 900 further includes step 907: The network device determines the TCI state based on the TCI and the mapping relationship.

Optionally, the method 900 further includes step 908: The terminal device determines, based on the TCI state, a receive beam used to receive a downlink signal.

Correspondingly, the method 900 further includes step 909: The network device determines, based on the TCI state, a transmit beam used to send the downlink signal.

Optionally, the method 900 further includes step 910: The network device sends the downlink signal by using the transmit beam. Correspondingly, in step 910, the terminal device receives the downlink signal by using the receive beam.

It should be understood that a specific process of step 905 to step 910 is similar to a specific process of step 306 to step 311 in the foregoing method 300. Because step 306 to step 311 have been described in detail above, for brevity, details are not described herein again.

Based on the foregoing technical solution, the network device may configure a TCI state list for only some CCs or some BWPs, thereby greatly reducing RRC signaling overheads. The TCI state list of the some CCs or the some BWPs is reused so that an active TCI state and a selected TCI state may also be configured for BWPs on CCs. Therefore, when it is ensured that a relatively large beamforming gain can be obtained during downlink signal transmission, signaling overheads are reduced.

It should be understood that sequence numbers of the processes do not mean an execution sequence in the foregoing embodiment. The execution sequence of the processes should be determined according to functions and internal logic of the processes, and should not be construed as any limitation on the implementation processes of this embodiment of this application.

The methods provided in the embodiments of this application are described above in detail with reference to FIG. 3 to FIG. 12. Apparatuses provided in the embodiments of this application are described below in detail with reference to FIG. 13 to FIG. 15.

FIG. 13 is a schematic block diagram of a communications apparatus according to an embodiment of this application. As shown in FIG. 13, the communications apparatus 1000 may include a communications unit 1100 and a processing unit 1200.

In a possible design, the communications apparatus 1000 may correspond to the terminal device in the foregoing method embodiments. For example, the communications apparatus 1000 may be a terminal device or a chip disposed in a terminal device.

Specifically, the communications apparatus 1000 may correspond to the terminal device in the method 300 to the method 900 according to the embodiments of this application. The communications apparatus 1000 may include units configured to perform the method performed by the terminal device in the method 300 in FIG. 5, the method 400 in FIG. 6, the method 500 in FIG. 7, the method 600 in FIG. 8, the method 700 in FIG. 9, the method 800 in FIG. 10, or the method 900 in FIG. 11. In addition, the units in the communications apparatus 1000 and the foregoing other operations and/or functions are separately used to implement a corresponding procedure in the method 300 in FIG. 5, the method 400 in FIG. 6, the method 500 in FIG. 7, the method 600 in FIG. 8, the method 700 in FIG. 9, the method 800 in FIG. 10, or the method 900 in FIG. 11.

When the communications apparatus 1000 is configured to perform the method 300 in FIG. 5, the communications unit 1100 may be configured to perform step 301 to step 303, step 306, and step 311 in the method 300, and the processing unit 1200 may be configured to perform step 304, step 307, and step 309 in the method 300.

When the communications apparatus 1000 is configured to perform the method 400 in FIG. 6, the communications unit 1100 may be configured to perform step 401 to step 403, step 406, and step 411 in the method 400, and the processing unit 1200 may be configured to perform step 404, step 407, and step 409 in the method 400.

When the communications apparatus 1000 is configured to perform the method 500 in FIG. 7, the communications unit 1100 may be configured to perform step 501 to step 503, step 506, and step 511 in the method 500, and the processing unit 1200 may be configured to perform step 504, step 507, and step 509 in the method 500.

When the communications apparatus 1000 is configured to perform the method 600 in FIG. 8, the communications unit 1100 may be configured to perform step 601 to step 603, step 606, and step 611 in the method 600, and the processing unit 1200 may be configured to perform step 604, step 607, and step 609 in the method 600.

When the communications apparatus 1000 is configured to perform the method 700 in FIG. 9, the communications unit 1100 may be configured to perform step 701 to step 703, step 706, and step 711 in the method 700, and the processing unit 1200 may be configured to perform step 704, step 707, and step 709 in the method 700.

When the communications apparatus 1000 is configured to perform the method 800 in FIG. 10, the communications unit 1100 may be configured to perform step 801 to step 803, step 806, and step 811 in the method 800, and the processing unit 1200 may be configured to perform step 804, step 807, and step 809 in the method 800.

When the communications apparatus 1000 is configured to perform the method 900 in FIG. 11, the communications unit 1100 may be configured to perform step 901 and step 902, step 905, and step 910 in the method 900, and the processing unit 1200 may be configured to perform step 903, step 906, and step 908 in the method 900.

It should be understood that a specific process in which the units perform the foregoing corresponding steps has been described in detail in the foregoing method embodiments, and for brevity, details are not described herein again.

Figure 14:
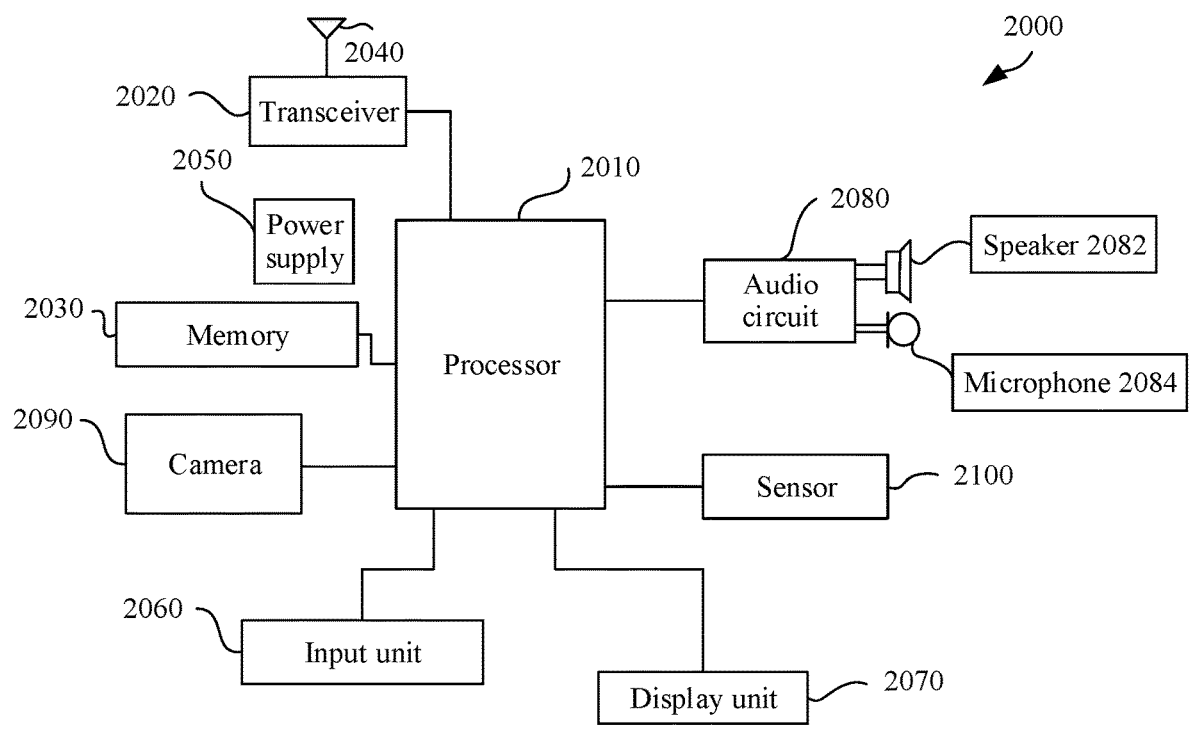
FIG. 14 is a schematic structural diagram of a terminal device according to an embodiment of this application.

It should be further understood that when the communications apparatus 1000 is a terminal device, the communications unit 1100 in the communications apparatus 1000 may correspond to a transceiver 2020 in a terminal device 2000 shown in FIG. 14, and the processing unit 1200 in the communications apparatus 1000 may correspond to a processor 2010 in the terminal device 2000 shown in FIG. 14.

It should be further understood that when the communications apparatus 1000 is a chip disposed in a terminal device, the communications unit 1100 in the communications apparatus 1000 may be an input/output interface.

In another possible design, the communications apparatus 1000 may correspond to the network device in the foregoing method embodiments. For example, the communications apparatus 1000 may be a network device or a chip disposed in a network device.

Specifically, the communications apparatus 1000 may correspond to the network device in the method 300 to the method 900 according to the embodiments of this application. The communications apparatus 1000 may include units configured to perform the method performed by the network device in the method 300 in FIG. 5, the method 400 in FIG. 6, the method 500 in FIG. 7, the method 600 in FIG. 8, the method 700 in FIG. 9, the method 800 in FIG. 10, or the method 900 in FIG. 11. In addition, the units in the communications apparatus 1000 and the foregoing other operations and/or functions are separately used to implement a corresponding procedure in the method 300 in FIG. 5, the method 400 in FIG. 6, the method 500 in FIG. 7, the method 600 in FIG. 8, the method 700 in FIG. 9, the method 800 in FIG. 10, or the method 900 in FIG. 11.

When the communications apparatus 1000 is configured to perform the method 300 in FIG. 5, the communications unit 1100 may be configured to perform step 301 to step 303, step 306, and step 311 in the method 300, and the processing unit 1200 may be configured to perform step 305, step 308, and step 310 in the method 300.

When the communications apparatus 1000 is configured to perform the method 400 in FIG. 6, the communications unit 1100 may be configured to perform step 401 to step 403, step 406, and step 411 in the method 400, and the processing unit 1200 may be configured to perform step 405, step 408, and step 410 in the method 400.

When the communications apparatus 1000 is configured to perform the method 500 in FIG. 7, the communications unit 1100 may be configured to perform step 501 to step 503, step 506, and step 511 in the method 500, and the processing unit 1200 may be configured to perform step 505, step 508, and step 510 in the method 500.

When the communications apparatus 1000 is configured to perform the method 600 in FIG. 8, the communications unit 1100 may be configured to perform step 601 to step 603, step 606, and step 611 in the method 600, and the processing unit 1200 may be configured to perform step 605, step 608, and step 610 in the method 600.

When the communications apparatus 1000 is configured to perform the method 700 in FIG. 9, the communications unit 1100 may be configured to perform step 701 to step 703, step 706, and step 711 in the method 700, and the processing unit 1200 may be configured to perform step 705, step 708, and step 710 in the method 700.

When the communications apparatus 1000 is configured to perform the method 800 in FIG. 10, the communications unit 1100 may be configured to perform step 801 to step 803, step 806, and step 811 in the method 800, and the processing unit 1200 may be configured to perform step 805, step 808, and step 810 in the method 800.

When the communications apparatus 1000 is configured to perform the method 900 in FIG. 11, the communications unit 1100 may be configured to perform step 901 and step 902, step 905, and step 910 in the method 900, and the processing unit 1200 may be configured to perform step 904, step 907, and step 909 in the method 900.

It should be understood that a specific process in which each unit performs the foregoing corresponding steps is described in detail in the foregoing method embodiment, and for brevity, details are not described herein.

Figure 15:
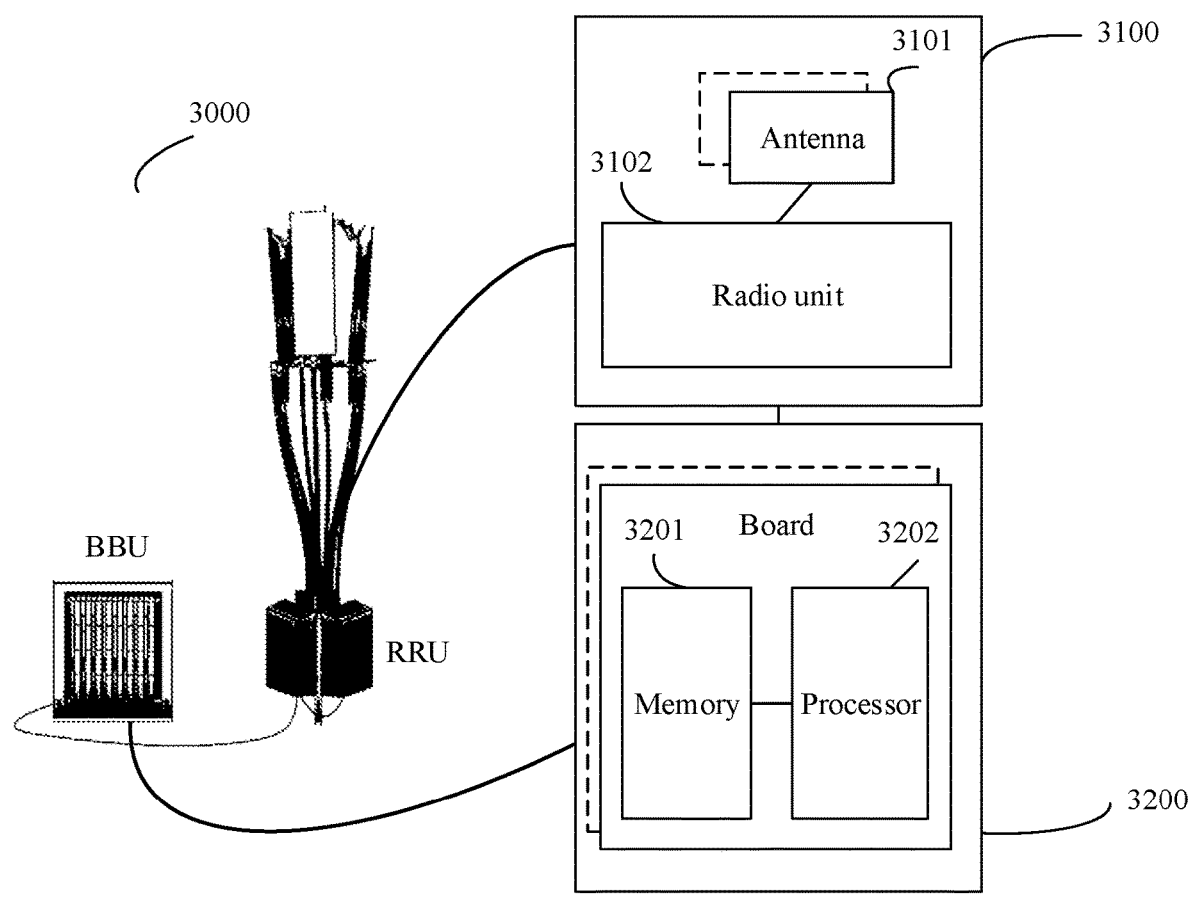
FIG. 15 is a schematic structural diagram of a network device according to an embodiment of this application.

It should be further understood that when the communications apparatus 1000 is a network device, the communications unit in the communications apparatus 1000 may correspond to a transceiver unit 3100 in a network device 3000 shown in FIG. 15, and the processing unit 1200 in the communications apparatus 1000 may correspond to a processor 3200 in the network device 3000 shown in FIG. 15.

It should be further understood that when the communications apparatus 1000 is a chip disposed in a network device, the communications unit 1100 in the communications apparatus 1000 may be an input/output interface.

FIG. 14 is a schematic structural diagram of the terminal device 2000 according to an embodiment of this application. As shown in the figure, the terminal device 2000 includes the processor 2010 and the transceiver 2020. Optionally, the terminal device 2000 further includes a memory 2030. The processor 2010, the transceiver 2002, and the memory 2030 may communicate with each other by using an internal connection path, to transfer a control signal and/or a data signal. The memory 2030 is configured to store a computer program. The processor 2010 is configured to invoke the computer program from the memory 2030 and run the computer program, to control the transceiver 2020 to send and receive a signal. Optionally, the terminal device 2000 may further include an antenna 2040, configured to send, by using a radio signal, uplink data or uplink control signaling output by the transceiver 2020.

The processor 2010 and the memory 2030 may be integrated into a processing apparatus. The processor 2010 is configured to execute program code stored in the memory 2030 to implement the foregoing functions. During specific implementation, the memory 2030 may also be integrated into the processor 2010, or may be independent of the processor 2010.

The transceiver 2020 may correspond to the communications unit in FIG. 13, and may also be referred to as a transceiver unit. The transceiver 2020 may include a receiver (or referred to as a receiver circuit) and a transmitter (or referred to as a transmitter circuit). The receiver is configured to receive a signal, and the transmitter is configured to transmit a signal.

It should be understood that, the terminal device 2000 shown in FIG. 14 can implement the processes related to the terminal device in the method embodiments in FIG. 5 to FIG. 11. The operations and/or the functions of the modules in the terminal device 2000 are separately used to implement corresponding procedures in the foregoing method embodiments. For details, refer to the descriptions in the foregoing method embodiments. To avoid repetition, detailed descriptions are properly omitted herein.

The processor 2010 may be configured to perform an action implemented inside the terminal device in the foregoing method embodiments, and the transceiver 2020 may be configured to perform an action of sending by the terminal device to the network device or receiving from the network device in the foregoing method embodiments. For details, refer to the descriptions in the foregoing method embodiment. Details are not described herein again.

Optionally, the terminal device 2000 may further include a power supply 2050, configured to supply power to various components or circuits in the terminal device.

In addition, to make functions of the terminal device more perfect, the terminal device 2000 may further include one or more of an input unit 2060, a display unit 2070, an audio circuit 2080, a camera 2090, a sensor 2100, and the like, and the audio circuit may further include a speaker 2082, a microphone 2084, and the like.

FIG. 15 is a schematic structural diagram of the network device according to an embodiment of this application. For example, FIG. 15 may be a schematic structural diagram of a base station. As shown in FIG. 15, the base station 3000 may be used in the system shown in FIG. 1 or FIG. 2, to perform a function of the network device in the foregoing method embodiments.

The base station 3000 may include one or more radio units such as a remote radio unit (RRU) 3100 and one or more baseband units (BBU) (which may also be referred to as a digital unit, DU) 3200. The RRU 3100 may be referred to as a transceiver unit, and corresponds to the communications unit 1100 in FIG. 13. Optionally, the transceiver unit 3100 may also be referred to as a transceiver, a transceiver circuit, or the like, and may include at least one antenna 3101 and a radio unit 3102. Optionally, the transceiver unit 3100 may include a receiving unit and a transmission unit. The receiving unit may correspond to a receiver (or referred to as a receiver circuit), and the transmission unit may correspond to a transmitter (or referred to as a transmitter circuit). The RRU 3100 is mainly configured to send and receive a radio frequency signal, and perform conversion between the radio frequency signal and a baseband signal. For example, the RRU 3100 is configured to send indication information to a terminal device. The BBU 3200 is mainly configured to perform baseband processing, control the base station, and so on. The RRU 3100 and the BBU 3200 may be physically disposed together, or may be physically disposed separately, where that is, the base station is a distributed base station.

The BBU 3200 is a control center of the base station, or may be referred to as a processing unit. The BBU 3200 may correspond to the processing unit 1200 in FIG. 13, and is mainly configured to implement a baseband processing function, for example, channel coding, multiplexing, modulation, or spreading. For example, the BBU (the processing unit) may be configured to control the base station to perform an operation procedure related to the network device in the foregoing method embodiments, and for example, generate the foregoing indication information.

In an example, the BBU 3200 may include one or more boards, and a plurality of boards may jointly support a radio access network (for example, an LTE network) having a single access standard, or may separately support radio access networks (for example, an LTE network, a 5G network, or another network) having different access standards. The BBU 3200 further includes a memory 3201 and a processor 3202. The memory 3201 is configured to store a necessary instruction and necessary data. The processor 3202 is configured to control the base station to perform a necessary action, and for example, is configured to control the base station to perform the operation procedure related to the network device in the foregoing method embodiments. The memory 3201 and the processor 3202 may serve one or more boards. That is, a memory and a processor may be separately disposed on each board. Alternatively, the plurality of boards may share a same memory and a same processor. In addition, a necessary circuit may be further disposed on each board.

It should be understood that the base station 3000 shown in FIG. 15 can implement processes related to the network device in the method embodiments in FIG. 5 to FIG. 11. The operations and/or the functions of the modules in the base station 3000 are separately used to implement corresponding procedures in the foregoing method embodiments. For details, refer to the descriptions in the foregoing method embodiments. To avoid repetition, detailed descriptions are properly omitted herein.

The BBU 3200 may be configured to perform an action implemented inside the network device in the foregoing method embodiments, and the RRU 3100 may be configured to perform an action of sending by the network device to the terminal device or receiving from the terminal device in the foregoing method embodiments. For details, refer to the descriptions in the foregoing method embodiments. Details are not described herein again.

An embodiment of this application further provides a processing apparatus, including a processor and an interface. The processor is configured to perform the signal receiving and sending method in any one of the foregoing method embodiments.

It should be understood that the processing apparatus may be a chip. For example, the processing apparatus may be a field programmable gate array (FPGA), an application specific integrated chip (ASIC), a system on chip (SoC), a central processing unit (CPU), a network processor (NP), a digital signal processor (DSP), a micro controller unit (MCU), a programmable logic device (PLD), or another integrated chip.

In an implementation process, steps in the foregoing methods can be implemented by using a hardware integrated logical circuit in the processor or by using instructions in a form of software. The steps of the methods disclosed with reference to the embodiments of this application may be directly performed by a hardware processor, or may be performed by a combination of hardware in the processor and a software module. The software module may be located in a mature storage medium in the art, for example, a random access memory, a flash memory, a read-only memory, a programmable read-only memory, an electrically erasable programmable memory, or a register. The storage medium is located in a memory, and the processor reads information in the memory and completes the steps in the foregoing methods in combination with hardware in the processor. To avoid repetition, details are not described herein again.

It should be noted that the processor in this embodiment of this application may be an integrated circuit chip, and has a signal processing capability. In the implementation process, the steps in the foregoing method embodiments may be completed by using the hardware integrated logical circuit in the processor or by using the instructions in a form of software. The processor may be a general-purpose processor, a digital signal processor (DSP), an application specific integrated circuit (ASIC), a field programmable gate array (FPGA) or another programmable logic device, a discrete gate or a transistor logic device, or a discrete hardware component. The processor may implement or perform the methods, the steps, and logical block diagrams that are disclosed in the embodiments of this application. The general-purpose processor may be a microprocessor, or the processor may be any conventional processor or the like. The steps of the methods disclosed with reference to the embodiments of this application may be directly executed and completed by using a hardware decoding processor, or may be executed and completed by using a combination of hardware in a decoding processor and a software module. The software module may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the steps in the foregoing methods in combination with hardware in the processor.

It may be understood that the memory in this embodiment of this application may be a volatile memory or a nonvolatile memory, or may include both a volatile memory and a nonvolatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through example descriptions rather than limitative descriptions, RAMs in many forms may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory of the system and method described in this specification includes but is not limited to these and any memory of another proper type.

According to the methods provided in the embodiments of this application, this application further provides a computer program product. The computer program product includes computer program code. When the computer program code is run on a computer, the computer is enabled to perform the signal receiving and sending method in any one of the embodiments shown in FIG. 5 to FIG. 11.

According to the methods provided in the embodiments of this application, this application further provides a computer-readable medium. The computer-readable medium stores program code. When the program code is run on a computer, the computer is enabled to perform the signal receiving and sending method in any one of the embodiments shown in FIG. 5 to FIG. 11.

According to the methods provided in the embodiments of this application, this application further provides a system. The system includes the foregoing one or more terminal devices and one or more network devices.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, the procedures or functions according to the embodiments of this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

The network device and the terminal device in the foregoing apparatus embodiments correspond to the network device and the terminal device in the method embodiments.

A corresponding module or unit performs a corresponding step. For example, the communications unit (transceiver) performs a receiving or sending step in the method embodiments, and another step other than the sending step and the receiving step may be performed by the processing unit (processor). For a function of a specific unit, refer to the corresponding method embodiments. There may be one or more processors.

In this application, "at least one" refers to one or more, and "a plurality of" refers to two or more. The term "and/or" describes an association relationship between associated objects and represents that three relationships may exist. For example, A and/or B may represent the following cases: Only A exists, both A and B exist, and only B exists, where A and B may be singular or plural. The character "/" usually indicates an "or" relationship between the associated objects. "At least one of the following items (pieces)" or a similar expression thereof indicates any combination of these items, including a single item (piece) or any combination of a plurality of items (pieces). For example, at least one of a, b, or c may indicate a, b, c, a and b, a and c, b and c, or a, b, and c, where a, b, and c may be singular or plural.

It should be understood that "one embodiment" or "an embodiment" mentioned in the entire specification means that particular features, structures, or characteristics related to the embodiments are included in at least one embodiment of this application. Therefore, "in one embodiment" or "in an embodiment" that appears throughout the entire specification does not necessarily mean a same embodiment. In addition, these particular features, structures, or characteristics may be combined in one or more embodiments in any appropriate manner. It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application. In addition, descriptions of the steps in the figure are merely examples, and shall not constitute any limitation on this application.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As shown in figures, both a computing device and an application that runs on a computing device may be components. One or more components may reside within a process and/or an execution thread, and a component may be located on one computer and/or distributed between two or more computers. In addition, these components may be executed by various computer-readable media that store various data structures. For example, the components may communicate by using a local and/or remote process based on a signal having one or more data packets (for example, data from two components interacting with another component in a local system, in a distributed system, and/or across a network such as the internet interacting with another system by using the signal).

A person of ordinary skill in the art may be aware that illustrative logical blocks and steps described with reference to the embodiments disclosed in this specification can be implemented by electronic hardware or a combination of computer software and electronic hardware. Whether the functions are performed by hardware or software depends on a particular application and a design constraint of the technical solutions. A person skilled in the art may use different methods to implement the functions for each particular application, but it should not be considered that the implementation goes beyond the scope of this application.

It may be clearly understood by a person skilled in the art that for the purpose of convenient and brief description, for a detailed working process of the described system, apparatus, and unit, refer to a corresponding process in the foregoing method embodiments.

In the several embodiments provided in this application, it should be understood that the disclosed system, apparatus, and method may be implemented in other manners. For example, the foregoing apparatus embodiments are merely examples. For example, division into units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, and may be located in one location, or may be distributed on a plurality of network units. Some or all of the units may be selected based on actual requirements to achieve the objectives of the solutions in the embodiments.

In addition, functional units in the embodiments of this application may be integrated into one processing unit, each of the units may exist alone physically, or two or more units are integrated into one unit.

In the foregoing embodiments, all or some of the functions of the functional units may be implemented by software, hardware, firmware, or any combination thereof. When the software is used to implement the embodiments, the embodiments may be implemented completely or partially in a form of a computer program product. The computer program product includes one or more computer instructions (programs). When the computer program instructions (programs) are loaded and executed on a computer, the procedures or functions according to the embodiments of this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

When the functions are implemented in a form of a software functional unit and sold or used as an independent product, the functions may be stored in a computer-readable storage medium. Based on such an understanding, the technical solutions in this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods in the embodiments of this application. The foregoing storage medium includes: any medium that can store program code, such as a USB flash drive, a removable hard disk, a read-only memory (ROM), a random access memory (RAM), a magnetic disk, or a compact disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for wireless communications, comprising:
receiving first indication information on a first component carrier (CC), wherein the first indication information indicates a bandwidth part (BWP) for transmitting a downlink signal and a second CC to which the BWP belongs;
determining a first mapping relationship based on the second CC and the BWP, wherein the first mapping relationship indicates a one-to-one correspondence between at least one transmission configuration indicator (TCI) state and at least one TCI value;
determining a TCI state based on the first mapping relationship and a received TCI value;
determining, based on the TCI state, a receive beam for receiving the downlink signal; and
receiving the downlink signal in the BWP on the second CC by using the receive beam.

2. The method according to claim 1, wherein the determining the first mapping relationship comprises:
receiving a plurality of media access control (MAC) control elements (CEs); and
determining, based on the second CC and the BWP, a mapping relationship indicated by using a first MAC CE in the plurality of MAC CEs as the first mapping relationship, wherein an identifier of a CC indicated by the first MAC CE is same as an identifier of the second CC indicated by using the first indication information, and an identifier of a BWP indicated by the first MAC CE is same as an identifier of the BWP indicated by using the first indication information.

3. The method according to claim 1, further comprising:
before determining the first mapping relationship, receiving second indication information, wherein the second indication information indicates to determine the first mapping relationship based on the second CC and the BWP.

4. The method according to claim 1, wherein the downlink signal is transmitted on a physical downlink shared channel, and the first indication information is comprised in downlink control information (DCI).

5. The method according to claim 4, wherein the DCI further comprises the received TCI value.

6. A method for wireless communications, comprising:
sending first indication information on a first component carrier (CC), wherein the first indication information indicates a bandwidth part (BWP) for transmitting a downlink signal and a second CC to which the BWP belongs;
determining a first mapping relationship based on the second CC and the BWP, wherein the first mapping relationship indicates a one-to-one correspondence between at least one transmission configuration indicator (TCI) state and at least one TCI value;
determining a TCI state based on the first mapping relationship and a TCI value;
determining, based on the TCI state, a transmit beam for sending the downlink signal; and
sending the downlink signal in the BWP on the second CC by using the transmit beam.

7. The method according to claim 6, wherein the method further comprises:
sending a plurality of media access control (MAC) control elements (CEs), wherein the plurality of MAC CEs as the first mapping relationship comprise a first MAC CE, an identifier of a CC indicated by the first MAC CE is same as an identifier of the second CC indicated by using the first indication information, and an identifier of a BWP indicated by the first MAC CE is same as an identifier of the BWP indicated by using the first indication information.

8. The method according to claim 6, further comprising:
before determining the first mapping relationship, sending second indication information, wherein the second indication information indicates to determine the first mapping relationship based on the second CC and the BWP.

9. The method according to claim 6, wherein the downlink signal is transmitted on a physical downlink shared channel, and the first indication information is comprised in downlink control information (DCI).

10. The method according to claim 9, wherein the DCI further comprises the TCI value.

11. A communications apparatus, comprising:
at least one processor
coupled to one or more memories that store programming instructions for execution by the at least one processor to:
receive first indication information on a first component carrier (CC), wherein the first indication information indicates a bandwidth part (BWP) for transmitting a downlink signal and a second CC to which the BWP belongs; and
determine a first mapping relationship based on the second CC and the BWP, wherein the first mapping relationship indicates a one-to-one correspondence between at least one transmission configuration indicator (TCI) state and at least one TCI value, wherein
determine a TCI state based on the first mapping relationship and a received TCI value;
determine, based on the TCI state, a receive beam for receiving the downlink signal; and
receive the downlink signal in the BWP on the second CC by using the receive beam.

12. The communications apparatus according to claim 11, wherein the programming instructions are for execution by the at least one processor to receive a plurality of media access control (MAC) control elements (CEs); and
determine, based on the second CC and the BWP, a mapping relationship indicated by using a first MAC CE in the plurality of MAC CEs as the first mapping relationship, wherein an identifier of a CC indicated by the first MAC CE is same as an identifier of the second CC indicated by using the first indication information, and an identifier of a BWP indicated by the first MAC CE is same as an identifier of the BWP indicated by using the first indication information.

13. The communications apparatus according to claim 11, wherein the programming instructions are for execution by the at least one processor to receive second indication information, and the second indication information indicates to determine the first mapping relationship based on the second CC and the BWP.

14. The communications apparatus according to claim 11, wherein the downlink signal is transmitted on a physical downlink shared channel, and the first indication information is comprised in downlink control information (DCI).

15. A communications apparatus, comprising:
at least one processor
coupled to one or more memories that store programming instructions for execution by the at least one processor to:
send first indication information on a first component carrier (CC), wherein the first indication information indicates a bandwidth part (BWP) for transmitting a downlink signal and a second CC to which the BWP belongs;
determine a first mapping relationship based on the second CC and the BWP, wherein the first mapping relationship indicates a one-to-one correspondence between at least one transmission configuration indicator (TCI) state and at least one TCI value;
determine a TCI state based on the first mapping relationship and a TCI value;
determine, based on the TCI state, a transmit beam for sending the downlink signal; and
send the downlink signal in the BWP on the second CC by using the transmit beam.

16. The communications apparatus according to claim 15, wherein the programming instructions are for execution by the at least one processor to send a plurality of media access control (MAC) control elements (CEs), the plurality of MAC CEs as the first mapping relationship comprise a first MAC CE, an identifier of a CC indicated by the first MAC CE is same as an identifier of the second CC indicated by using the first indication information, and an identifier of a BWP indicated by the first MAC CE is same as an identifier of the BWP indicated by using the first indication information.

17. The communications apparatus according to claim 15, wherein the programming instructions are for execution by the at least one processor to send second indication information, wherein the second indication information indicates to determine the first mapping relationship based on the second CC and the BWP.

18. The communications apparatus according to claim 15, wherein the downlink signal is transmitted on a physical downlink shared channel, and the first indication information is comprised in downlink control information (DCI).

19. The communications apparatus according to claim 18, wherein the DCI further comprises the TCI value.

20. The communications apparatus according to claim 14, wherein the DCI further comprises the received TCI value.

* * * * *